United States Patent
Hayasaka et al.

(10) Patent No.: US 10,255,664 B2
(45) Date of Patent: Apr. 9, 2019

(54) IMAGE PROCESSING DEVICE AND METHOD

(71) Applicant: SONY CORPORATION, Tokyo (JP)

(72) Inventors: Kengo Hayasaka, Kanagawa (JP); Katsuhisa Ito, Tokyo (JP)

(73) Assignee: SONY CORPORATION, Tokyo (JP)

(*) Notice: Subject to any disclaimer, the term of this patent is extended or adjusted under 35 U.S.C. 154(b) by 86 days.

(21) Appl. No.: 15/306,368

(22) PCT Filed: Jun. 23, 2015

(86) PCT No.: PCT/JP2015/067983
§ 371 (c)(1),
(2) Date: Oct. 24, 2016

(87) PCT Pub. No.: WO2016/002578
PCT Pub. Date: Jan. 7, 2016

(65) Prior Publication Data
US 2017/0046821 A1    Feb. 16, 2017

(30) Foreign Application Priority Data

Jul. 4, 2014    (JP) .................................. 2014-138820

(51) Int. Cl.
*G06T 5/00*    (2006.01)
*G03B 35/08*    (2006.01)
(Continued)

(52) U.S. Cl.
CPC ............... *G06T 5/006* (2013.01); *G03B 35/08* (2013.01); *G06K 9/4661* (2013.01);
(Continued)

(58) Field of Classification Search
CPC ...... H04N 5/3572; H04N 5/77; H04N 9/8205; H04N 13/0242; H04N 13/0271;
(Continued)

(56) References Cited

U.S. PATENT DOCUMENTS 9,800,774 B2 * 10/2017 Naruse ............... H04N 5/23212
2007/0002158 A1 * 1/2007 Robinson ............. H04N 5/2251
348/335
(Continued)

FOREIGN PATENT DOCUMENTS

JP    2013-066058    4/2013
JP    2014-107631    6/2014

OTHER PUBLICATIONS

Bennett Wilburn, et al., High Performance Imaging Using Large Camera Arrays, Stanford University, 2005, pp. 1-12 (Proceedings of ACM SIGGRAPH).

*Primary Examiner* — Sean T Motsinger
(74) *Attorney, Agent, or Firm* — Paratus Law Group, PLLC

(57) ABSTRACT

The present disclosure relates to an image processing device and method, which are capable of reproducing optical information processing of a lens. A viewpoint PSF calculating unit converts each disparity map into a map of a depth z. Then, the viewpoint PSF calculating unit obtains a viewpoint position on the basis of each viewpoint image, a map of each depth z, and a focus position, and generates PSF data of each viewpoint on the basis of the viewpoint position. Here, the PSF data is a point spread function, and an offset amount and an intensity coefficient of each viewpoint can be obtained on the basis of the PSF data of each viewpoint. The viewpoint PSF calculating unit supplies the obtained PSF data of each viewpoint (that is, the offset amount and the intensity coefficient) to a light collection processing unit. The present disclosure can be applied to an imaging device that performs multi-viewpoint photographing using an array of a plurality of cameras in a light field photographing technique capable of tracing a light ray.

13 Claims, 34 Drawing Sheets

(51) Int. Cl.
  *G06K 9/46* (2006.01)
  *G06T 3/40* (2006.01)
  *H04N 5/77* (2006.01)
  *H04N 9/82* (2006.01)
  *H04N 5/357* (2011.01)
  *H04N 13/243* (2018.01)
  *H04N 13/271* (2018.01)

(52) U.S. Cl.
  CPC .......... *G06T 3/4007* (2013.01); *G06T 3/4038* (2013.01); *G06T 5/003* (2013.01); *H04N 5/3572* (2013.01); *H04N 5/77* (2013.01); *H04N 9/8205* (2013.01); *H04N 13/243* (2018.05); *H04N 13/271* (2018.05); *G06T 2200/21* (2013.01); *G06T 2207/10052* (2013.01)

(58) Field of Classification Search
  CPC ..... H04N 13/00–13/0025; G06T 5/006; G06T 3/4007; G06T 3/4038; G03B 35/08; G06K 9/4661
  See application file for complete search history.

(56) References Cited

U.S. PATENT DOCUMENTS

| | | | |
|---|---|---|---|
| 2009/0208136 A1* | 8/2009 | Kawasaki | G06T 3/0018 382/293 |
| 2010/0302412 A1* | 12/2010 | Hayashi | G02B 27/0068 348/241 |
| 2011/0122281 A1* | 5/2011 | Ohara | G02B 9/20 348/222.1 |
| 2011/0279774 A1* | 11/2011 | Dai | A61F 9/00806 351/205 |
| 2013/0010086 A1* | 1/2013 | Iwasaki | G03B 35/08 348/49 |
| 2013/0088489 A1* | 4/2013 | Schmeitz | H04N 5/2254 345/419 |
| 2013/0100290 A1* | 4/2013 | Sato | H04N 5/3572 348/148 |
| 2013/0147843 A1* | 6/2013 | Shimizu | G06T 11/60 345/647 |
| 2013/0293704 A1* | 11/2013 | Imamura | G01C 3/08 348/135 |
| 2013/0308007 A1* | 11/2013 | Tanaka | H04N 5/225 348/222.1 |
| 2014/0002688 A1* | 1/2014 | Inoue | H04N 5/23296 348/222.1 |
| 2015/0237270 A1* | 8/2015 | Atif | H04N 5/332 348/164 |
| 2016/0027155 A1* | 1/2016 | Naruse | H04N 1/409 382/167 |
| 2016/0048942 A1* | 2/2016 | Irie | G06F 3/0488 345/619 |
| 2016/0094835 A1* | 3/2016 | Takanashi | H04N 5/243 348/54 |
| 2016/0165127 A1* | 6/2016 | Naruse | G06T 5/003 348/222.1 |
| 2016/0198146 A1* | 7/2016 | Hayasaka | G06T 1/20 348/48 |
| 2017/0026632 A1* | 1/2017 | Ishiga | G02B 7/34 |
| 2017/0046821 A1* | 2/2017 | Hayasaka | G03B 35/08 |
| 2017/0053390 A1* | 2/2017 | Yoshida | G06T 5/20 |
| 2017/0059812 A1* | 3/2017 | Kyung | G02B 7/102 |
| 2018/0040109 A1* | 2/2018 | Hayashi | G06T 5/003 |

* cited by examiner

FIG. 6

| TYPE | ABERRATION CHARACTERISTICS | OFFSET METHOD | | |
|---|---|---|---|---|
| | | FOR EACH VIEWPOINT POSITION | FOR EACH ANGLE-OF-VIEW / SENSOR POSITION | FOR EACH COLOR |
| SPHERICAL ABERRATION | ABERRATION IN WHICH DUE TO STRONG REFRACTION ACTION OF LENS, FOCUS POSITION DEVIATES, AND FOCUSES INSIDE AND OUTSIDE LENS ARE DIFFERENT. OCCURS ON AXIS AS WELL | ○ | — | — |
| COMA ABERRATION | ABERRATION THAT IS CAUSED BY LIGHT INPUT FROM LENS BEING TILTED. MORE REMARKABLY APPEARS AS IT GETS FURTHER FROM AXIS | ○ | ○ | — |
| ASTIGMATISM | ABERRATION IN WHICH DUE TO MANUFACTURING ERROR OR THE LIKE OF LENS, FOCUSED POINT OF VERTICAL AXIS IS DIFFERENT FROM FOCUSED POINT OF HORIZONTAL AXIS, AND FOCAL DISTANCES AT POSITIONS AFTER PASSING THROUGH LENS ARE DIFFERENT. OCCURS ON AXIS AS WELL | ○ | — | — |
| FIELD CURVATURE ABERRATION | ABERRATION IN WHICH PLANE ON WHICH IMAGE IS FORMED BECOMES ASPECT. REMARKABLE AT OFF-AXIS POSITION | — | ○ | — |
| DISTORTION ABERRATION | THERE IS FEATURE IN WHICH FOCUS IS OBTAINED FOR FRONT SURFACE, BUT SHAPE IS DISTORTED AND PHOTOGRAPHED | — | ○ | — |
| AXIAL CHROMATIC ABERRATION | ABERRATION IN WHICH VALID FOCAL DISTANCE DIFFERS ACCORDING TO COLOR SINCE REFRACTIVE INDEX DIFFERS ACCORDING TO COLOR. OCCURS ON AXIS AS WELL | ○ | — | ○ |
| CHROMATIC ABERRATION OF MAGNIFICATION | ABERRATION THAT OCCURS SINCE FOCAL DISTANCE DIFFERS ACCORDING TO COLOR, AND THUS MAGNIFICATION OF FORMED IMAGE DIFFERS. DOES NOT OCCUR ON AXIS | ○ | ○ | ○ |

FIG. 20
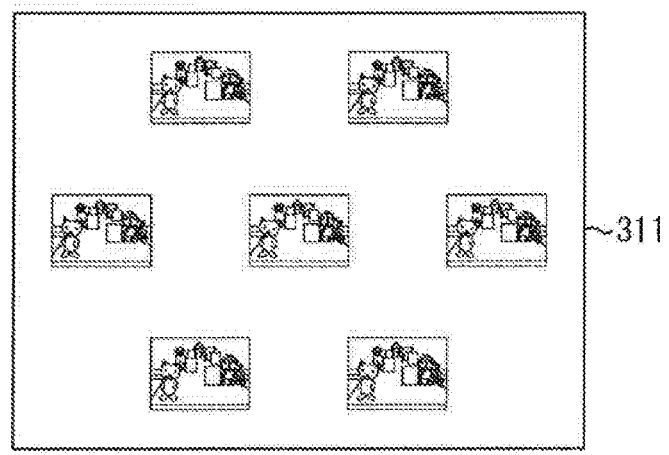
A
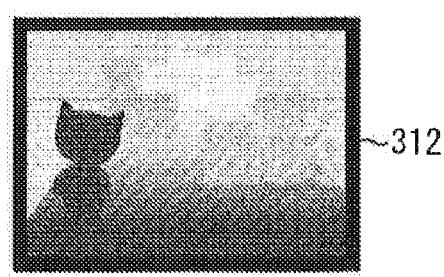
B

IMAGE PROCESSING DEVICE AND METHOD

CROSS REFERENCE TO PRIOR APPLICATION

This application is a National Stage Patent Application of PCT International Patent Application No. PCT/JP2015/067983 (filed on Jun. 23, 2015) under 35 U.S.C. § 371, which claims priority to Japanese Patent Application No. 2014-138820 (filed on Jul. 4, 2014), which are all hereby incorporated by reference in their entirety.

TECHNICAL FIELD

The present disclosure relates to an image processing device and method, and more particularly, to an image processing device and method, which are capable of reproducing optical information processing of a lens.

BACKGROUND ART

Currently, various studies on an image processing technique of changing a focal position on the basis of a plurality of parallax images have been conducted. For example, Non-Patent Document 1 discloses a technique of changing a focal position on the basis of an array of 100 cameras.

CITATION LIST

Non-Patent Document

Non-Patent Document 1: Bennett Wilburn, Neel Joshi, Vaibhav Vaish, Eino-Ville Talvala, Emilio Antunez, Adam-Barth, Andrew Adams, Mark Horowitz, Marc Levoy, "High Performance Imaging Using Large Camera Arrays," In ACM Transactions on Graphics, Vol 24, No 3, July 2005, pp. 765-776.

SUMMARY OF THE INVENTION

Problems to be Solved by the Invention

However, in the technique disclosed in Non-Patent Document 1, viewpoint images are superimposed simply with a pixel deviation amount according to a distance of an object, and simple focusing and generation of bokeh are performed.

In other words, although it is possible to perform simple focusing and generation of bokeh, reproducibility thereof is low, and a technique of reproducing optical information processing of a lens through digital processing has been previously unknown.

The present disclosure was made in light of the foregoing, and it is desirable to be able to reproduce optical information processing of a lens.

Solutions to Problems

An image processing device according to one aspect of the present disclosure includes: a light collection processing unit that performs a light collection process of reproducing a lens aberration on a multi-viewpoint image using aberration adjustment data for adjusting the lens aberration according to a viewpoint position or an angle-of-view position for a lens.

The light collection processing unit may perform the light collection process using an offset value and an intensity value for the lens aberration according to the viewpoint position as the aberration adjustment data.

The light collection processing unit may perform the light collection process using an offset value and an intensity value for the lens aberration according to the angle-of-view position as the aberration adjustment data.

The light collection processing unit may perform the light collection process using a point spread function of each viewpoint position of the multi-viewpoint image as the aberration adjustment data.

The light collection processing unit may perform the light collection process of reproducing lens aberrations having different offset methods according to a type of aberration or aberration characteristics using a point spread function of each viewpoint position of the multi-viewpoint image.

The lens aberration may have at least one of an offset method having an offset value that differs according to each viewpoint position or an offset method having an offset value that differs according to each angle-of-view position according to the type of aberration or the aberration characteristics.

The light collection processing unit may perform the light collection process using an offset value and an intensity value of each viewpoint position obtained from the point spread function of each viewpoint position.

The light collection processing unit may perform the light collection process using an offset value and an intensity value of each angle-of-view position obtained from the point spread function of each viewpoint position.

A setting unit that sets the aberration adjustment data on the basis of depth data of the multi-viewpoint image may be further provided.

The setting unit may set the aberration adjustment data on the basis of the depth data of the multi-viewpoint image, coordinate data of the angle-of-view position, and coordinate data of the viewpoint position.

An image interpolating unit that performs an interpolation process on the multi-viewpoint image on the basis of the depth data of the multi-viewpoint image may be further provided, and the setting unit may set the aberration adjustment data on the basis of depth data of the multi-viewpoint image that has undergone the interpolation process performed by the image interpolating unit.

An image processing method according to one aspect of the present disclosure includes: performing, by an image processing device, a light collection process of reproducing a lens aberration on a multi-viewpoint image using aberration adjustment data for adjusting the lens aberration according to a viewpoint position or an angle-of-view position for a lens.

In one aspect of the present disclosure, a light collection process of reproducing a lens aberration on a multi-viewpoint image is performed using aberration adjustment data for adjusting the lens aberration according to a viewpoint position or an angle-of-view position for a lens.

Effects of the Invention

According to one aspect of the present disclosure, it is possible to process a multi-viewpoint image. Particularly, it is possible to reproduce optical information processing of a lens.

The effects described in this specification are merely examples, and the effects of the present technology are not limited to effects described in this specification, and an additional effect may be obtained.

BRIEF DESCRIPTION OF DRAWINGS

FIG. 6 is a diagram illustrating a table in which types of aberration and offset methods are summarized.

FIG. 20 is a diagram illustrating an example of a multi-viewpoint image and depth data.

MODE FOR CARRYING OUT THE INVENTION

Hereinafter, modes (hereinafter, referred to "embodiments") for carrying out the present disclosure will be described. The description will proceed in the following order.

1. First embodiment (multi-viewpoint image imaging device)
2. Second embodiment (multi-viewpoint image-used service platform)
3. Third embodiment (management of multi-viewpoint image)
4. Fourth embodiment (application sale)
5. Fifth embodiment (the virtual lens process)
6. Others <1. First Embodiment>
[Description of Depth in this Specification]

Figure 1:
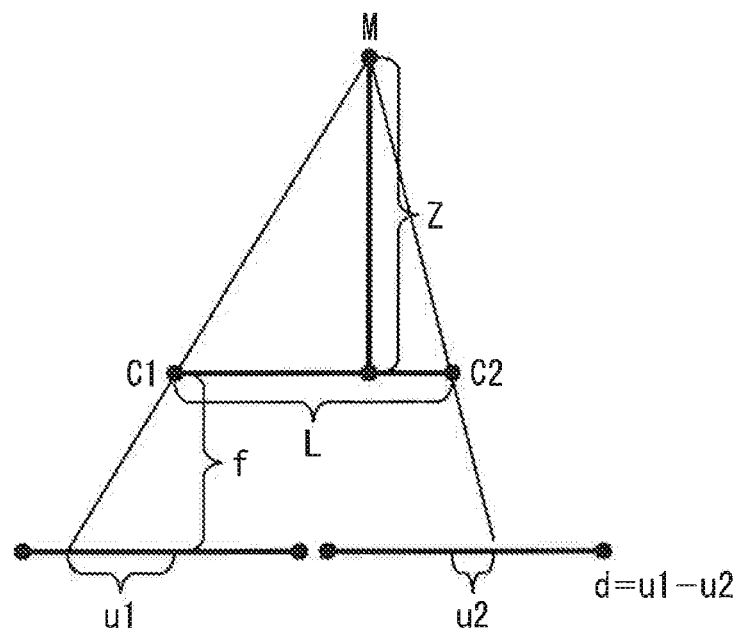
FIG. 1 is a diagram for describing a pixel deviation amount (disparity) and a depth.

FIG. 1 is a diagram for describing a pixel deviation amount (disparity) and a depth.

As illustrated in FIG. 1, when a color image of a subject M is photographed by a camera c1 arranged at a position C1 and a camera c2 arranged at a position C2, a depth Z which is a distance of the subject M from the camera c1 (the camera c2) in a depth direction is defined by the following Formula (1):

[Mathematical Formula 1]

$$Z=(L/d) \times f \qquad (1)$$

L indicates a distance between the position C1 and the position C2 in the horizontal direction (hereinafter, referred to as an "inter-camera distance"). Further, d indicates a value obtained by subtracting a distance u2 of the position of the subject M on the color image photographed by the camera c2 from the center of the color image in the horizontal direction from a distance u1 of the position of the subject M on the color image photographed by the camera c1 from the center of the color image in the horizontal direction, that is, the pixel deviation amount (also referred to as "parallax"). Further, f indicates a focal distance of the camera c1 and the focal distances of the camera c1 and the camera c2 are assumed to be equal in Formula (1).

As indicated in Formula (1), the pixel deviation amount d and the depth Z are uniquely convertible. Thus, in this specification, an image indicating the pixel deviation amount d of the color image of two viewpoints photographed by the camera c1 and the camera c2 and an image indicating the depth Z are referred to collectively as a depth image (a parallax image).

The depth image (the parallax image) is preferably an image indicating the pixel deviation amount d or the depth Z, and rather than the pixel deviation amount d or the depth Z, a value obtained by normalizing the pixel deviation amount d, a value obtained by normalizing a reciprocal 1/Z of the depth Z, or the like may be employed as the pixel value of the depth image (the parallax image).

A value I obtained by normalizing a pixel deviation amount d using 8 bits (0 to 255) can be obtained by the following Formula (2). The numbers of normalization bits of the pixel deviation amount d is not limited to 8 bits, and any other number of bits such as 10 bits or 12 bits may be used.

[Mathematical Formula 2]

$$I = \frac{255 \times (d - D_{min})}{D_{max} - D_{min}} \quad (2)$$

In Formula (2), $D_{max}$ indicates a maximum value of the pixel deviation amount d, and $D_{min}$ is a minimum value of the pixel deviation amount d. The maximum value $D_{max}$ and the minimum value $D_{min}$ may be set in units of screen or may be set in units of a plurality of screens.

A value y obtained by normalizing the reciprocal 1/Z of the depth Z using 8 bits (0 to 255) can be obtained by the following Formula (3). The number of normalization bits of the reciprocal 1/Z of the depth Z is not limited to 8 bits, and any other number of bits such as 10 bits or 12 bits may be used.

[Mathematical Formula 3]

$$y - 255 \times = \frac{\frac{1}{Z} - \frac{1}{Z_{far}}}{\frac{1}{Z_{near}} - \frac{1}{Z_{far}}} \quad (3)$$

In Formula (3), $Z_{far}$ indicates a maximum value of the depth Z, and $Z_{near}$ indicates a minimum value of the depth Z. The maximum value $Z_{far}$ and the minimum value $Z_{near}$ may be set in units of screen or may be set in units of a plurality of screens.

As described above, in this specification, under the assumption that the pixel deviation amount (parallax) d and the depth Z are uniquely convertible, an image having the value I obtained by normalizing the pixel deviation amount d as the pixel value and an image having the value y obtained by normalizing the reciprocal 1/Z of the depth Z as the pixel value are referred to collectively as the depth image (or the parallax image). Here, a color format of the depth image (the parallax image) is assumed to be YUV420 or YUV400, but any other color format may be used.

If attention is focused on information of the value I or the value y other than the pixel value of the depth image (the parallax image), the value I or the value y is used as depth information (parallax information). Further, one obtained by mapping the value I or the value y is referred to as a depth map (a parallax map).

As described above, in this specification, the disparity data and the depth data can be referred to collectively as "depth (parallax) data," and a disparity map and a depth map can be referred to collectively as a "depth (parallax) map."

[Configuration of Imaging Device]

Figure 2:
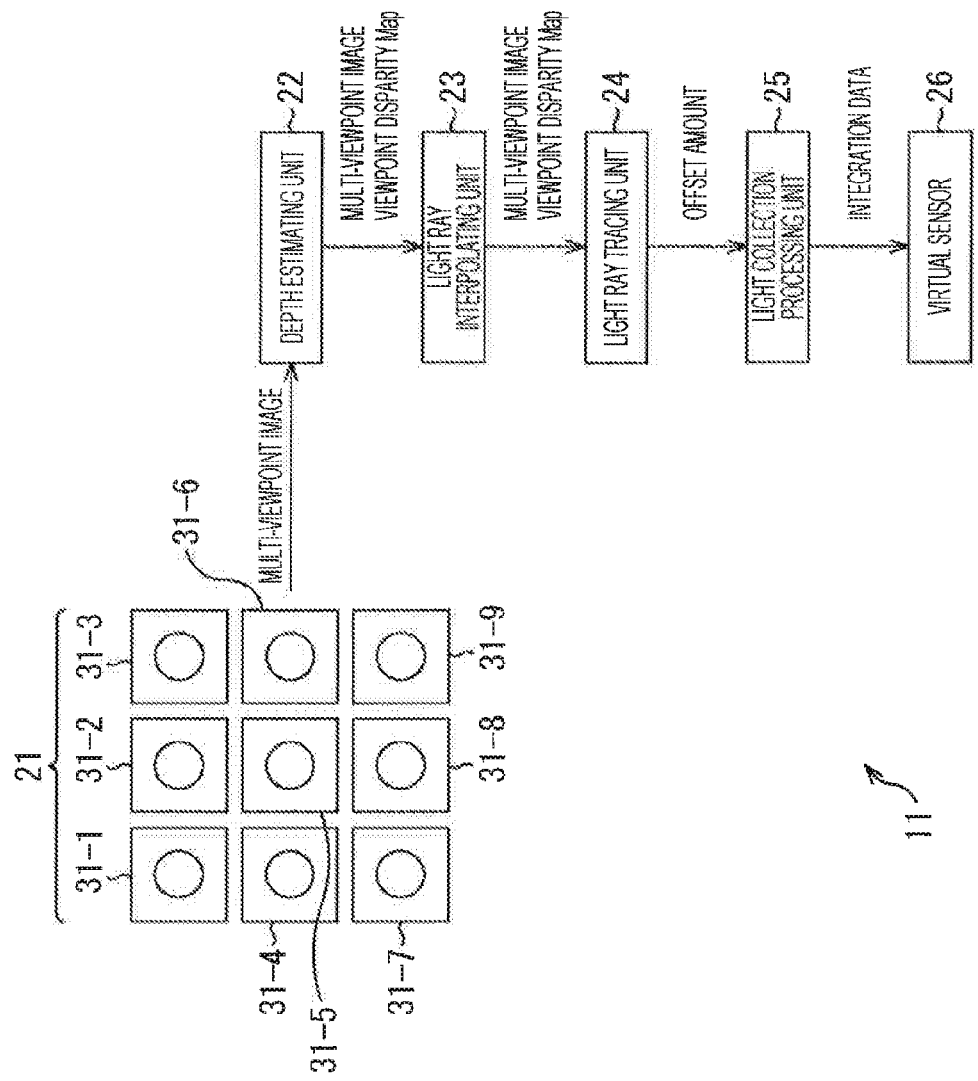
FIG. 2 is a block diagram illustrating an exemplary configuration of an imaging device to which the present technology is applied.

FIG. 2 is a block diagram illustrating an exemplary configuration of an imaging device serving as an image processing device to which the present technology is applied. The imaging device performs photographing from a plurality of viewpoints using a camera array having two or more viewpoints in a light field photographing technique capable of tracing a light ray, for example, tracing a direction in which a light ray is traveling, and performs image processing of reproducing a function of a lens using an image of a plurality of viewpoints that is photographed (that is, a multi-viewpoint image).

FIG. 2 illustrates an example in which an array of nine cameras is provided, and a 25-viewpoint image is generated from a 9-viewpoint image acquired by the array of nine cameras through interpolation. The number of viewpoints described above is an example, and the number of cameras is not limited to nine, and an image generated through interpolation is not limited to a 25-viewpoint image.

In this specification, a viewpoint is simply stated, but in detail, it indicates a viewpoint position, and an angle of view is simply stated, but in detail, it indicates an angle-of-view position.

The imaging device 11 of FIG. 2 is configured with a camera array 21, a depth estimating unit 22, a light ray interpolating unit 23, a light ray tracing unit 24, a light collection processing unit 25, and a virtual sensor 26.

The camera array 21 is configured with cameras 31-1 to 31-9. Each of the cameras 31-1 to 31-9 includes image sensors such as Complementary Metal Oxide Semiconductor (CMOS) image sensors or Charge Coupled Device (CCD) image sensors which are used in mobile camera modules or the like and arranged on a two-dimensional (2D) plane. Thus, according to the present technology, for example, bokeh of a lens such as a single-eye lens can be reliably reproduced through a card-sized imaging device. Further, when the cameras 31-1 to 31-9 need not be particularly distinguished from one another, they are appropriately referred to collectively as a "camera 31."

Viewpoint images of the cameras 31-1 to 31-9 are input to the depth estimating unit 22. The depth estimating unit 22 performs a depth estimation using the input viewpoint images. Then, the depth estimating unit 22 calculates disparities (pixel deviation amounts) between the multi-viewpoint images, and generates disparity maps. The multi-viewpoint image is a general term of images obtained from two or more viewpoints. The depth estimating unit 22 supplies the disparity maps to the light ray interpolating unit 23 as a multi-viewpoint disparity map together with the multi-viewpoint image.

The light ray interpolating unit 23 regards the cameras 31 arranged on the 2D plane as a synthetic aperture diameter and performs light ray interpolation incident on the synthetic aperture diameter according to each viewpoint image and each disparity map. The light ray interpolating unit 23 supplies a group of interpolated light rays (for example, an interpolated multi-viewpoint interpolated image and a disparity) to the light ray tracing unit 24.

The light ray tracing unit 24 specifies an aberration amount of the interpolated multi-viewpoint interpolated image for each diaphragm position and each sensor position at which light collection is performed, for example, on the basis of lens design data to be emulated, and then decides an offset amount of the aberration. The light ray tracing unit 24 supplies the obtained offset amount of the aberration to the light collection processing unit 25. In this specification, the pixel deviation amount, the aberration amount, and the offset amount are stated, but these amounts are assumed to indicate values.

The light collection processing unit 25 performs a synthesis process (an integration process) of integrating and synthesizing the results in view of the disparity amount (the pixel deviation amount) and the offset amount of the aberration for each diaphragm position and each sensor position at which light collection is performed on the basis of the offset amount of the aberration obtained by the light ray tracing unit 24. The light collection processing unit 25 writes an emulated image that has undergone the synthesis process to the virtual sensor 26.

The virtual sensor 26 is formed, for example, on a memory (not illustrated). For example, the light collection processing unit 25 writes the emulated image or the like in the virtual sensor 26 serving as a virtual sensor on a memory so that a photographed image is written in the image sensor. The virtual sensor 26 outputs the written image to a subsequent stage.

Figure 3:
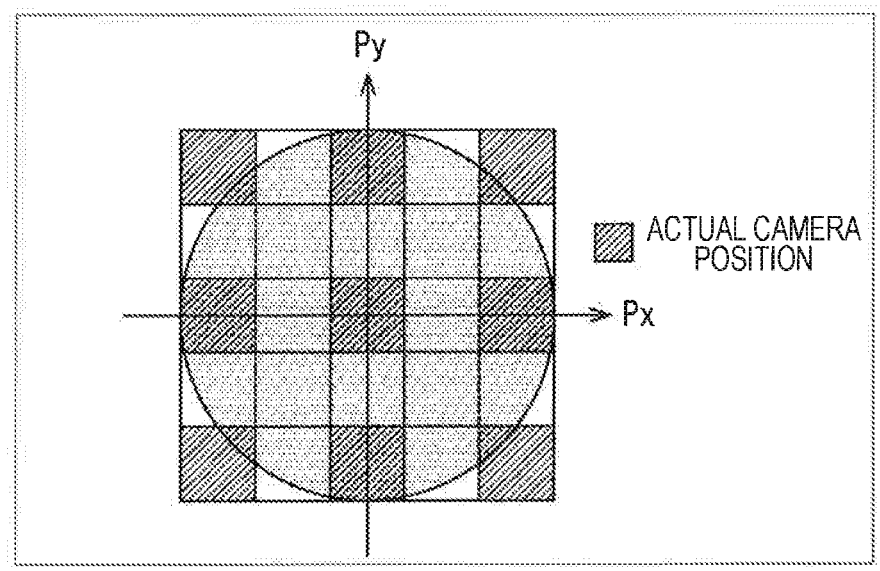
FIG. 3 is a diagram illustrating an example of a 25-viewpoint image.

FIG. 3 illustrates an example of a 25-viewpoint image generated by interpolating the 9-viewpoint image photographed by the camera array 21. Hatched rectangles indicate positions corresponding to images from the cameras 31-1 to 31-9, and the remaining rectangles indicate positions corresponding to images generated by the interpolation.

For example, as illustrated in FIG. 3, when viewpoint coordinates are indicated by (Px, Py), coordinates of the sensor (the virtual sensor 26) are indicated by (x,y), and a position of a disparity=D is focused without consideration of an aberration, an emulated image of reproducing a lens with a disparity of a disparity=K (x,y) is indicated by the following Formula (4):

[Mathematical Formula 4]

$$RefocusImage\ (x,\ y) = \sum_{\substack{Px=-2 \\ Py=-2}}^{\substack{Px=2 \\ Py=2}} ViewImages(Px,\ Py,\ x + Viewoffset\_x,\ y + Viewoffset\_y) \quad (4)$$

$$Viewoffset\_x = (D-K)*(Px)/2 \quad Viewoffset\_y = (D-K)*(Py)/2$$

On the other hand, when an aberration of a lens is reflected, an emulated image of reproducing the lens is indicated by the following Formula (5):

[Mathematical Formula 5]

$$RefocusImage\ (x,\ y) = \sum_{\substack{Px=-2 \\ Py=-2}}^{\substack{Px=2 \\ Py=2}} ViewImages(Px,\ Py,\ x + Viewoffset\_x + offset\_x, \quad (5)$$

$$y + Viewoffset\_y + offset\_y)$$

offset_x and offset_y are aberration terms

As described above, the aberration terms in Formula (5) can be calculated using a distance (disparity) of a subject from a viewpoint position (that is, a lens incident position) (Px.Py)/an in-focus plane/the coordinates (x,y) of the sensor (the virtual sensor 26) on the basis of design data of an actual lens.

[Description of Aberration]

Figure 4:
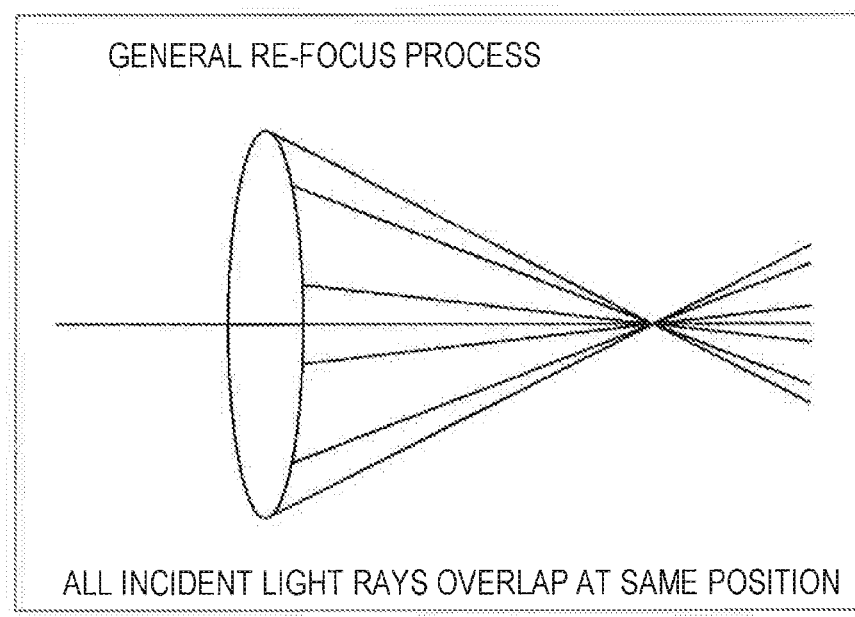
FIG. 4 is a diagram illustrating an example of a focus position of an ideal lens.
Figure 5:
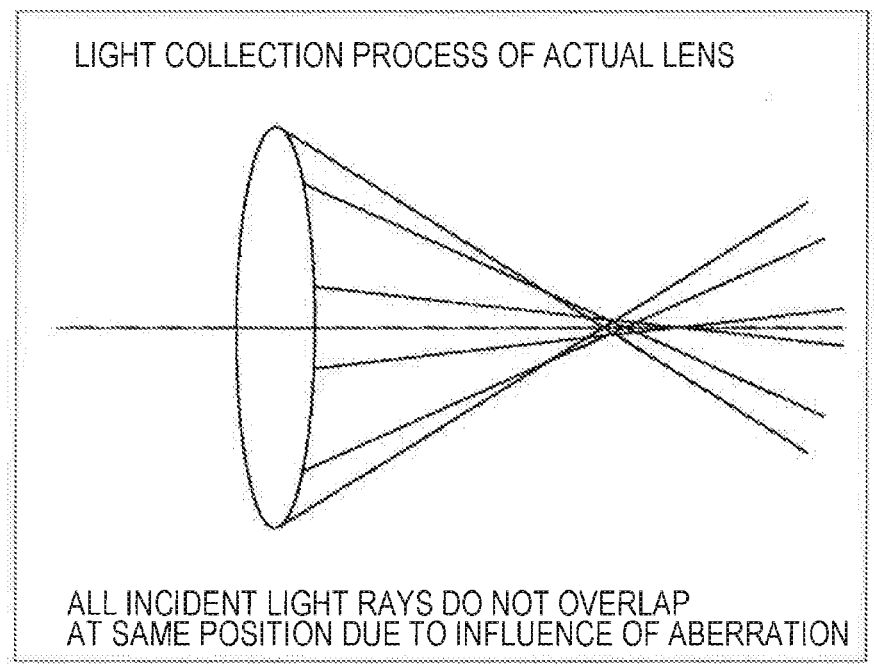
FIG. 5 is a diagram illustrating an example of a focus position of an actual lens.

FIG. 4 illustrates an example of a focus position in the case of an ideal lens, and FIG. 5 illustrates an example of a focus position in the case of an actual lens. In the examples of FIGS. 4 and 5, examples of spherical aberrations are illustrated.

In the case of the ideal lens, all incident light rays overlap at the same position as illustrated in FIG. 4.

On the other hand, the actual lens has an aberration, and due to influence of the aberration, all incident light rays do not overlap at the same position as illustrated in FIG. 5. Therefore, in the example of FIG. 5, it is understood that it is necessary to reproduce a lens aberration by apply an offset (that is, by changing a focus position) according to a lens position.

There are various kinds of aberrations which will be described later.

FIG. 6 is a diagram illustrating a table in which types of aberration and offset methods are summarized. In the example of FIG. 6, aberration characteristics and offset methods of representative aberrations are illustrated. In the offset methods, circles indicated for each viewpoint, each angle of view, or each color indicate that it is necessary to apply different offset amounts for each viewpoint, each angle of view, or each color.

The spherical aberration is an aberration in which due to a strong refraction action of a lens, a focus position deviates, and a focuses inside and outside a lens are different, and this aberration occurs on an axis as well. As the offset method for the spherical aberration, it is necessary to apply a different offset amount for each viewpoint position.

The coma aberration is an aberration that is caused by light input from a lens being tilted and more remarkably appears as it gets further from an axis. As the offset method for the coma aberration, it is necessary to apply a different offset amount for each viewpoint position and each angle of view (coordinates of a sensor).

An astigmatism is an aberration in which due to a manufacturing error or the like of a lens, a focused point of a vertical axis is different from a focused point of a horizontal axis, and focal distances at positions after passing through a lens are different. This aberration occurs on an axis as well. As the offset method for the astigmatism, it is necessary to apply a different offset amount for each viewpoint position, similarly to the spherical aberration.

A field curvature aberration is an aberration in which a plane on which an image is formed becomes an aspect. The aberration is remarkable at an off-axis position. As the offset method for the field curvature aberration, it is necessary to apply a different offset amount for each angle of view (coordinates of a sensor).

A distortion aberration is an aberration having a feature in which a focus is obtained for the entire surface, but a shape is distorted and photographed. As the offset method for the distortion aberration, practically, it is necessary to apply the offset amount for each angle-of-view position together after integration, but the offset amount may be applied for each angle of view (coordinates of a sensor) before integration.

An axial chromatic aberration is an aberration in which a valid focal distance differs according to a color since a refractive index differs according to a color. This aberration occurs on an axis as well. As the offset method for the axial chromatic aberration, it is necessary to perform the same offset method as the offset method for the spherical aberration of applying a different offset amount for each viewpoint position for each color.

A chromatic aberration of magnification is an aberration that occurs since a focal distance differs according to a color, and thus a magnification of a formed image differs. This aberration does not occur on an axis. As the offset method for the chromatic aberration of magnification, it is necessary to perform the same offset method as the offset method for the coma aberration of applying a different offset amount for each viewpoint position and each angle of view (coordinates of a sensor) for each color.

In other words, it is understood from the table of FIG. 6 that in many kinds of aberrations, it is necessary to change the offset amount according to the viewpoint (position), and in the two kinds of aberrations, it is necessary to change the offset amount to be applied according to the angle of view (position).

As described above, there are many kinds of aberrations of a lens, and there are also calculation formulas for them. However, practically, it is difficult to separate the aberrations and obtain individual aberrations. In this regard, in the present technology, a function of a lens is reproduced using point spread function (PSF) data including all the aberrations. The reproducing indicates reproducing, for example, bokeh of an image that is actually obtained by a lens as an image (that is, obtaining a reproduced image). Here, it is unnecessary to perfectly reproduce it physically and numerically.

In other words, all the aberrations are reflected in the PSF data such that all the aberrations are added. Using the PSF data, it is possible to acquire information about how spreading is performed when it passes through a point light source.

Figure 7:
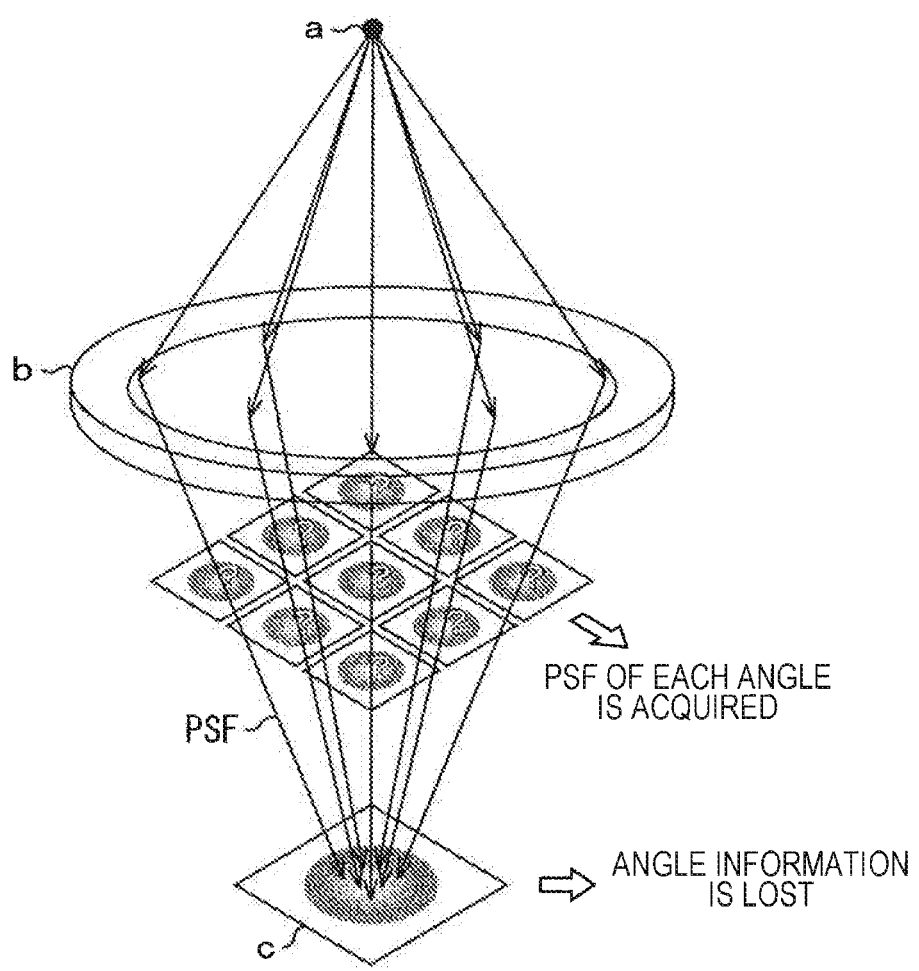
FIG. 7 is a diagram for describing a point spread function (PSF).

However, in simple PSF data, since light of one point of a point light source a spread through a lens b is observed through an integration effect such as one point of a sensor c as illustrated in FIG. 7, angle information is lost, and it is difficult to acquire the information. When there is no angle information, it is difficult to obtain the offset amount of the aberration.

In this regard, in the present technology, for example, PSF data of each angle, that is, each viewpoint position before integration is acquired on the basis of an aperture (a filter) or the like and used.

Accordingly, it is possible to acquire information about the offset amount indicating an amount of an offset to be applied for each viewpoint position. In other words, it is possible to acquire data used for adjusting the lens aberration. It is practically difficult to divide the offset amount, but the offset amount that differs according to the viewpoint (position) and the offset amount that differs according to the angle of view (position) are included in the offset amount.

Thus, the light collection processing unit 25 can perform a light collection process in which the offset amount according to the viewpoint (position) and the offset amount according to the angle of view (position) are reflected by applying the offset amount for each viewpoint position as the data used for adjusting the lens aberration using the PSF data of each viewpoint position and performing a light collection process. As a result, the light collection process of reproducing the lens aberration can be performed.

In detail, the disparity amount described above is also included in the offset amount obtained on the basis of the PSF data of each viewpoint position. Simple PSF data is three-dimensional (3D) data since there is no concept of each viewpoint of a lens. On the other hand, the PSF data of each viewpoint position according to the present technology includes the information of the viewpoint position and thus is five-dimensional (5D) data.

As described above, the light ray tracing unit 24 generates the PSF data of each viewpoint (position) which is used in the light collection processing unit 25 at a subsequent stage. In this case, the light ray tracing unit 24 has a configuration illustrated in FIG. 8.

Figure 8:
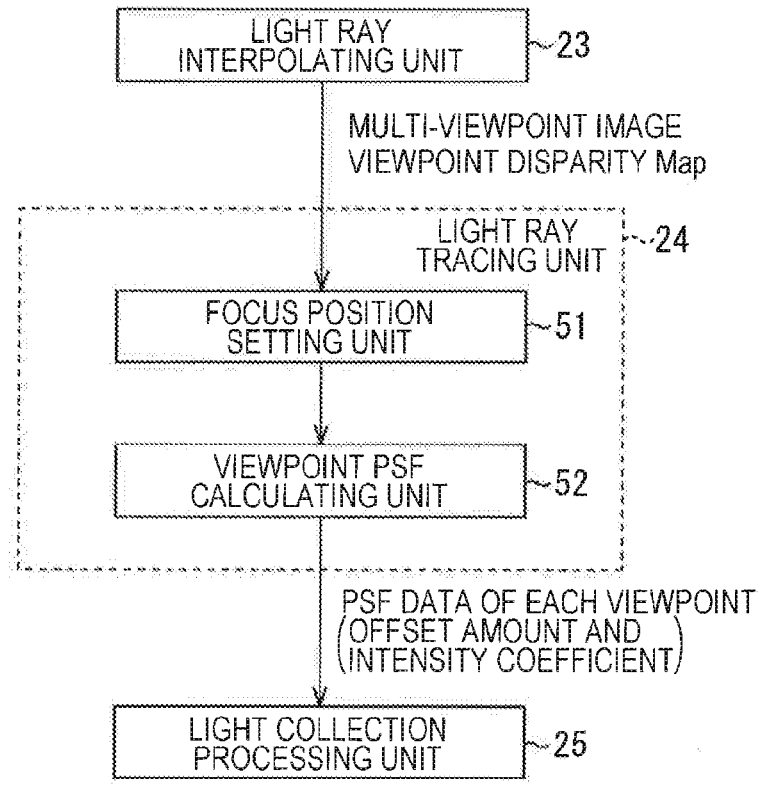
FIG. 8 is a diagram illustrating an exemplary functional configuration of a light ray tracing unit when viewpoint PSF data is used.

FIG. 8 is a block diagram illustrating an exemplary functional configuration of the light ray tracing unit 24 when viewpoint PSF data is used.

The light ray tracing unit 24 is configured to include a focus position setting unit 51 and a viewpoint PSF calculating unit 52.

The focus position setting unit 51 sets a focus position on the basis of the viewpoint image that has undergone the interpolation by the light ray interpolating unit 23 and each disparity. The focus position setting unit 51 supplies the set focus position, the viewpoint image, and the disparity map to the viewpoint PSF calculating unit 52.

The viewpoint PSF calculating unit 52 converts each disparity map into a map of the depth Z. Then, the viewpoint PSF calculating unit 52 obtains the viewpoint position on the basis of each viewpoint image that has undergone the interpolation by the light ray interpolating unit 23, the map of each depth Z, and the focus position, and generates (sets) the PSF data of each viewpoint on the basis of the viewpoint position. Here, the PSF data is the point spread function, and an offset amount for a lens (aberration) and an intensity coefficient for a lens (aberration) of each viewpoint can be obtained on the basis of the PSF data of each viewpoint.

The viewpoint PSF calculating unit 52 supplies the obtained PSF data of each viewpoint (that is, the offset amount and the intensity coefficient) to the light collection processing unit 25.

In this case, the light collection processing unit 25 integrates the PSF data of the respective viewpoints and writes the integrated data in the virtual sensor 26 as the emulated image. Formulas (4) and (5) indicate a relation between the ideal lens and the actual lens. When the focus position is set, a shift amount is described in the PSF data in a form of "Viewoffset+offset" of Formula (5). In other words, the light collection processing unit 25 shifts the incident light rays according to the PSF data of each viewpoint, applies the intensity coefficient to a current brightness, and causes the light rays to drop onto the virtual sensor 26.

[Example of Process]

Figure 9:
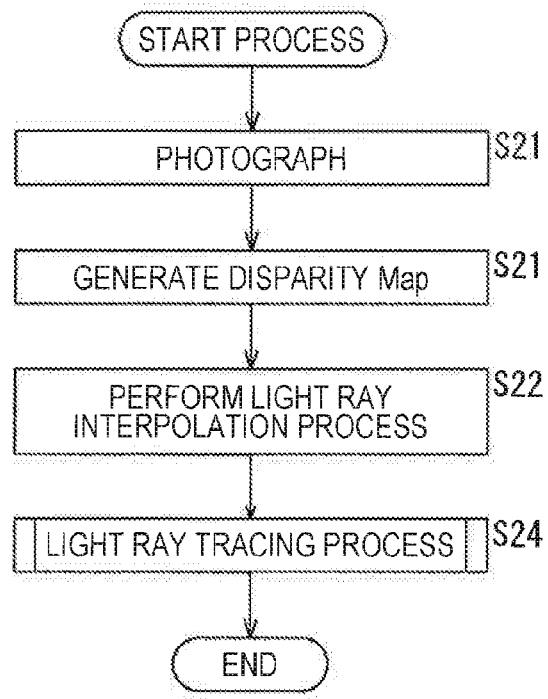
FIG. 9 is a flowchart for describing a process of an imaging device.

Next, a process of the imaging device 11 will be described with reference to a flowchart of FIG. 9.

In step S21, the cameras 31-1 to 31-9 image a subject. The viewpoint images from the cameras 31-1 to 31-9 are input to the depth estimating unit 22.

In step S22, the depth estimating unit 22 performs the depth estimation using the input viewpoint images, calculates the disparity (the pixel deviation amount) between the multi-viewpoint images, and generates the disparity maps. The depth estimating unit 22 supplies the disparity maps to the light ray interpolating unit 23 as the multi-viewpoint disparity maps together with the multi-viewpoint images.

In step S23, the light ray interpolating unit 23 regards the cameras 31 arranged on the 2D plane as a synthetic aperture diameter and performs an interpolation process on light rays incident on the synthetic aperture diameter according to each viewpoint image and each disparity map. The light ray interpolating unit 23 supplies a group of interpolated light rays (an interpolated multi-viewpoint image and a disparity) to the light ray tracing unit 24.

In step S24, the light ray tracing unit 24 and the light collection processing unit 25 perform the light ray tracing process on the multi-viewpoint image that has undergone the interpolation by the light ray interpolating unit 23. The light ray tracing process will be described in detail with reference to FIG. 10, and through the process of step S24, the emulated image serving as the light ray tracing result is written in the virtual sensor 26.

Figure 10:
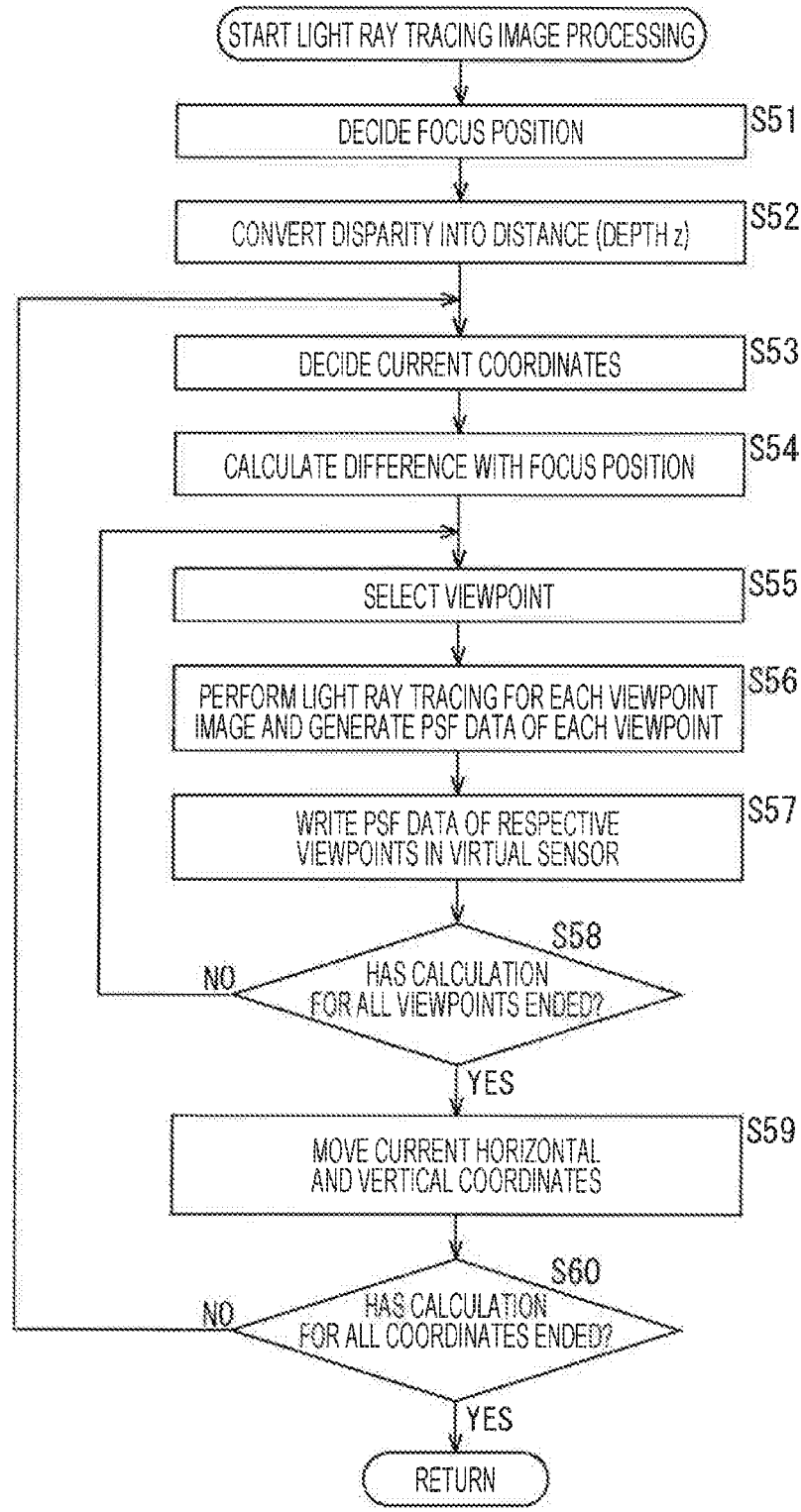
FIG. 10 is a flowchart for describing a light ray tracing process.

Next, the light ray tracing process of step S24 in FIG. 9 will be described with reference to a flowchart of FIG. 10. At this time, the light ray tracing unit 24 has the functional configuration described above with reference to FIG. 8.

In step S51, the focus position setting unit 51 sets the focus position on the basis of the viewpoint image that has undergone the interpolation by the light ray interpolating unit 23 and each disparity. The focus position setting unit 51 supplies the set focus position, the viewpoint image, and the disparity map to the viewpoint PSF calculating unit 52.

In step S52, the viewpoint PSF calculating unit. 52 converts each disparity map into the map of the depth Z. In step S53, the viewpoint PSF calculating unit 52 decides the current coordinates (x,y) on the virtual sensor 26.

In step S54, the viewpoint PSF calculating unit 52 calculates a difference between the disparity and the focus position decided in step S51 for the current coordinates with reference to the disparity map.

In step S55, the viewpoint PSF calculating unit 52 selects a viewpoint position (u,v). In other words, here, selecting and changing a viewpoint (position) means changing a predicted position.

In step S56, the viewpoint PSF calculating unit 52 performs light ray tracing for each viewpoint image that has undergone the interpolation by the light ray interpolating unit 23, and generates the PSF data of each viewpoint. In other words, the viewpoint PSF calculating unit 52 generates the PSF data of each viewpoint on the basis of the position (x,y) on the sensor, each viewpoint image, the map of each depth Z, a position (u,v) of the selected viewpoint, and the like.

The viewpoint PSF calculating unit 52 supplies the obtained PSF data of each viewpoint (that is, the offset amount and the intensity coefficient) to the light collection processing unit 25.

In step S57, the light collection processing unit 25 integrates the PSF data of the respective viewpoints and writes the integrated data in the virtual sensor 26 as the emulated image. In other words, the light collection processing unit 25 shifts the incident light rays according to the PSF data of each viewpoint, applies the intensity coefficient to a current brightness, and causes the light rays to drop onto the virtual sensor 26.

In step S58, the viewpoint PSF calculating unit 52 determines whether or not the calculation for all the viewpoints has ended. When the viewpoint calculation is determined not have ended yet in step S58, the process returns to step S55, and the subsequent process is repeated.

When the calculation for all the viewpoints is determined to have ended in step S58, the process proceeds to step S59. In step S59, the viewpoint PSF calculating unit 52 moves current horizontal and vertical coordinates. In step S60, it is determined whether or not a calculation for all coordinates has ended.

When the calculation for all coordinates is determined not to have ended yet in step S60, the process returns to step S53, and the subsequent process is repeated. When the calculation for all coordinates is determined to have ended in step S60, the light ray tracing process ends.

The above-described processes are repeated for all coordinates, and thus the emulated images are accumulated on the virtual sensor 26.

As described above, it is possible to acquire the offset amount and the intensity coefficient of each viewpoint using the PSF data of each viewpoint (position). Accordingly, it is possible to reproduce optical information processing of a lens. In other words, it is possible to generate bokeh specific to a lens.

In the reproduction, the offset amount of the aberration and the intensity coefficient according to the viewpoint (position) and the offset amount of the aberration and the intensity coefficient according to the angle of view (position) are additionally considered for viewpoint position.

Further, in the actual lens, bokeh of a large diameter that is difficult to manufacture can be also emulated through the present technology. As a precondition, it is necessary to install an emulation lens having a larger diameter so that the cameras 31 of FIG. 2 correspond to the diameter.

The present technology can be applied to a multi-viewpoint image-used service platform to be described below or the like. In other words, the PSF data of each viewpoint position serving as the data used for adjusting the lens aberration in the first embodiment is used in, for example, a service to be described below as profile information (including the PSF data), server management information or metadata.

<2. Second Embodiment>
<Multi-viewpoint Image-used Service Platform>

Figure 11:
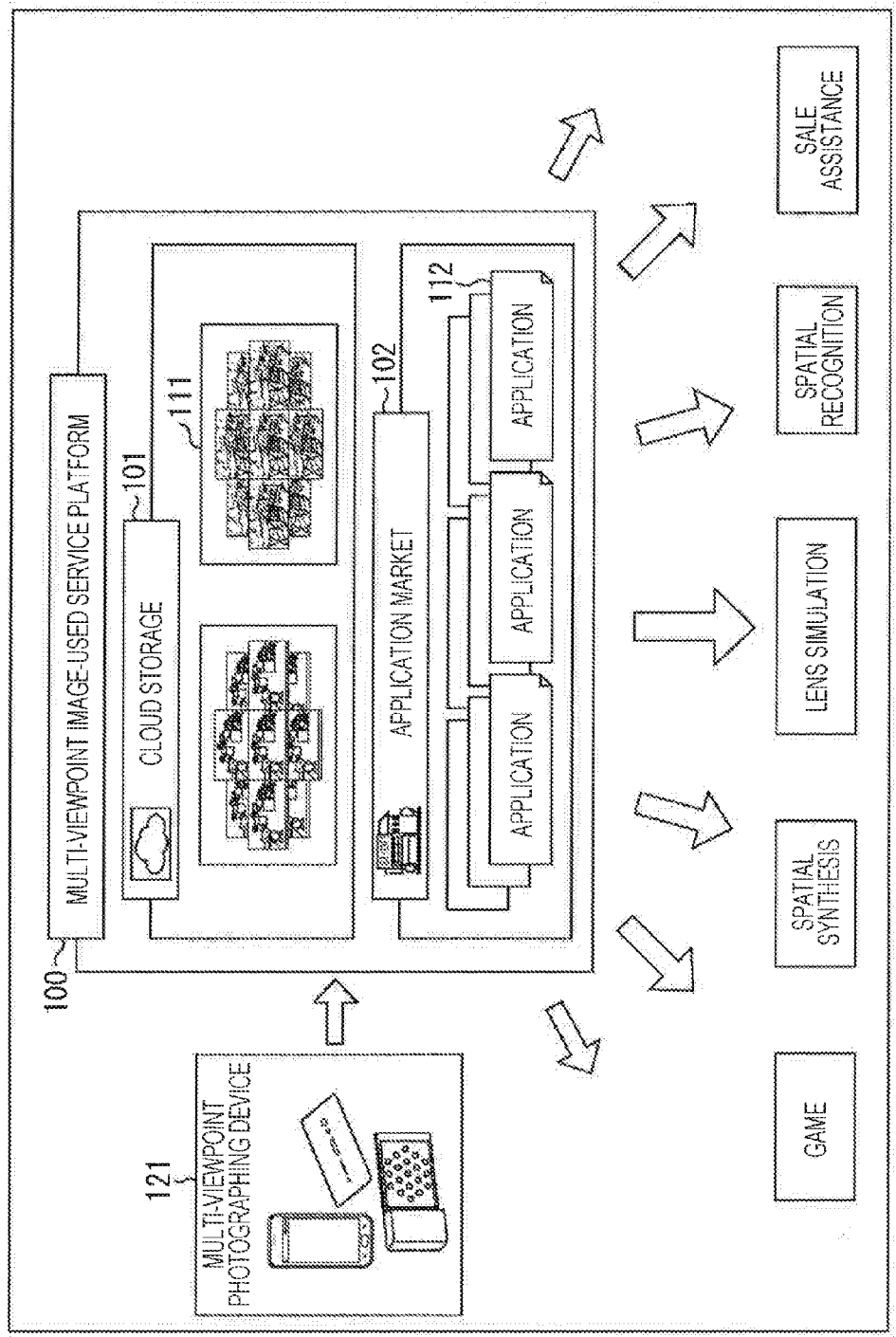
FIG. 11 is a diagram for describing an example of a multi-viewpoint image-used service platform.

FIG. 11 is a diagram for describing an example of the multi-viewpoint image-used service platform. A multi-viewpoint image-used service platform 100 illustrated in FIG. 11 is a fundamental configuration and environment in which a service using a multi-viewpoint image configured with a plurality of images that differ in a viewpoint is provided to the user. The multi-viewpoint image-used service platform 100 has, for example, functions such as a cloud storage 101 and an application market 102.

The cloud storage 101 is a service of storing and managing multi-viewpoint image data 111 serving as data of the multi-viewpoint image. For example, the user registered in the multi-viewpoint image-used service platform operates a multi-viewpoint photographing device 121 to photograph a subject, and obtains a plurality of photographed images that differ in a viewpoint as the multi-viewpoint image. Then, the user operates the multi-viewpoint photographing device 121 to supply the multi-viewpoint image data to the multi-viewpoint image-used service platform 100. The cloud storage 101 stores the supplied multi-viewpoint image data and manages the multi-viewpoint image data for each user.

The cloud storage 101 can generate data related to the multi-viewpoint image data on the basis of the multi-viewpoint image data or the like as necessary and manage the generated data. Further, the cloud storage 101 can provide the managed multi-viewpoint image data to a terminal device operated by the user or an application which will be described later according to a request from the user or the like together with the data related to the multi-viewpoint image data as necessary. For example, the PSF data of each viewpoint position serving as the data used for adjusting the lens aberration according to the first embodiment may be included in the data related to the multi-viewpoint image data.

The application market 102 performs a service of performing a certain process using the multi-viewpoint image data, provides or sells to the user an application 112 of providing the service using the multi-viewpoint image to the user or executes the application 112. In other words, the application 112 may be executed by the multi-viewpoint image-used service platform 100 or may be executed in the terminal device.

As the application 112 is executed, various convenient services such as a game, spatial synthesis, a lens simulation, spatial recognition, sale assistance, and the like in which the multi-viewpoint image is used are provided to the user.

Figure 12:
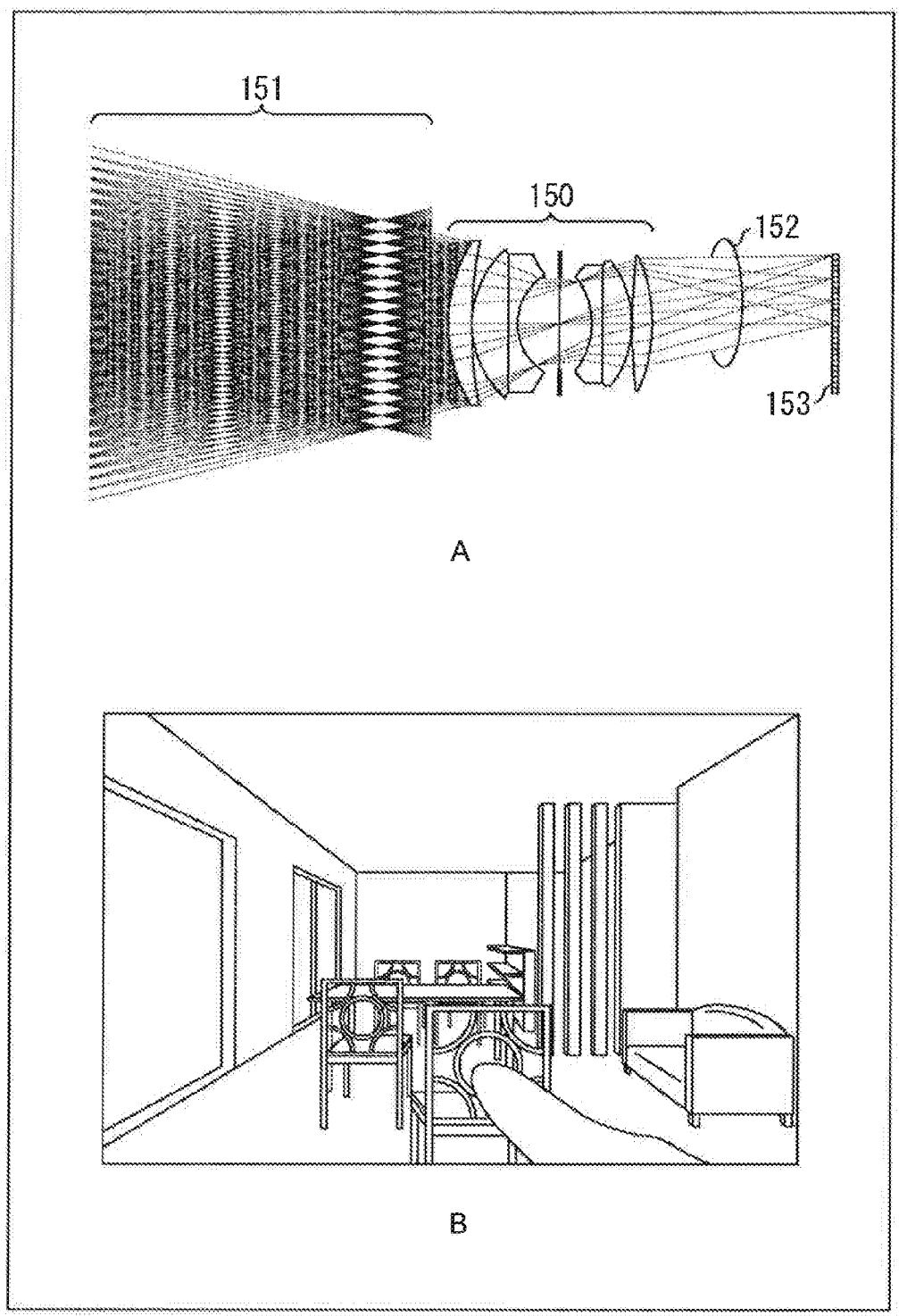
FIG. 12 is a diagram for describing an example of an application using a multi-viewpoint image.

The service provided by the application 112 can be any service as long as the service uses the multi-viewpoint image. For example, the lens simulation is a service of simulating (simulatively realizing) a virtual optical system and, using the multi-viewpoint image, generating a virtual photographed image obtained by photographing a subject using the virtual optical system. In this case, for example, the application 112 sets a virtual lens 150 illustrated in A of FIG. 12, and simulates (simulatively realizes), for example, a light ray vector 151 serving as incident light from a subject which is incident on the virtual lens 150, a light ray vector 152 serving as incident light that has passed through the virtual lens 150, and a virtual image sensor 153 that obtains a virtual photographed image on the basis of the light ray vector 152. At this time, for example, the application 112 generates the virtual photographed image from the multi-viewpoint image on the basis of the above-described simulation, and provides the virtual photographed image to the user. The application 112 can select or sell the virtual lens 150 to be set as well.

At this time, for example, the application 112 may be associated with the PSF data of each viewpoint position serving as the data used for adjusting the lens aberration according to the first embodiment. At this time, the virtual image sensor or the like is simulated on the basis of the PSF data of each viewpoint position. In this case, the same effects as the effects of the first embodiment can be obtained. In other words, it is possible to provide the virtual photographed image in which optical information process ing of a lens is reproduced, and bokeh specific to a lens is generated.

Since the virtual lens can be set through the lens simulation, an optical system of any specification can be simulated. In other words, the lens simulation can be performed for both a realistic optical system and an unrealistic optical system. Thus, as such a service is provided, the user can reproduce photographed images obtained by various optical systems. For example, the user can easily obtain a photographed image using an optical system of a larger diameter than an optical system that obtains photographed images constituting the multi-viewpoint image through such a lens simulation. For example, the user can more easily obtain, for example, a higher-resolution image, an image having a wider field of view, and an image in which an angle of view is narrower, and a focal distance is longer than the images of the multi-viewpoint image through such a lens simulation. Further, for example, the user can easily obtains a photographed image using a luxury lens and a photographed image using an unrealistic optical system through such a lens simulation. In other words, the user can obtain various photographed image at a low cost.

For example, the profile information used in the lens simulation can be associated with the PSF data of each viewpoint position serving as the data used for adjusting the lens aberration according to the first embodiment. In this case, the same effects as the effects of the first embodiment can be obtained. In other words, it is possible to reproduce optical information processing of a lens and generate bokeh specific to a lens.

For example, the sale assistance is a service of assisting the sale of products using the multi-viewpoint image. Any product or any method may be used as a product to be sold or an assistance method. For example, it may be a service in which a product to be sold is furniture, and a furniture image is virtually arranged in a photographed image as illustrated in B of FIG. 12. In this case, the application 112 generates a generates a photographed image by causing the photographed images of the multi-viewpoint image to be superimposed, arranges the furniture image on the photographed image using three-dimensional modeling data (also referred to as "3D modeling data") and depth data indicating a distance to a subject in the multi-viewpoint image, and provides a synthetic image to the user. The application 112 sets furniture to be arranged and a position thereof on the basis of an operation of the user.

Through such a service, for example, the user can photograph his/her room and arrange the furniture image at a desired position on the photographed image (that is, an image of his/her room). Thus, the user can more accurately imagine a layout before the purchase. In other words, through such a service, it is possible to reduce anxiety of the user before the purchase such as "purchased furniture may not be unstable to be installed in his/her room" or "purchased furniture may not fit with his/her room," and it is possible to improve the user's willingness to buy. In other words, the application 112 can assist the sale of furniture.

As described above, the multi-viewpoint image-used service platform 100 can, not only simply generate one image from the multi-viewpoint image and provide one image but also manage data related to the user or the multi-viewpoint image and perform the sale of an application or provision of a service using an application, and thus it is possible to provide various services highly convenient to the user. In other words, the multi-viewpoint image-used service platform 100 can improve the convenience of the service using the multi-viewpoint image.

Further, the PSF data of each viewpoint position serving as the data used for adjusting the lens aberration according to the first embodiment is included in the managed data related to the user or the multi-viewpoint, image, and thus the same effects as the effects of the first embodiment can be obtained. In other words, a quality of an image to be provided to the user can be improved, for example, it is possible to reproduce optical information processing of a lens and generate bokeh specific to a lens.

In the above example, the multi-viewpoint image includes a plurality of photographed images, but the number of images constituting the multi-viewpoint image is arbitrary. All or some of the images constituting the multi-viewpoint image or a part or all of each image may be an unrealistic image such as a computer graphic image that is artificially drawn (that is, the multi-viewpoint image may include an image other than a photographed image).

The terminal device to which the multi-viewpoint image-used service platform 100 provides the service may be the multi-viewpoint photographing device 121 operated by the user who is the owner of the multi-viewpoint image, may be a terminal device other than the multi-viewpoint photographing device 121 operated by the user, or may be a terminal device operated by another user who gets a permission to use the multi-viewpoint image from the user.

Further, a physical configuration of the multi-viewpoint image-used service platform 100 is arbitrary. For example, the multi-viewpoint image-used service platform 100 may be configured with one server or may be configured with a plurality of servers. For example, the multi-viewpoint image-used service platform 100 may have a configuration of cloud computing in which all or some of the functions of the multi-viewpoint image-used service platform 100 are shared and jointly processed by a plurality of devices via a network. Further, all or some of the functions of the multi-viewpoint image-used service platform 100 may be executed in the terminal device.

An example of a service provided by the multi-viewpoint image-used service platform 100 will be described below in detail.

<3. Third Embodiment>
<Management of Multi-viewpoint Image>

As described above in the second embodiment, the multi-viewpoint image-used service platform 100 has, for example, the function of the cloud storage 101 and provides a service of storing and managing the multi-viewpoint image data. The present embodiment will be described in connection with management of the multi-viewpoint image.

<Multi-viewpoint Image-used Service Provision System>

Figure 13:
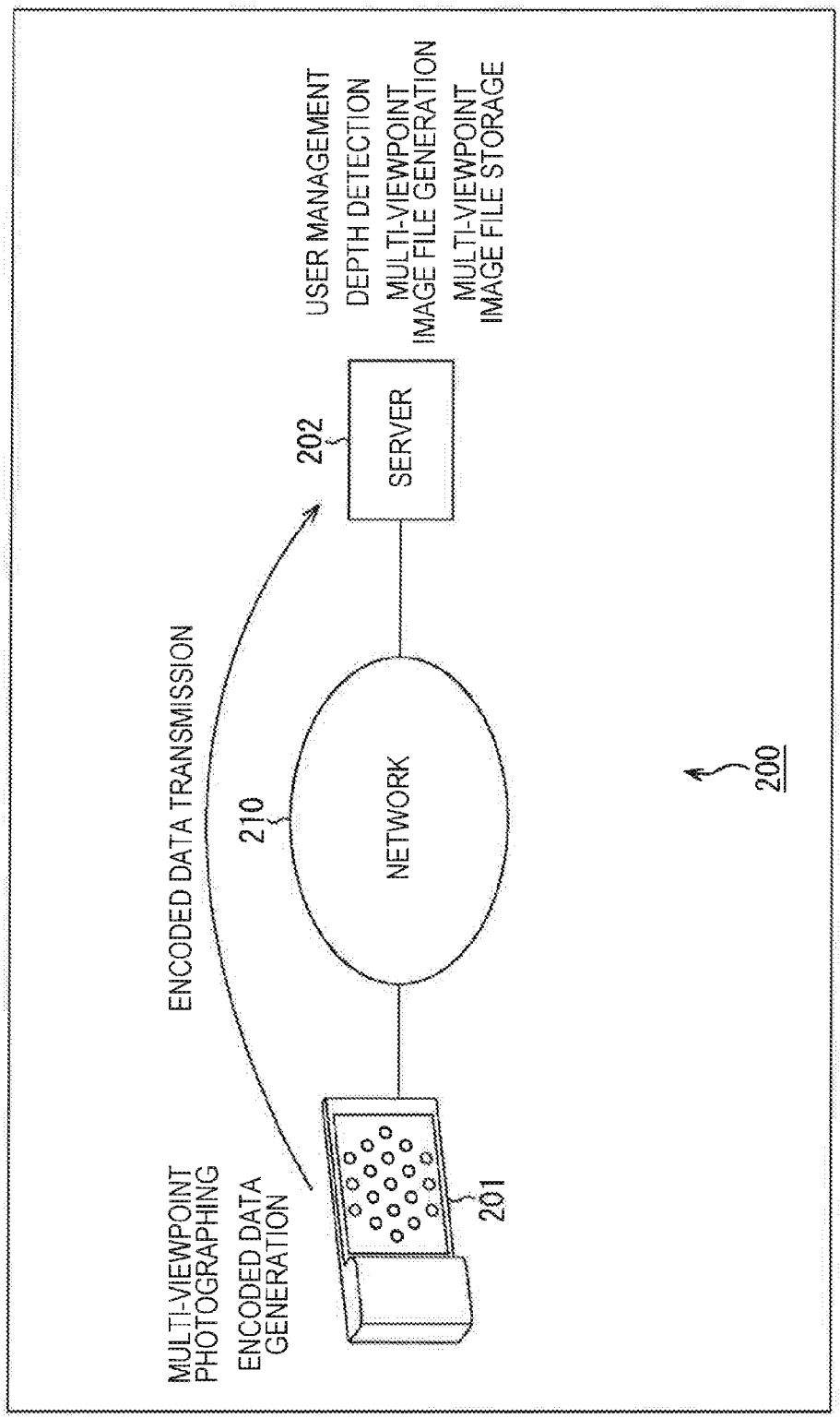
FIG. 13 is a diagram illustrating an example of a main configuration of a multi-viewpoint image-used service provision system.

FIG. 13 is a diagram illustrating an example of a main configuration of a multi-viewpoint image-used service provision system. A multi-viewpoint image-used service provision system 200 illustrated in FIG. 13 is an example of a system to which the present technology is applied, that is, a system in which a server 202 provides a service using the multi-viewpoint image to a terminal device 201 connected via a network 210. In other words, the multi-viewpoint image-used service provision system 200 is an example of a configuration of implementing the multi-viewpoint image-used service platform 100.

FIG. 13 illustrates an example of a configuration related to provision of a service related to management of the multi-viewpoint images among the services provided by the multi-viewpoint image-used service platform 100. Referring to FIG. 13, the multi-viewpoint image-used service provision system 200 includes the terminal device 201 and the server 202 connected to the network 210.

For example, the network 210 is an arbitrary network such as the Internet or a local area network (LAN). The network 210 includes one or more networks configured with either or both of a wired network and a wireless network. The terminal device 201 and the server 202 are connected to the network 210 in a wired or wireless manner.

The terminal device 201 performs multi-viewpoint photographing of obtaining the multi-viewpoint image configured with a plurality of photographed images that differ in a viewpoint by photographing the subject. Then, the terminal device 201 encodes the multi-viewpoint image data and generates multi-viewpoint encoded data. The terminal device 201 transmits the generated multi-viewpoint encoded data to the server 202.

The server 202 manages the users that are registered in advance. The server 202 acquires the transmitted multi-viewpoint image encoded data, detects the depth of the multi-viewpoint image, and generates depth data. Further, for example, the server 202 may have the function of the imaging device 11 according to the first embodiment. In this case, the server 202 generates the PSF data of each viewpoint position serving as the data used for adjusting the lens aberration. Further, the server 202 generates the multi-viewpoint image file by converting the data related to the multi-viewpoint image (including the PSF data of each viewpoint position) into a file. Then, the server 202 stores (holds) and manages the generated multi-viewpoint image file. The multi-viewpoint image file managed by the server 202 is associated with the terminal device 201 or an associated application and provided to the terminal device 201 or an associated application as necessary.

<Terminal Device>

Figure 14:
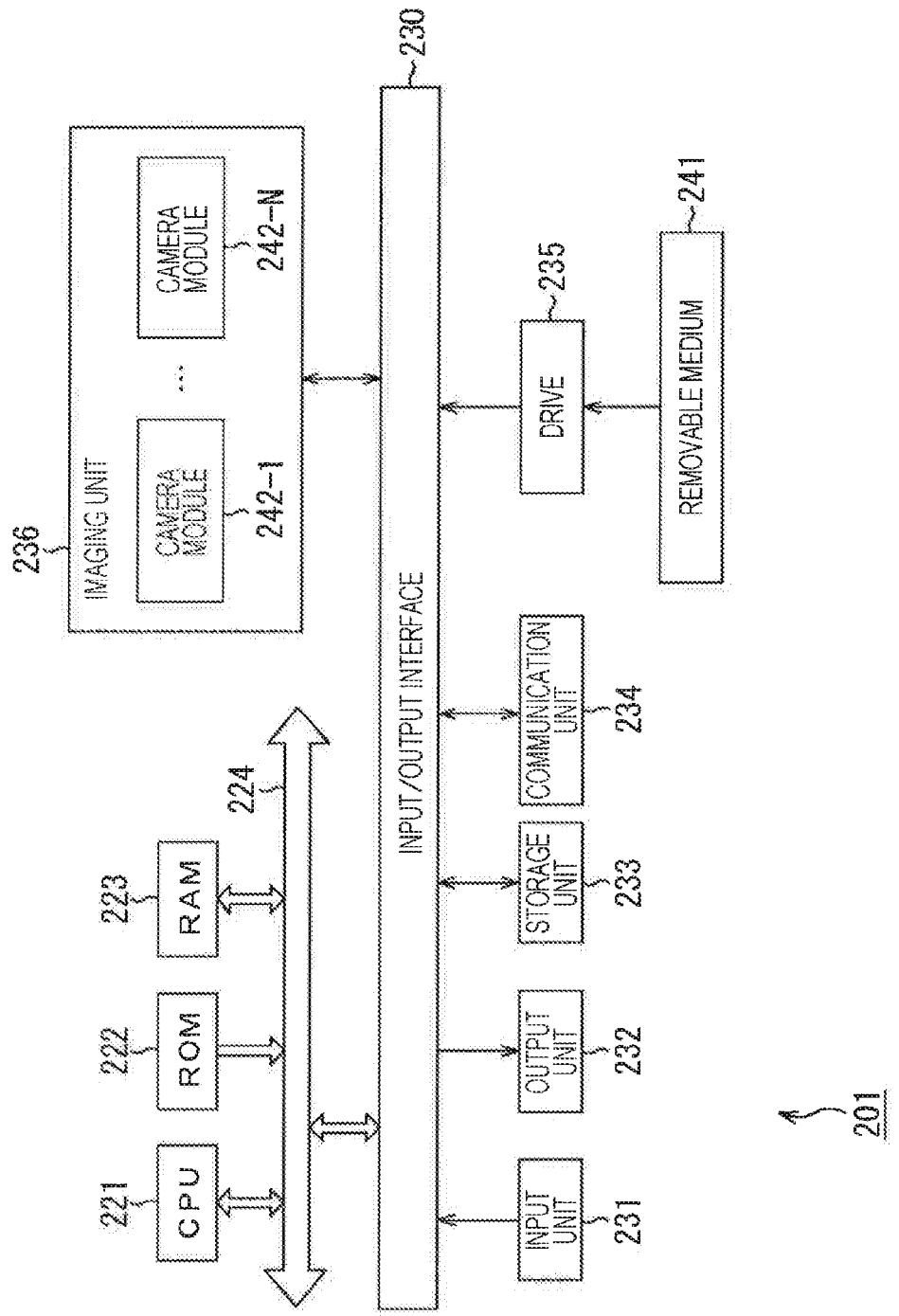
FIG. 14 is a diagram illustrating an example of a main configuration of a terminal device.

FIG. 14 is a block diagram illustrating an exemplary main configuration of the terminal device 201. As illustrated in FIG. 14, in the terminal device 201, a Central Processing Unit (CPU) 221, a Read Only Memory (ROM) 222, and a Random Access Memory (RAM) 223 are connected to one another via a bus 224.

An input/output interface 230 is also connected to the bus 224. An input unit 231, an output unit 232, a storage unit 233, a communication unit 234, and a drive 235 are connected to the input/output interface 230.

The input unit 231 is configured with an input device that receives external information such as a user input. Examples of the input unit 231 include an operation button, a touch panel, a microphone, and an input terminal. Further, various kinds of sensors such as an acceleration sensor, an optical sensor, and a temperature sensor may be included in the input unit 231. The output unit 232 is configured with an output device that outputs information such as an image or a sound. Examples of the output unit 232 include a display, a speaker, and an output terminal.

The storage unit 233 is configured with, for example, a hard disk, a RAM disk, or a non-volatile memory. The communication unit 234 is, for example, configured with a network interface. The drive 235 drives a removable medium 241 such as a magnetic disk, an optical disk, a magneto optical disk, or a semiconductor memory.

For example, the CPU 221 performs various kinds of processes by loading a program stored in the storage unit 233 onto the RAM 223 via the input/output interface 230 and the bus 224 and executing the program. The RAM 223 appropriately stores data or the like which is necessary in executing various kinds of processes through the CPU 221.

For example, the program executed by the CPU 221 may be stored in, for example, the removable medium 241 serving as a package medium and provided to the terminal device 201. In this case, the program may be installed in the storage unit 233 via the input/output interface 230 from the removable medium 241 mounted in the drive 235.

The program may be provided to the terminal device 201 via a wired or wireless transmission medium such as a LAN, the Internet, or digital satellite broadcasting. In this case, the program may be received through the communication unit 234 via a wired or wireless transmission medium and installed in the storage unit 233.

Besides, the program may be installed in the ROM 222 or the storage unit 233 in advance.

Further, an imaging unit 236 is connected to the input/output interface 230. The imaging unit 236 is controlled by, for example, the CPU 221, and performs multi-viewpoint photographing of obtaining the multi-viewpoint image configured with a plurality of photographed images that differ in a viewpoint by photographing the subject. The imaging unit 236 includes camera modules 242-1 to 242-N. N is any integer of 2 or more. The camera modules 242-1 to 242-N are modules that have a similar configuration and perform a similar process. Hereinafter, when it is unnecessary to distinguish the camera modules 242-1 to 242-N, they are referred to simply as a "camera module 242."

Figure 15:
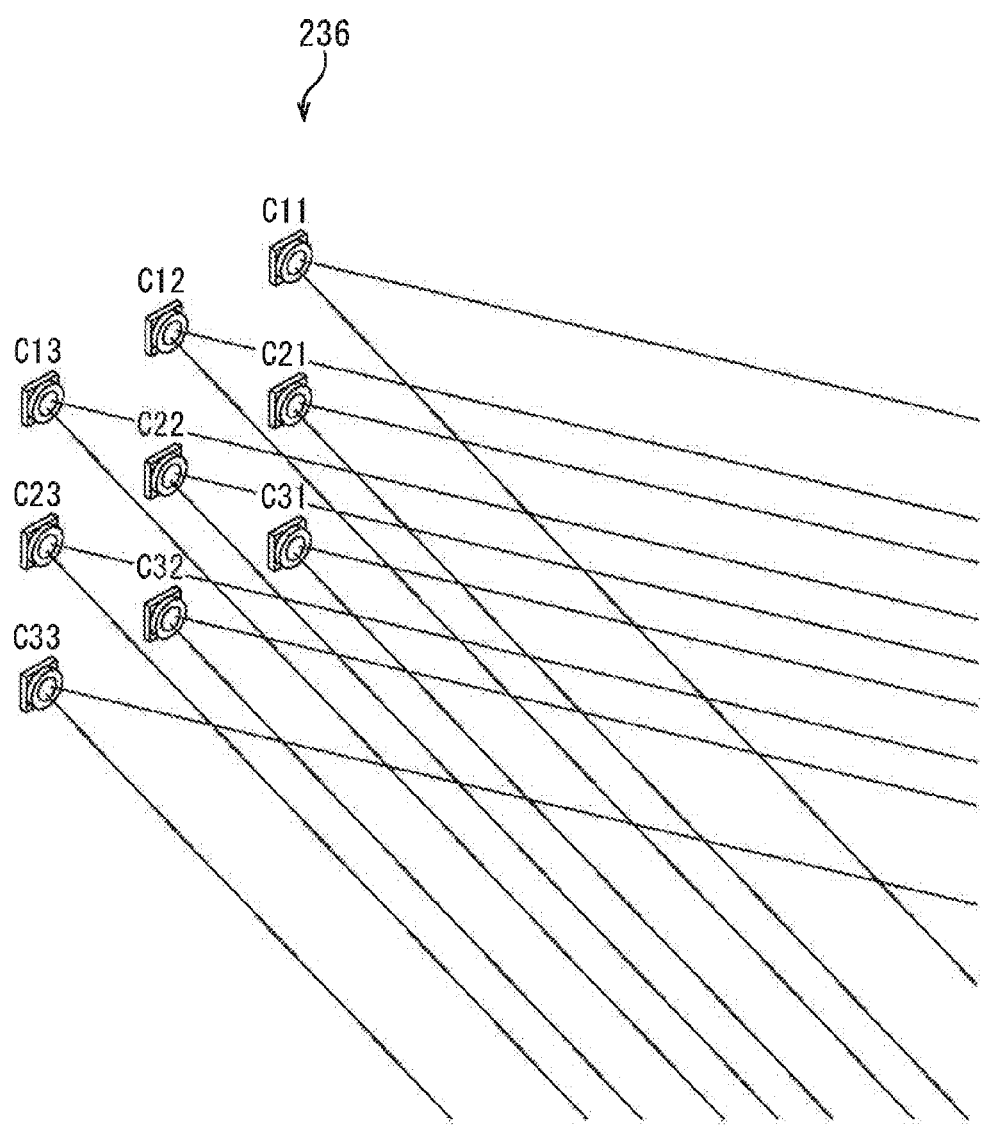
FIG. 15 is a diagram for describing an overview of an imaging unit.

The camera module 242 is a module that has an optical system including an image sensor (an imaging element) and obtains a photographed image by photographing a subject. The camera modules 242 are arranged at different positions on a flat surface or a curved surface such as C11, C12, C13, C21, C22, C23, C31, C32, and C33 illustrated in FIG. 15 and have different viewpoints. In other words, the camera modules 242-1 to 242-N obtain photographed images of different viewpoints by photographing the subject.

The imaging unit 236 is controlled by the CPU 221 and obtains N (a plurality of) photographed images of different viewpoints by photographing the subject using the camera modules 242-1 to 242-N. The imaging unit 236 obtains a plurality of photographed images as the multi-viewpoint image (the multi-viewpoint image data). In other words, the imaging unit 236 performs the multi-viewpoint photographing using the camera modules 242.

The imaging unit 236 is controlled by the CPU 221, and supplies the obtained multi-viewpoint image data to the CPU 221 or the RAM 223 via the input/output interface 260, the bus 224, or the like, supplies the obtained multi-viewpoint image data to the storage unit 233 via the input/output interface 260 so that the multi-viewpoint image data is stored, supplies the obtained multi-viewpoint image data to the output unit 232 so that the multi-viewpoint image data is output, or supplies the obtained multi-viewpoint image data to the communication unit 234 so that the multi-viewpoint image is supplied to the outside.

The camera modules 242 may or may not be the same in an angle of view or a photographing direction. For example, either or both of the angle of views and the photographing directions of some camera modules 242 may be different from those of the other camera modules 242. For example, the angle of views and the photographing directions of all of the camera modules 242 may be different from one another. However, as will be described later, the multi-viewpoint photographed images are superimposed on one another to generate an image, and thus it is desirable to cause imaging ranges of the camera modules 242 (that is, subjects of the camera modules 242) to overlap at least partially.

In the multi-viewpoint photographing, the camera modules 242 may or may not be the same in a photographing condition such as a photographing timing, light exposure, a diaphragm. The multi-viewpoint image obtained by the multi-viewpoint photographing (the photographed images constituting the multi-viewpoint image) may be a still image or may be a moving image.

The imaging unit 236 may be installed in a housing of the terminal device 201 as one of the components of the terminal device 201 in manufacturing or may be configured as a module that is separate from the terminal device 201 and connectable to the terminal device 201. For example, the imaging unit 236 may be an external terminal attached component that is connected to an external of the terminal device 201 or the like and operates under control of the terminal device 201. The imaging unit 236 may be an independent device which is separate from the terminal device 201. For example, the imaging unit 236 may be an imaging device which is separate from the terminal device 201 such as a camera and may be connected to the terminal device 201 via wired or wireless communication and supply the multi-viewpoint image obtained by the multi-viewpoint photographing to the terminal device 201.

<Server>

Figure 16:
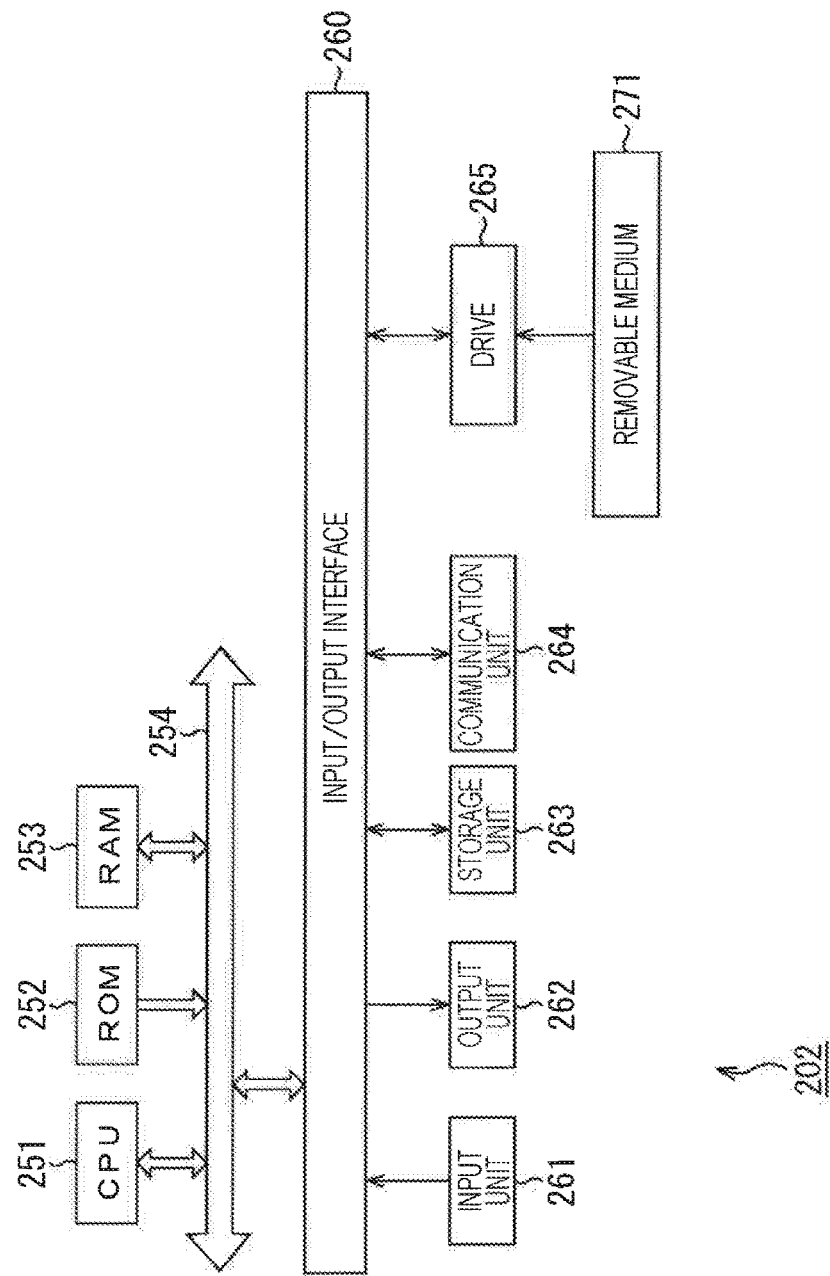
FIG. 16 is a diagram illustrating an example of a main configuration of a server.

FIG. 16 is a block diagram illustrating an exemplary main configuration of the server 202. In the server 202, a CPU 251, a ROM 252, and a RAM 253 are connected to one another via a bus 254 as illustrated in FIG. 16.

An input/output interface 260 is also connected to the bus 254. An input unit 261, an output unit 262, a storage unit 263, a communication unit 264, and a drive 265 are connected to the input/output interface 260.

The input unit 261 is configured with an input device that receives external information such as a user input. Examples of the input unit 261 include an operation button, a touch panel, a microphone, a camera, and an input terminal. Further, various kinds of sensors such as an acceleration sensor, an optical sensor, and a temperature sensor may be included in the input unit 261. The output unit 262 is configured with an output device that outputs information such as an image or a sound. Examples of the output unit 262 include a display, a speaker, and an output terminal.

The storage unit 263 is configured with, for example, a hard disk, a RAM disk, or a non-volatile memory. The communication unit 264 is, for example, configured with a network interface. The drive 265 drives a removable medium 271 such as a magnetic disk, an optical disk, a magneto optical disk, or a semiconductor memory.

For example, the CPU 251 performs various kinds of processes by loading a program stored in the storage unit 263 onto the RAM 253 via the input/output interface 260 and the bus 254 and executing the program. The RAM 253 appropriately stores data or the like which is necessary in executing various kinds of processes through the CPU 251.

For example, the program executed by the CPU 251 may be stored in a removable medium 271 serving as a package medium and provided to the server 202. In this case, the program may be installed in the storage unit 263 via the input/output interface 260 from the removable medium 271 mounted in the drive 265.

The program may be provided to the server 202 via a wired or wireless transmission medium such as a LAN, the Internet, or digital satellite broadcasting. In this case, the program may be received through the communication unit 264 via a wired or wireless transmission medium and installed in the storage unit 263.

Besides, the program may be installed in the ROM 252 or the storage unit 263 in advance.

<Functional Block>

Figure 17:
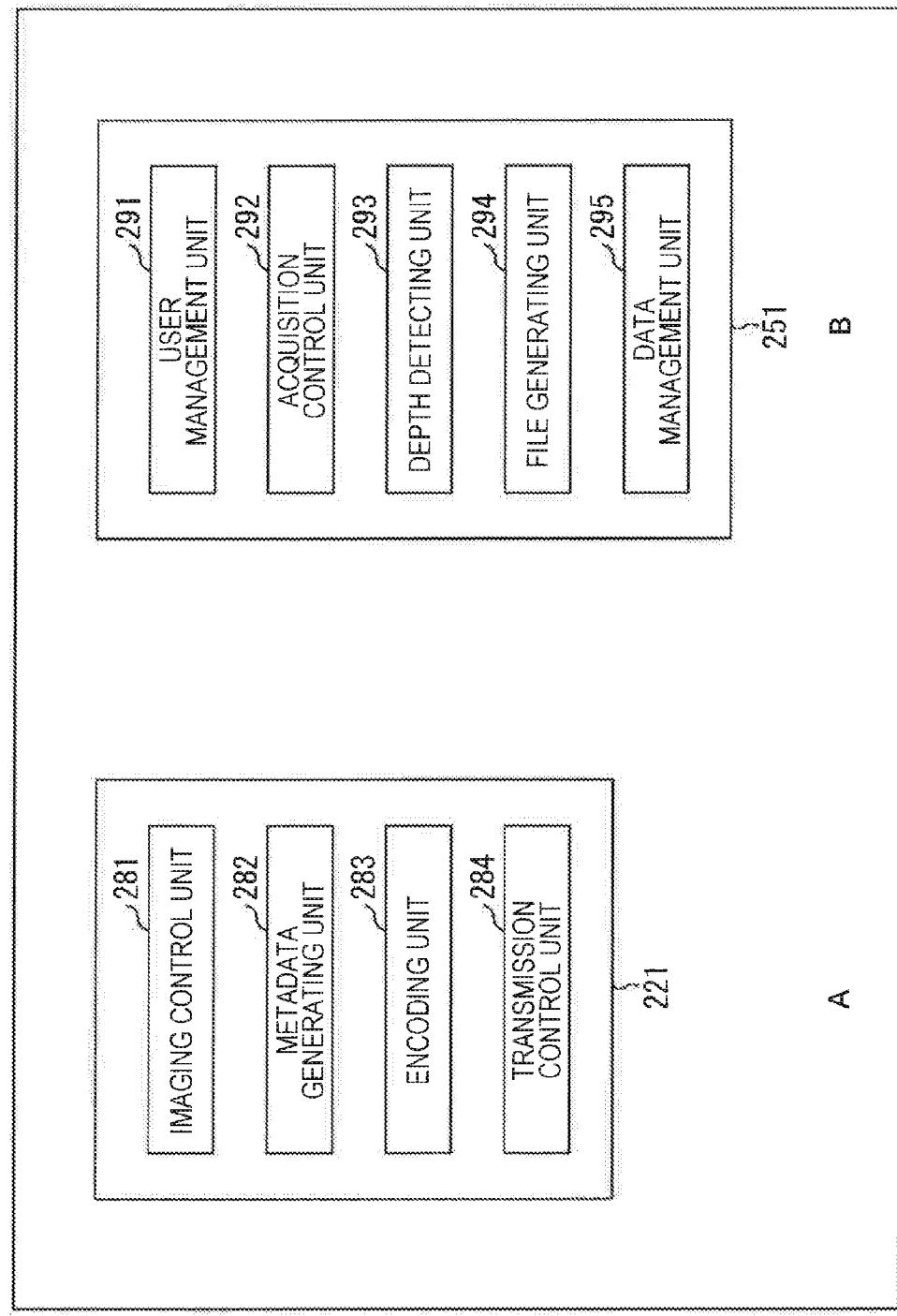
FIG. 17 is a functional block diagram for describing a function of a terminal device and server.

The terminal device 201 has functions illustrated as functional blocks in A of FIG. 17 as a predetermined program is executed by the CPU 221. The CPU 221 includes functional blocks such as an imaging control unit 281, a metadata generating unit 282, an encoding unit 283, and a transmission control unit 284 as illustrated in A of FIG. 17.

The imaging control unit 281 performs a process related to control of the multi-viewpoint photographing. The metadata generating unit 282 performs a process related to generation of metadata of the multi-viewpoint image obtained by the multi-viewpoint photographing. The encoding unit 283 performs a process related to encoding of the multi-viewpoint image. The transmission control unit 284 performs a process related to transmission control of the multi-viewpoint image data or the like.

The server 202 has functions illustrated as functional blocks in B of FIG. 17 as a predetermined program is executed by the CPU 251. The CPU 251 includes functional blocks such as a user management unit 291, an acquisition control unit 292, a depth detecting unit 293, a file generating unit 294, and a data management unit 295 as illustrated in B of FIG. 17.

Figure 18:
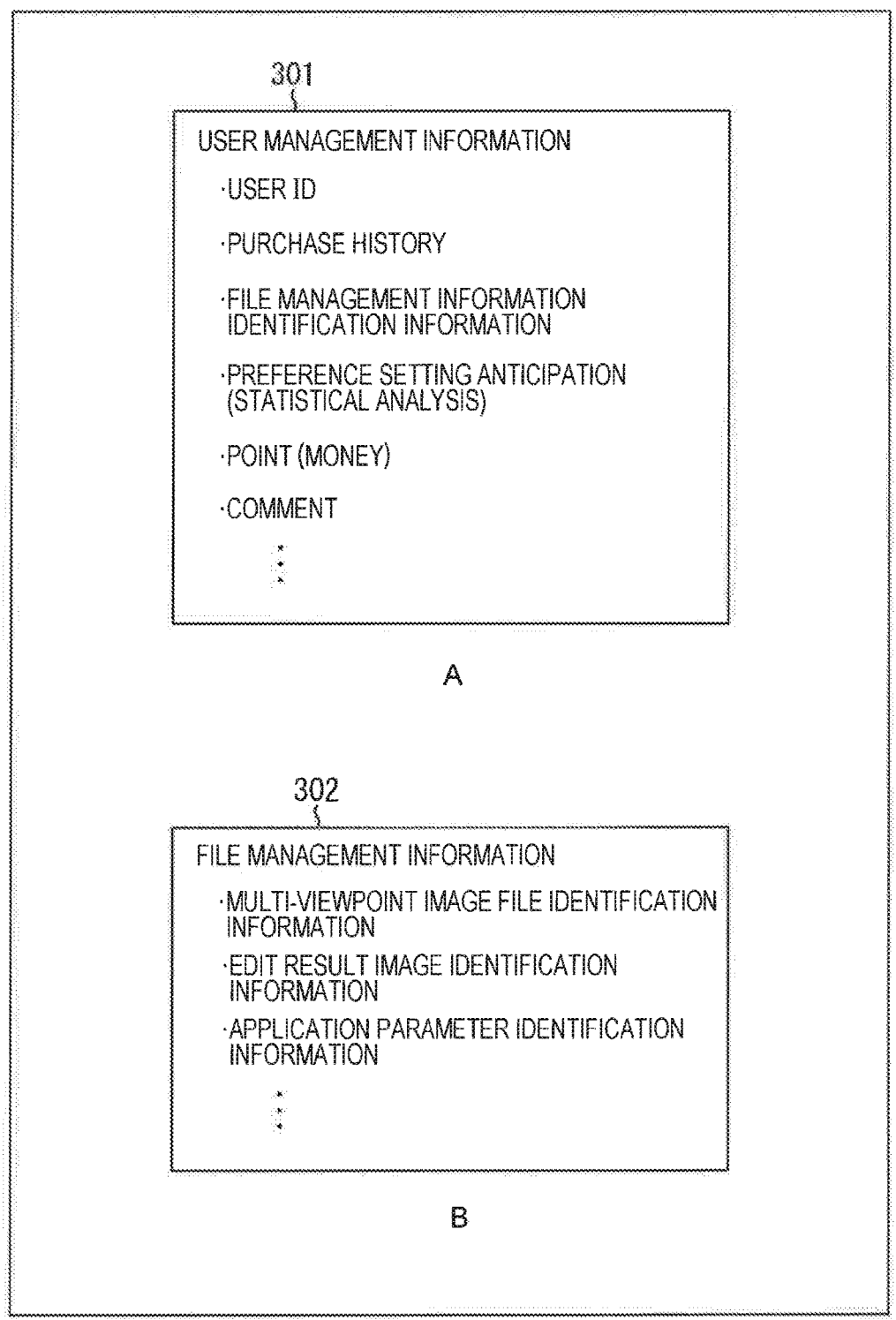
FIG. 18 is a diagram illustrating an example of information managed by a server.

The user management unit 291 performs a process related to management of the user to which the multi-viewpoint image-used service is provided. For example, for each user, the user management unit 291 stores user management information 301 illustrated in A of FIG. 18 in the storage unit 263 and manages the user management information 301. As illustrated in A of FIG. 18, the user management information 301 includes, for example, a user ID serving as identification information of the user, a purchase history of the user, file management information identification information serving as identification information of file management information associated with the user (registered for the user), preference setting anticipation serving as information indicating anticipation of a setting preferred by the user, for example, on the basis of statistical analysis, a point (or money) of the user, a comment transmitted to another user or transmitted from another user, and the like. It will be appreciated that content of the user management information 301 is arbitrary, and a part of the above-described information may be omitted, or information other than the above-described information may be included.

The acquisition control unit 292 performs a process related to acquisition control of information such as the multi-viewpoint image data transmitted from the terminal device 201. The depth detecting unit 293 performs a process related to detection of the depth value of the multi-viewpoint image. The file generating unit 294 performs a process related to generation of the multi-viewpoint image file serving as a file of various kinds of data including the multi-viewpoint image data.

The data management unit 295 performs a process related to management of data such as the multi-viewpoint image file. For example, for each multi-viewpoint image file, the data management unit 295 stores file management information 302 illustrated in B of FIG. 18 in the storage unit 263 and manages the file management information 302. As illustrated in B of FIG. 18, the file management information 302 includes, for example, multi-viewpoint image file identification information serving as identification information of the multi-viewpoint image file, edit result image identification information serving as identification information of an edit result image serving as an edit result of the multi-viewpoint image associated with the multi-viewpoint image file, application parameter identification information serving as identification information of an application parameter serving as a history of an operation or the like of an application using the multi-viewpoint image associated with the multi-viewpoint image file, and the like. It will be appreciated that content of the file management information 302 is arbitrary, and a part of the above-described information may be omitted, or information other than the above-described information may be included. For example, the multi-viewpoint image file may be associated with the file management information 302 managed by the data management unit 295, and the PSF data of each viewpoint position serving as the data used for adjusting the lens aberration according to the viewpoint position or the angle-of-view position described in the first embodiment may be further managed.

<Flow of Multi-viewpoint Image-used Service Provision Process>

The terminal device 201 and the server 202 of the multi-viewpoint image-used service provision system having the above-described configuration perform a multi-viewpoint image-used service provision process, provide the service using the multi-viewpoint image, and provide a service such as management of the multi-viewpoint images in the case of the present embodiment. An example of a flow of the multi-viewpoint image-used service provision process performed by the devices will be described with reference to a flowchart of FIG. 19.

In step S101, the imaging control unit 281 of the terminal device 201 controls the imaging unit 236 such that the multi-viewpoint photographing for the subject is performed, and the multi-viewpoint image is obtained. For example, the imaging control unit 281 obtains multi-viewpoint image 311 configured with a plurality of photographed images that differ in a viewpoint illustrated in A of FIG. 20 through the multi-viewpoint photographing.

Referring back to FIG. 19, when the multi-viewpoint image data is obtained through the multi-viewpoint photographing, in step S102, the metadata generating unit 282 generates the metadata of the multi-viewpoint image data. The metadata will be described later in detail, and the metadata includes, for example, arrangement information indicating a relative position relation of respective viewpoints of the multi-viewpoint image and number-of-viewpoints information indicating the number of viewpoints of the multi-viewpoint image. In other words, the metadata generating unit 282 generates the metadata including the arrangement information and the number-of-viewpoints information, and associates the metadata with the multi-viewpoint image data.

In step S103, the encoding unit 283 encodes the multi-viewpoint image data using a predetermined encoding method, and generates the multi-viewpoint image encoded data. The encoding method may be any method as long as image data is encoded. For example, the encoding method may be an existing encoding method such as Joint Photographic Experts Group (JPEG) or Moving Picture Experts Group (MPEG) or may be an encoding method dedicated to a new multi-viewpoint image. After the multi-viewpoint image data is encoded, the metadata of the multi-viewpoint image data (for example, the arrangement information, the number-of-viewpoints information, and the like) is associated with the multi-viewpoint image encoded data (becomes metadata of the multi-viewpoint image encoded data) through the metadata generating unit 282.

In step S104, the transmission control unit 284 controls the communication unit 234 such that the multi-viewpoint image encoded data generated in step S103 is transmitted to the server 202 together with the metadata generated in step S102. For example, the transmission control unit 284 transmits the multi-viewpoint image encoded data and the metadata as a bit stream or auxiliary information of a bit stream.

In step S111, the acquisition control unit 292 of the server 202 controls the communication unit 264 such that the multi-viewpoint image encoded data and the metadata transmitted from the terminal device 201 in step S104 are acquired.

In step S112, the depth detecting unit 293 decodes the multi-viewpoint image encoded data acquired in step S111 using a decoding method corresponding to the encoding method of step S103.

In step S113, the depth detecting unit 293 detects the depth of the multi-viewpoint image using the multi-viewpoint image data obtained by decoding the multi-viewpoint image encoded data in step S112, and generates depth data. For example, the depth detecting unit 293 generates a depth map 312 in which the distance to the subject is indicated by brightness and a color for each pixel as the depth data as illustrated in B of FIG. 20.

The detection of the depth will be described later in detail. Further, when the depth data is generated, the PSF data of each viewpoint position serving as the data used for adjusting the lens aberration according to the viewpoint position or the angle-of-view position described in the first embodiment may be also generated. In this case, preferably, the CPU 251 of the server 202 appropriately has the functional block necessary for generating the PSF data of each viewpoint position, which is described above with reference to FIG. 2.

Referring back to FIG. 19, when the depth data is generated, in step S114, the depth detecting unit 293 encodes the multi-viewpoint image data of which depth has been detected, and generates the multi-viewpoint image encoded data. The encoding method may be any method as long as image data is encoded. For example, the encoding method may be an existing encoding method such as JPEG or MPEG or may be an encoding method dedicated to a new multi-viewpoint image. The encoding method may or may not be the same as the encoding method of step S103. The depth detecting unit 293 associates the generated depth data with the multi-viewpoint image encoded data.

The detection of the depth (the generation of the depth data) may be performed in an arbitrary device other than the server 202. For example, the detection of the depth (the generation of the depth data) may be performed in the terminal device 201. In this case, preferably, the CPU 221 of the terminal device 201 appropriately has a necessary functional block such as the depth detecting unit 293. In this case, preferably, the depth detecting unit 293 detects the depth before the multi-viewpoint image data is encoded by the encoding unit 283 (before the process of step S103 is executed). Preferably, then, in step S103, as described above, the encoding unit 283 encodes the multi-viewpoint image data, the depth detecting unit 293 associates the depth data with the multi-viewpoint image encoded data, and the metadata generating unit 282 associates the metadata (for example, the arrangement information, the number-of-viewpoints information, and the like) with the multi-viewpoint image encoded data.

At this time, for example, the metadata may include the PSF data of each viewpoint position serving as the data used for adjusting the lens aberration according to the viewpoint position or the angle-of-view position described in the first embodiment. In this case, preferably, the CPU 221 of the terminal device 201 appropriately has a functional block necessary for generating the PSF data of each viewpoint position, which is described with reference to FIG. 2.

In step S115, the file generating unit 294 generates the multi-viewpoint image file including the multi-viewpoint image encoded data generated in step S114, the metadata, and the depth data generated in step S113. A format of the multi-viewpoint image file may be arbitrary. For example, when the multi-viewpoint image is a still image, the multi-viewpoint image may be converted into a file of an Exchangeable Image File Format (EXIF) file format. For example, when the multi-viewpoint image is a moving image, the multi-viewpoint image may be converted into a file of an MPEG-4 Part 14 (MP4) file format. It will be appreciated that the multi-viewpoint image may be converted into a file of any other format.

Figure 21:
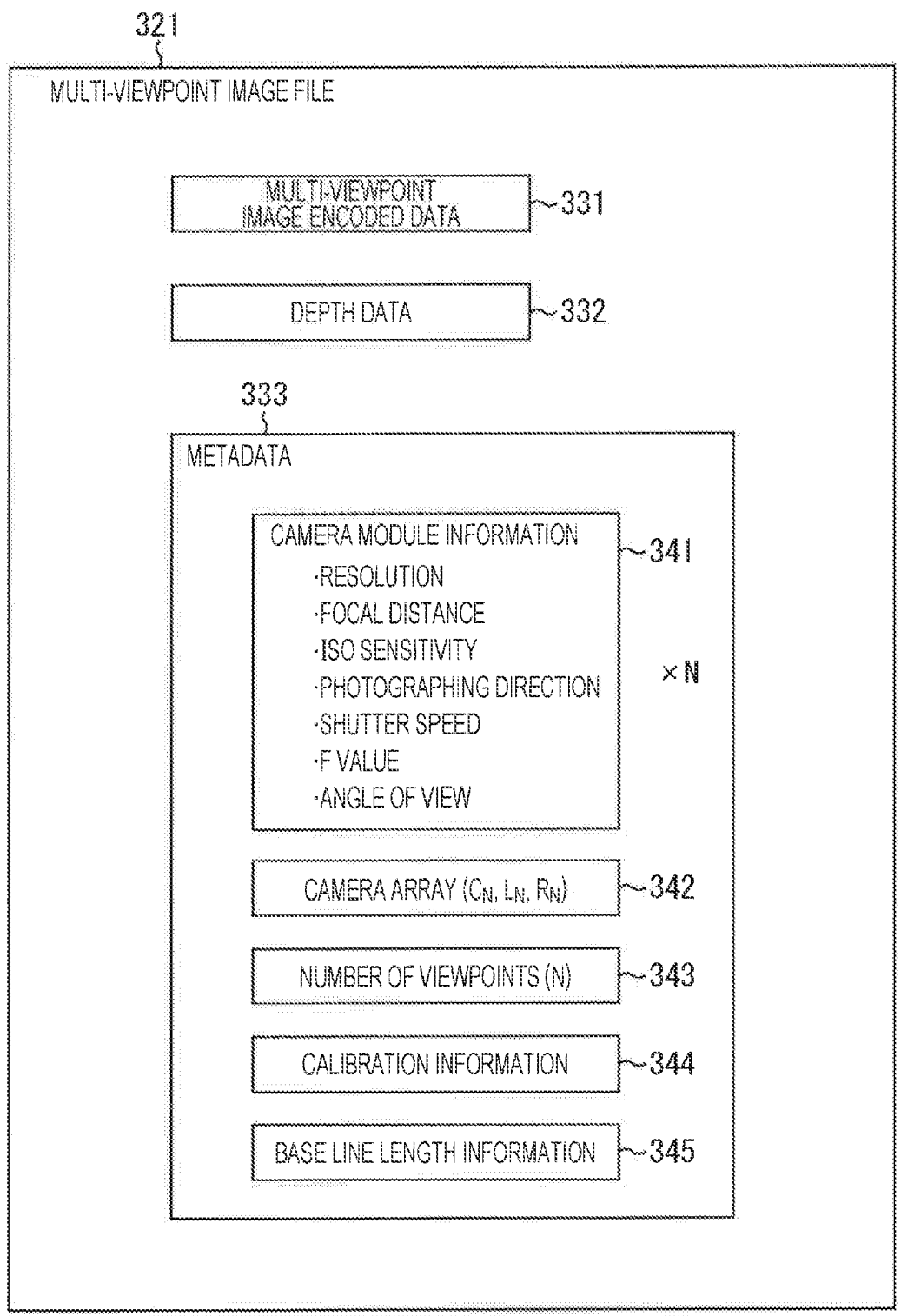
FIG. 21 is a diagram illustrating an example of a main configuration of a multi-viewpoint image file.

For example, the file generating unit 294 generates a multi-viewpoint image file 321 having a configuration illustrated in FIG. 21. In the case of an example of FIG. 21, the multi-viewpoint image file 321 includes multi-viewpoint image encoded data 331, depth data 332, and metadata 333. Here, when the first embodiment is applied to the third embodiment, the PSF data of each viewpoint position serving as the data used for adjusting the lens aberration is included in the metadata 333 constituting the multi-viewpoint image file or the multi-viewpoint image file 321 as described above.

The multi-viewpoint image encoded data 331 is the multi-viewpoint image encoded data generated in step S114. The depth data 332 is the depth data generated in step S113 or the depth data of the multi-viewpoint image of the multi-viewpoint image encoded data 331. The metadata 333 is the metadata generated in step S102 or the metadata of the multi-viewpoint image encoded data 331.

The metadata 333 includes, for example, camera module information 341, camera array information 342, number-of-viewpoints information 343, calibration information 344, and base line length information 345 as illustrated in FIG. 21.

The camera module information 341 is information related to photographing for obtaining the multi-viewpoint image, that is, information related to the camera modules 242 of the imaging unit 236. For example, when N camera modules 242 are installed in the imaging unit 236, the metadata 333 includes N pieces of camera module information 341. The camera module information 341 includes, for example, information such as a resolution, a focal distance, ISO sensitivity, a photographing direction, a shutter speed, an F value, and an angle of view as illustrated in FIG. 21. It will be appreciated that a configuration of the camera module information 341 is arbitrary, and a part of the information may be omitted, or any other information may be included.

Figure 22:
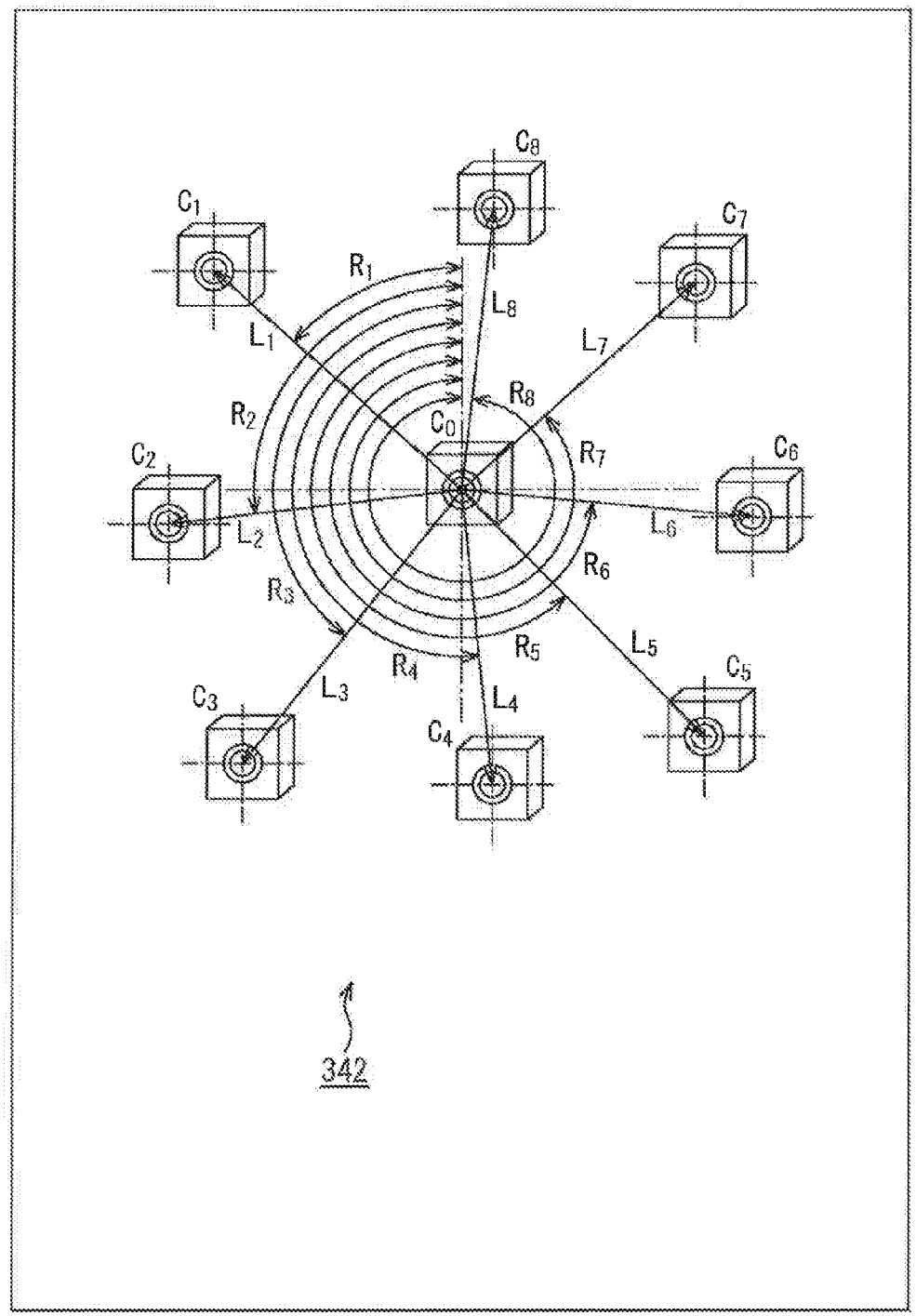
FIG. 22 is a diagram for describing an example of a camera array.

The camera array information 342 is information indicating a relative position relation of the camera modules 242. In other words, the camera array information 342 is information indicating a relative position relation of viewpoints of the multi-viewpoint image. For example, the camera array information 342 includes a distance Lx from a reference camera module C0 to another camera module Cx (x=1 to 8 in an example of FIG. 22) (a distance Lx from a reference viewpoint to each viewpoint) and a direction Rx of another camera module Cx from the reference camera module C0 (a direction Rx of each viewpoint from a reference viewpoint) as illustrated in FIG. 22.

The number-of-viewpoints information 343 is information indicating the number of camera modules 242 (the number of viewpoints). The calibration information 344 is information indicating a variation in each camera module 242. The base line length information 345 is information used as a reference of a length in the multi-viewpoint image.

A configuration of the metadata 333 is arbitrary, and a part of the information may be omitted, or any other information may be included. For example, when the first embodiment is applied to the third embodiment, the metadata 333 includes the information (the offset methods) of the aberrations illustrated in FIG. 6 and the PSF data of each viewpoint position serving as the data used for adjusting the lens aberration corresponding to all the aberrations.

Figure 23:
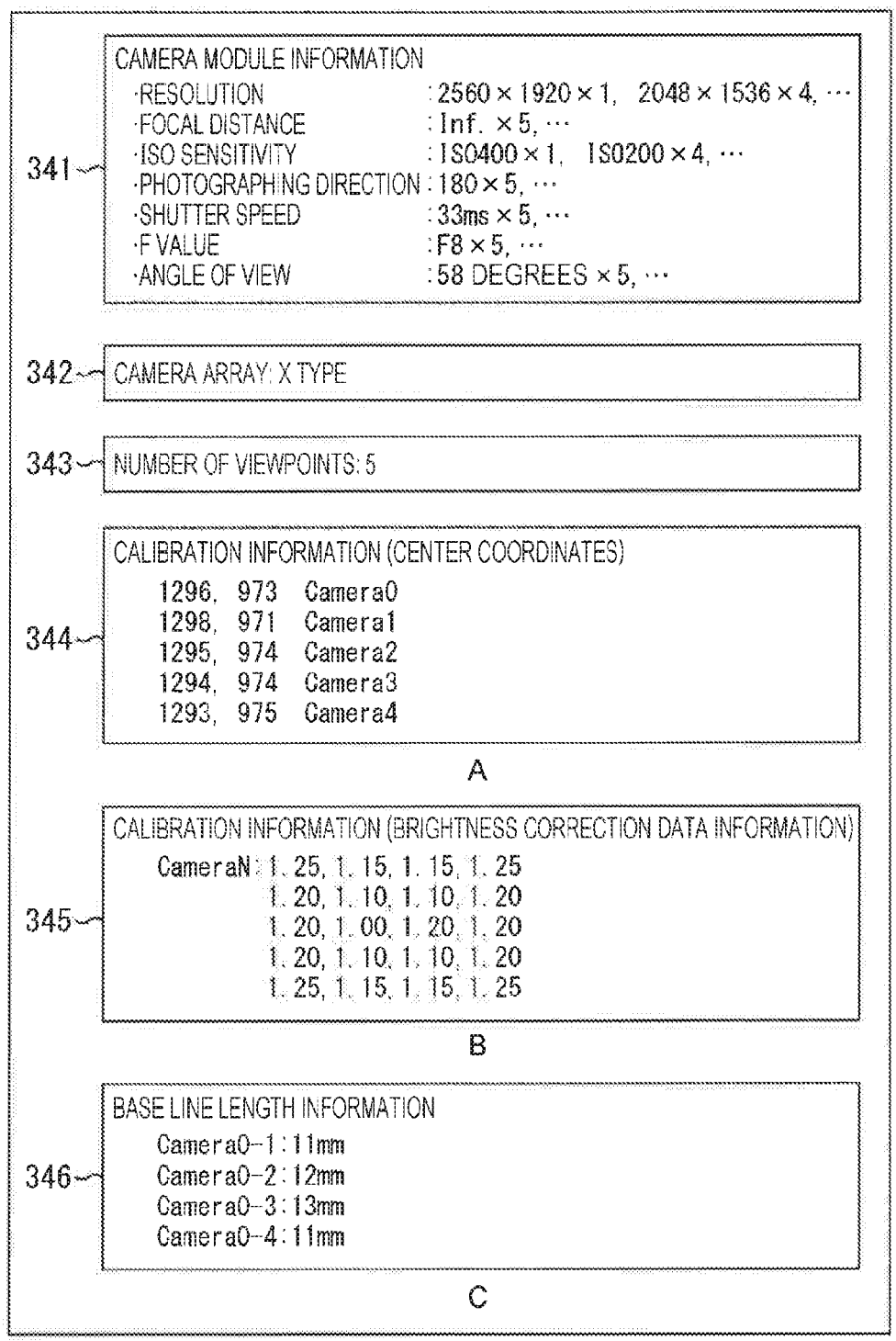
FIG. 23 is a diagram for describing an example of metadata.

FIG. 23 is a diagram illustrating an example of a data configuration of the metadata. In the camera module information 341, the information such as the resolution, the focal distance, the ISO sensitivity, the photographing direction, the shutter speed, the F value, and the angle of view may be indicated for each camera module 242 as illustrated in A of FIG. 23.

If the parameters of the camera modules 242 are set to be different values, for example, a high quality image can be obtained by controlling selection of the photographed images to be superimposed or a mixture ratio thereof according to the value of the parameter when the photographed images of the multi-viewpoint image are superimposed. For example, an image of which parameter is close to a desired value is easily obtained by causing only the photographed images of which parameter is close to the desired value to be superimposed or causing the photographed images of which parameter is close to the desired value to be more intensively superimposed (increasing the mixture ratio of the photographed images). Thus, unnecessary image processing of changing the parameter can be reduced, and thus a reduction in an image quality caused by the image processing can be suppressed (a higher quality image can be obtained).

Further, since the photographed images have various parameter values, a photographed image of which parameter is close to a desired value is obtained although a parameter of an image obtained as a result of superimposition is set to be any value. In other words, a higher quality image can be obtained regardless of the parameter value.

Further, when the first embodiment is applied to the third embodiment, the metadata may include the information of the aberration illustrated in FIG. 6 and the PSF data of each viewpoint position serving as the data used for adjusting the lens aberration corresponding to all the aberration. In this case, the same effects as the effects of the first embodiment can be obtained. In other words, a higher quality image in which optical information processing of a lens is reproduced, and bokeh specific to a lens is generated can be obtained.

In the camera array information 342, an array of the camera modules 242 may be indicated using the relative position relation (CN. LN. RN) as in an example of FIG. 21 or using a predetermined array type such as an "X form" as in an example of A of FIG. 23. In the case of the example of FIG. 21, a degree of array freedom can be improved, and in the case of the example of FIG. 23, an increase in an information amount of metadata can be suppressed.

The number-of-viewpoints information 343 is indicated by a number in an example illustrated in A of FIG. 23.

The calibration information 344 may be configured with, for example, information indicating positions of viewpoints of the multi-viewpoint image. In the case of the example of A of FIG. 23, the calibration information 344 is configured with coordinate information of the camera modules 242 (information indicating center coordinates of the camera modules). The calibration information 344 may be configured with, for example, information used for correcting brightness of the images of the multi-viewpoint image. In the case of an example of B of FIG. 23, the calibration information 344 is configured with brightness correction data information of the camera modules 242.

The base line length information 345 may include, for example, information indicating a distance from a reference viewpoint to each viewpoint of the multi-viewpoint image. In the case of an example of C of FIG. 23, the base line length information 345 includes information indicating distances from a reference camera module 242 to the other camera modules 242.

Referring back to FIG. 19, in step S116, the data management unit 295 supplies the multi-viewpoint image file generated in step S115 to the storage unit 263 so that the multi-viewpoint image file is stored in the storage unit 263, and generates and manages the file management information 302 of the multi-viewpoint image file. The user management unit 291 updates the user management information 301 of the user stored in the storage unit 263, and registers the multi-viewpoint image file for the user.

When the process of step S116 ends, the multi-viewpoint image-used service provision process ends.

As the multi-viewpoint image-used service provision process is executed, the user can easily register the multi-viewpoint image data obtained by the multi-viewpoint photographing in the server 202. Further, since the multi-viewpoint image data is managed in the file form together with the relevant data related to the multi-viewpoint image (the depth data, the metadata, the PSF data of each viewpoint position in the first embodiment, and the like), the user can more easily use the multi-viewpoint image data registered by the user. In other words, the multi-viewpoint image-used service provision system 200 (the multi-viewpoint image-used service platform 100) can improve convenience of the user using the multi-viewpoint image.

In the above example, the imaging unit 236 including a plurality of camera modules 242 is used to perform the multi-viewpoint photographing and generate the multi-viewpoint image (the multi-viewpoint image data), but a method of generating the multi-viewpoint image (the multi-viewpoint image data) is arbitrary. For example, an imaging unit including one imaging element and an optical system (that is, an imaging unit including one camera module 242) may be used to perform photographing (photographing of a moving image or photographing of a plurality of still images) while moving a photographing position or a photographing direction (that is, a viewpoint) and generate the multi-viewpoint image. In this case, it is desirable to associate information related to a displacement in the photographing position or the photographing direction (viewpoint) with the multi-viewpoint image data (the multi-viewpoint image encoded data) as the metadata.

In the above example, the multi-viewpoint image file generated by the file generating unit 294 is stored and managed in the storage unit 263 of the server 202, but a position at which the multi-viewpoint image file is managed is arbitrary. Further, when the first embodiment is applied to the third embodiment, the PSF data of each viewpoint position serving as the data used for adjusting the lens aberration is included in the metadata 333 constituting the multi-viewpoint image file or the multi-viewpoint image file 321 as described above. For example, the multi-viewpoint image file may be stored and managed in a device (for example, a file management server (not illustrated)) other than the server 202. In this case, the file generating unit 294 transmits the generated multi-viewpoint image file to the device, for example, as a bit stream or auxiliary information of a bit stream via the communication unit 264. In this case, the device preferably includes a communication unit that communicates with the server 202 and acquires the multi-viewpoint image file, a storage unit that stores the acquired multi-viewpoint image file, and a data management unit serving as a functional block that manages the multi-viewpoint image file stored in the storage unit, updates the multi-viewpoint image file as necessary, and supplies the multi-viewpoint image file to another device such as the terminal device 201 or the server 202.

Further, in the above example, the server 202 generates the multi-viewpoint image file, but the multi-viewpoint image file may be generated in an arbitrary device. Further, when the first embodiment is applied to the third embodiment, the PSF data of each viewpoint position serving as the data used for adjusting the lens aberration is included in the metadata 333 constituting the multi-viewpoint image file or the multi-viewpoint image file 321 as described above. For example, the multi-viewpoint image file may be generated in the terminal device 201. In this case, preferably, the CPU 221 of the terminal device 201 has appropriately has a necessary functional block such as the file generating unit 294. In this case, preferably, the file generating unit 294 generates the multi-viewpoint image file after the multi-viewpoint image data is encoded through the encoding unit 283 (after the process of step S103). Then, preferably, in step S104, the transmission control unit 284 transmits the multi-viewpoint image file to the server 202, for example, as a bit stream or auxiliary information of a bit stream, and in step S111, the acquisition control unit 292 controls the communication unit 264 such that the multi-viewpoint image file is acquired.

<Flow of Depth Detection Process>

Figure 24:
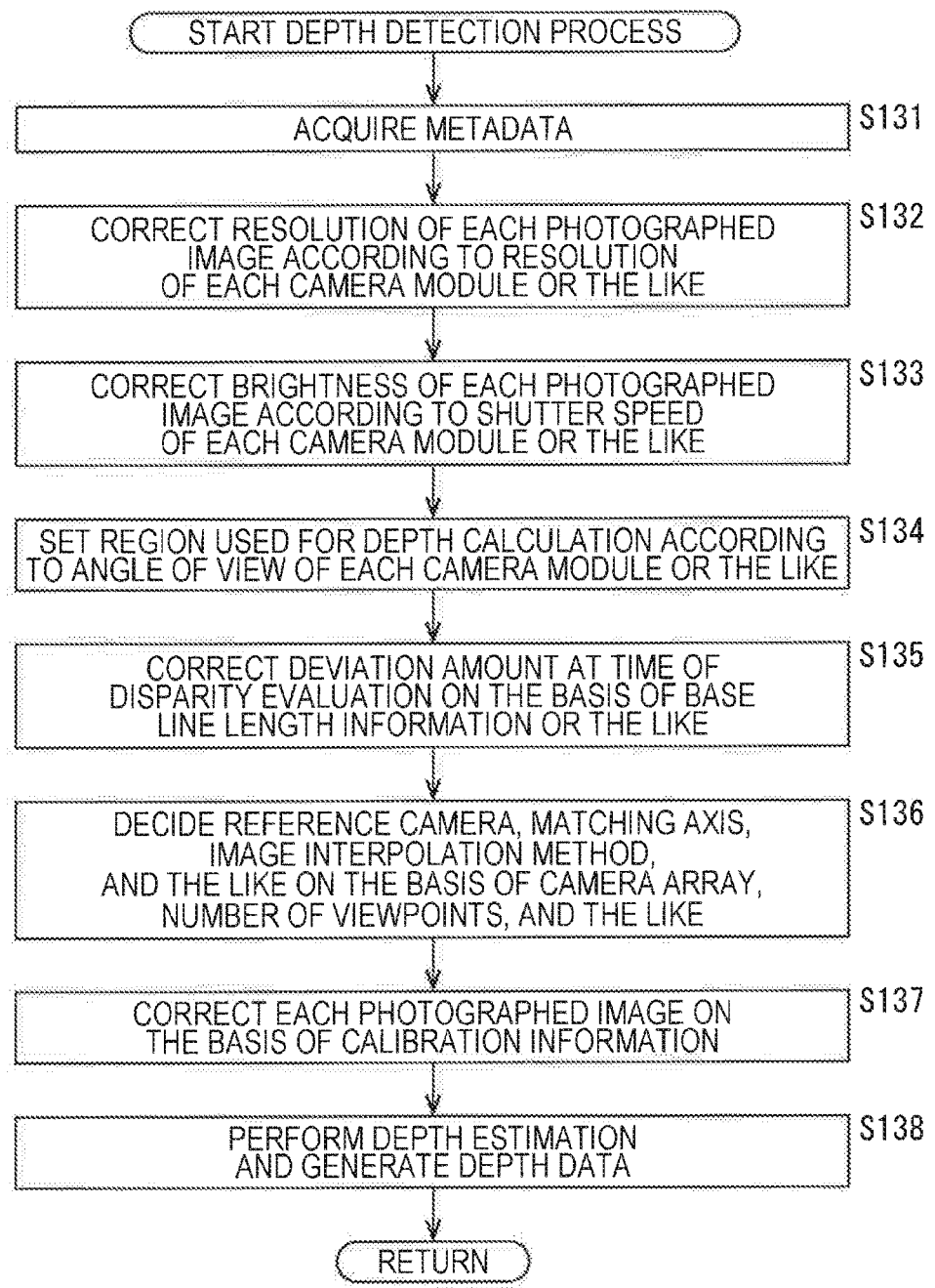
FIG. 24 is a flowchart for describing an example of a flow of a depth detection process.

Next, an example of a flow of the depth detection process executed in step S113 of FIG. 19 will be described with reference to a flowchart of FIG. 24.

When the depth detection process starts, in step S131, the depth detecting unit 293 acquires the metadata 333. In step S132, the depth detecting unit 293 corrects the resolution of each photographed image according to the resolution of each camera module 242 or the like.

In step S133, the depth detecting unit 293 corrects brightness of each photographed image according to the shutter speed of each camera module or the like. In step S134, the depth detecting unit 293 sets a region used for a depth calculation according to the angle of view of each camera module or the like.

In step S135, the depth detecting unit 293 corrects a deviation amount at the time of disparity evaluation on the basis of the base line length information 345 or the like. In step S136, the depth detecting unit 293 decides a reference camera, a matching axis, an image storage method, and the like on the basis of the camera array, the number of viewpoints, or the like.

In step S137, the depth detecting unit 293 corrects each photographed image on the basis of the calibration information 344. In step S138, the depth detecting unit 293 performs a depth estimation, for example, by repeating stereo matching and detects the depth data.

Figure 19:
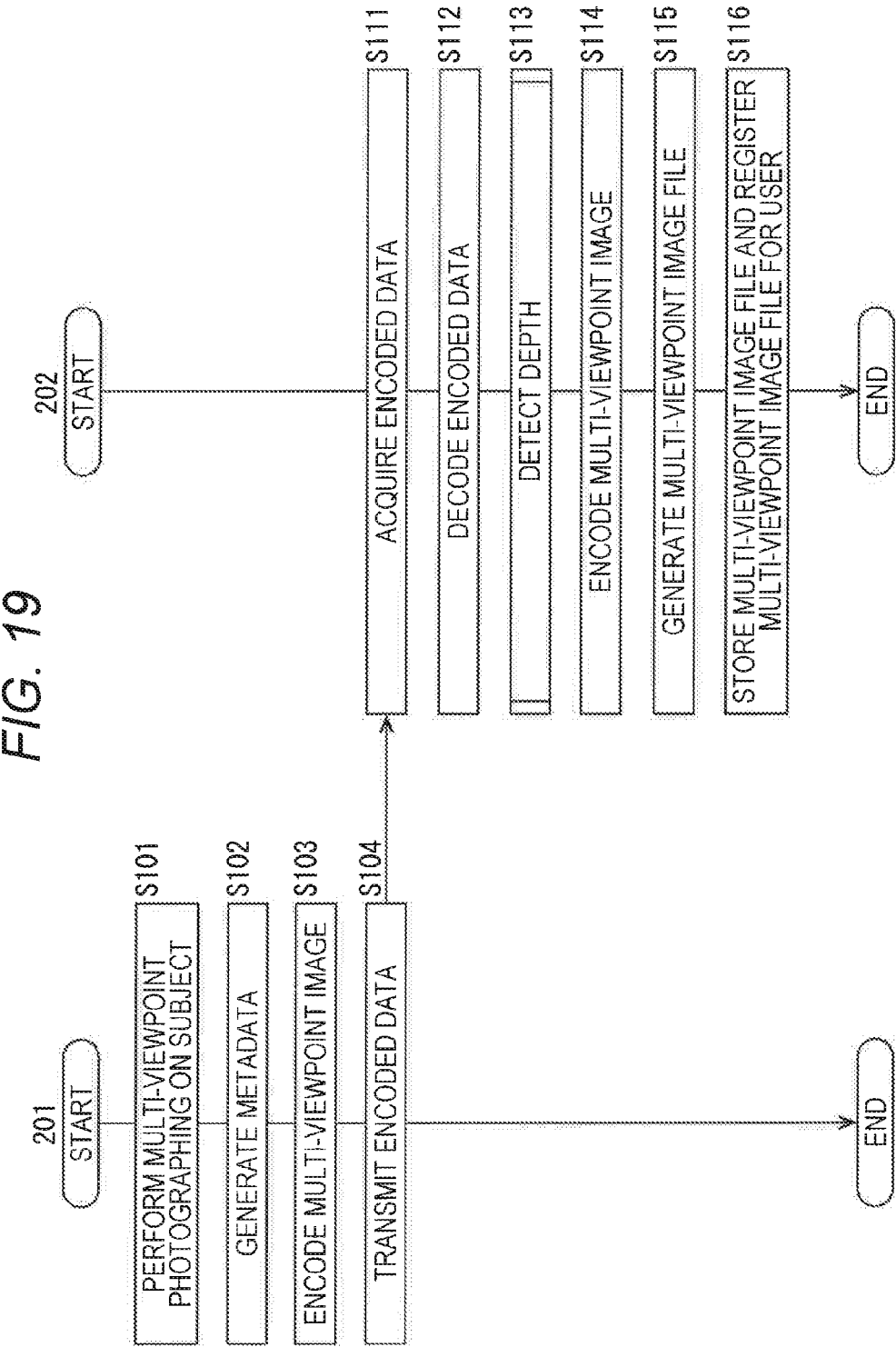
FIG. 19 is a flowchart illustrating an example of a flow of a multi-viewpoint image-used service provision process.

When the depth data is detected, the process returns to FIG. 19.

As the depth detection process is performed as described above, the user can more easily generate and use the depth data.

Further, for example, when the first embodiment is applied to the third embodiment, the similar effects as the effects of the first embodiment can be obtained in the third embodiment. For example, since information used for reproducing optical information processing of a lens and generating bokeh specific to a lens is managed, the information can be used by the user. In other words, the user can obtain an image with improved lens reproducibility.

<4. Fourth Embodiment>

<Application Sale>

As described above in the second embodiment, the multi-viewpoint image-used service platform 100 can provide, for example, the service of selling the application 112 in the application market 102. In the present embodiment, the sale of the application will be described.

<Multi-viewpoint Image-used Service Provision System>

Figure 25:
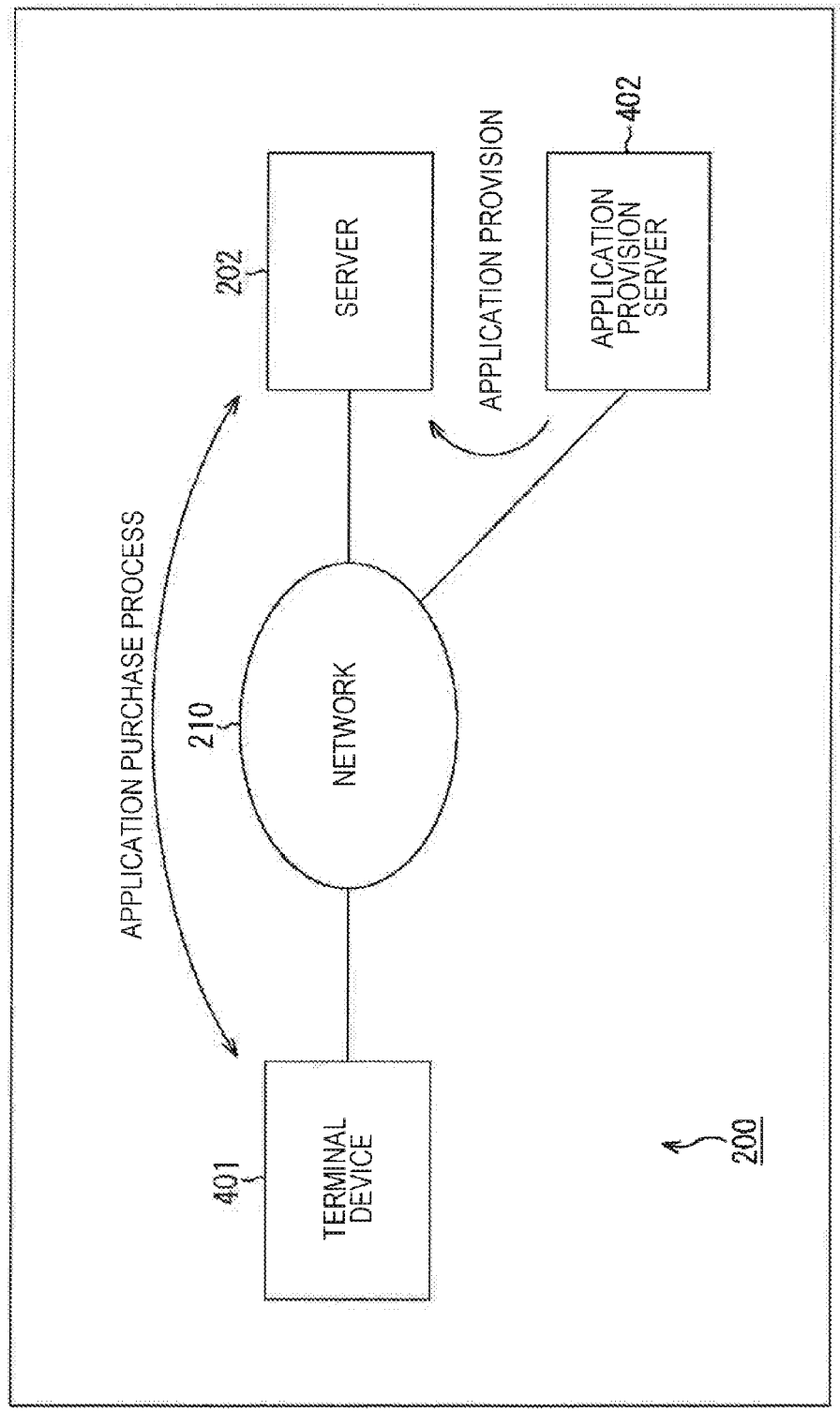
FIG. 25 is a diagram illustrating an example of another configuration of the multi-viewpoint image-used service provision system.

FIG. 25 is a diagram illustrating an example of a main configuration of a multi-viewpoint image-used service provision system. A multi-viewpoint image-used service provision system 200 illustrated in FIG. 25 is an example of a system to which the present technology is applied, that is, a system in which a server 202 provides the service using the multi-viewpoint image to a terminal device 201 connected via a network 210. In other words, the multi-viewpoint image-used service provision system 200 is an example of a configuration of implementing the multi-viewpoint image-used service platform 100.

FIG. 25 illustrates an example of a configuration related to provision of a service related to the sale or provision of the application 112 among the services provided by the multi-viewpoint image-used service platform 100. Referring to FIG. 25, the multi-viewpoint image-used service provision system 200 includes a terminal device 401, a server 202, and an application provision server 402 which are connected to the network 210.

The terminal device 401 connected to the network 210 in a wired or wireless manner performs communication with the server 202 and performs a procedure related to the purchase of the application 112. The terminal device 401 may be the terminal device 201 or may be a terminal device different from the terminal device 201. The terminal device 401 basically has a similar configuration to that of the terminal device 201. Thus, the configuration illustrated in FIG. 14 may be applied to the terminal device 401. However, the terminal device 401 need no function related to photographing, and thus the imaging unit 236 may be omitted.

The application provision server 402 is a server that provides the application 112 to the multi-viewpoint image-used service platform 100 (the application market 102). The server 202 sells or provides the application provided from the application provision server 402 to (the user of) the terminal device 401.

<Server>

Figure 26:
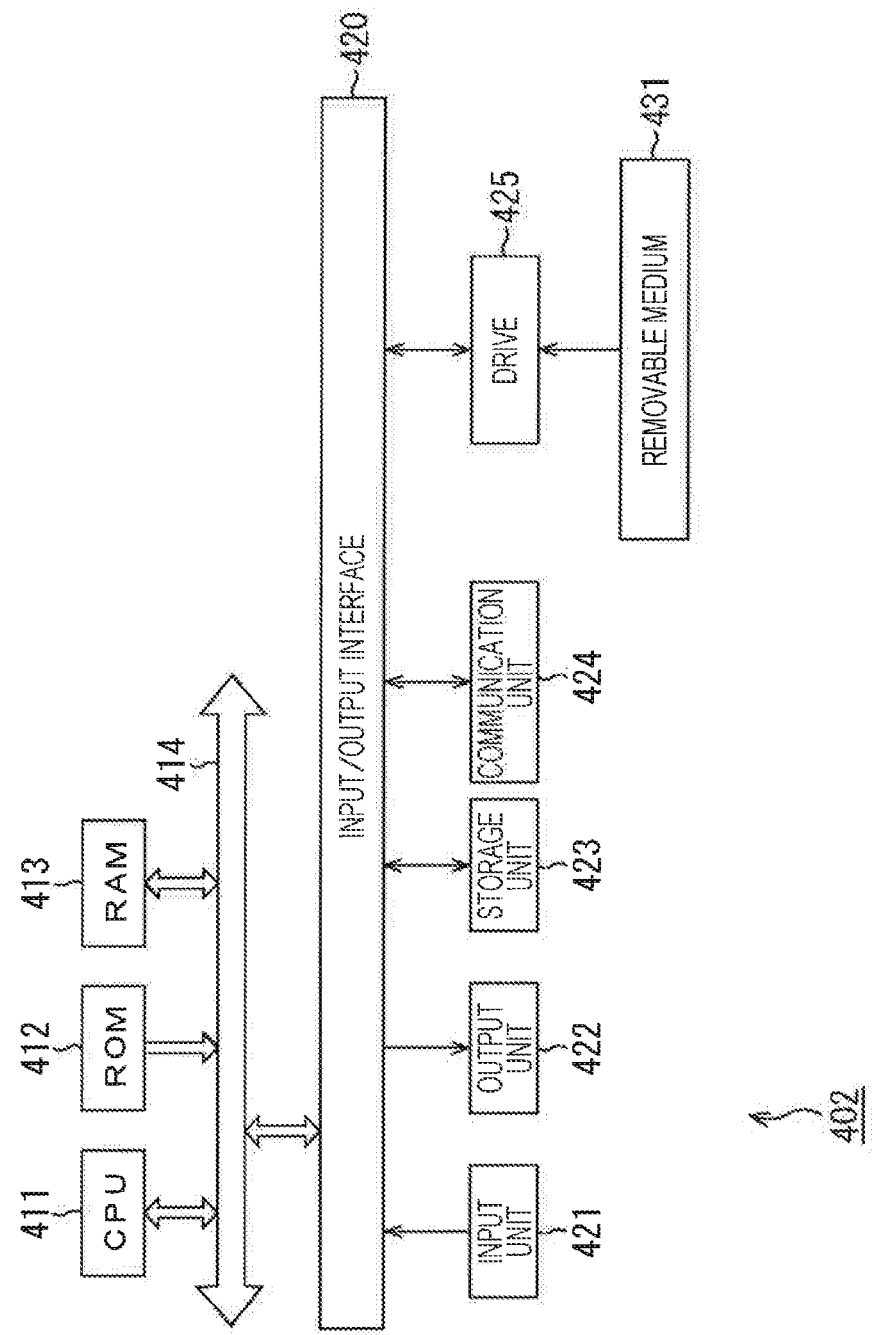
FIG. 26 is a diagram illustrating an example of a main configuration of an application provision server.

FIG. 26 is a block diagram illustrating an exemplary main configuration of the application provision server 402. In the application provision server 402, a CPU 411, a ROM 412, and a RAM 413 are connected to one another via a bus 414 as illustrated in FIG. 26.

An input/output interface 420 is also connected to the bus 414. An input unit 421, an output unit 422, a storage unit 423, a communication unit 424, and a drive 425 are connected to the input/output interface 420.

The input unit 421 is configured with an input device that receives external information such as a user input. Examples of the input unit 421 include an operation button, a touch panel, a microphone, a camera, and an input terminal. Further, various kinds of sensors such as an acceleration sensor, an optical sensor, and a temperature sensor may be included in the input unit 42L. The output unit 422 is configured with an output device that outputs information such as an image or a sound. For example, the output unit 422 includes a display, a speaker, and an output terminal.

The storage unit 423 is configured with, for example, a hard disk, a RAM disk, or a non-volatile memory. The communication unit 424 is, for example, configured with a network interface. The drive 425 drives a removable medium 431 such as a magnetic disk, an optical disk, a magneto optical disk, or a semiconductor memory.

For example, the CPU 411 performs various kinds of processes by loading a program stored in the storage unit 423 onto the RAM 413 via the input/output interface 420 and the bus 414 and executing the program. The RAM 413 appropriately stores data or the like which is necessary in executing various kinds of processes through the CPU 411.

For example, the program executed by the CPU 411 may be stored in, for example, the removable medium 431 serving as a package medium and provided to the application provision server 402. In this case, the program may be installed in the storage unit 423 via the input/output interface 420 from the removable medium 431 mounted in the drive 425.

The program may be provided to the application provision server 402 via a wired or wireless transmission medium such as a LAN, the Internet, or digital satellite broadcasting. In this case, the program may be received through the communication unit 424 via a wired or wireless transmission medium and installed in the storage unit 423.

Besides, the program may be installed in the ROM 412 or the storage unit 423 in advance.

<Functional Block>

Figure 27:
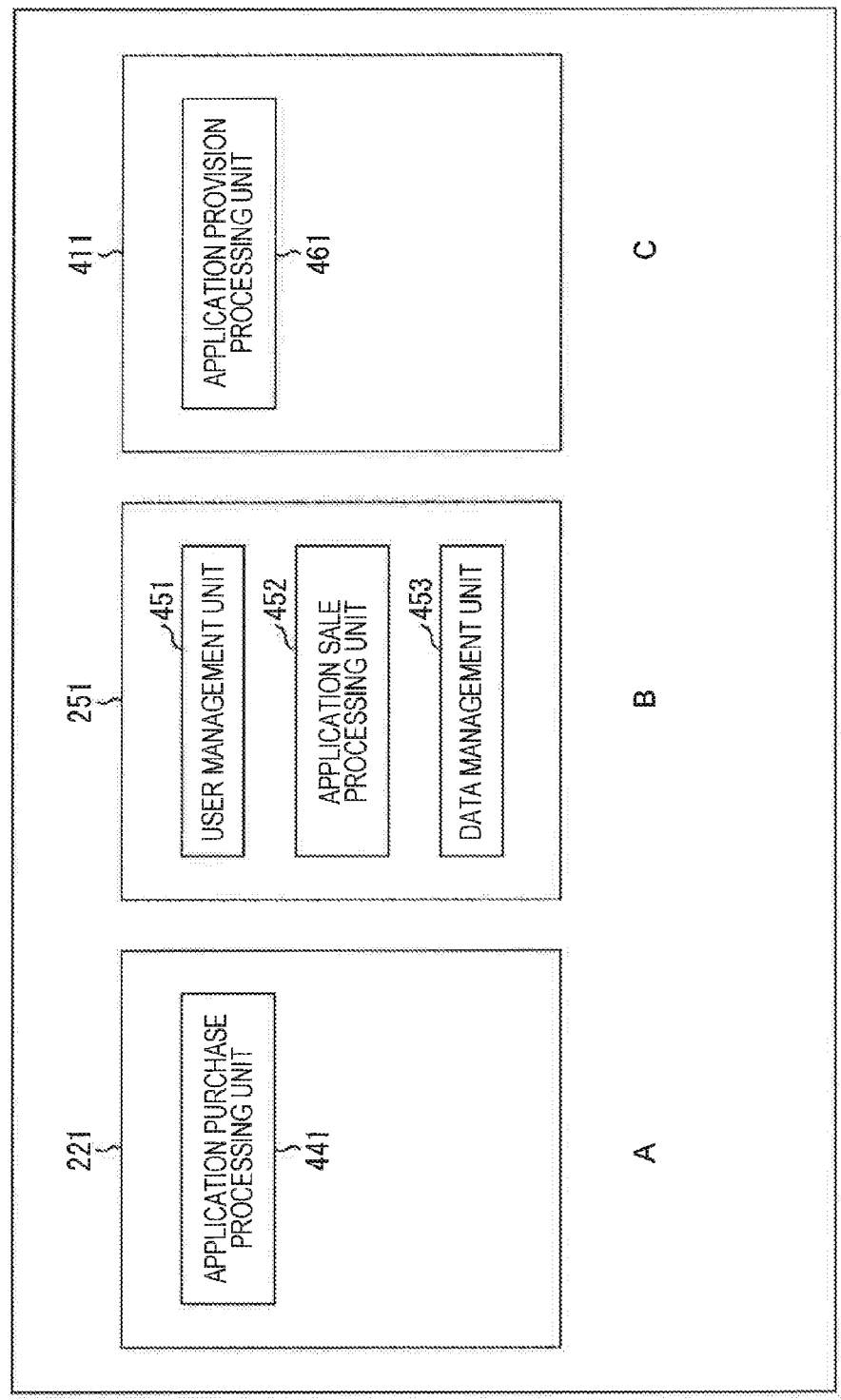
FIG. 27 is a functional block diagram for describing functions of a terminal device, a server, and an application provision server.

The terminal device 401 has a function illustrated as a functional block in A of FIG. 27 as a predetermined program is executed by the CPU 221. The CPU 221 includes a functional block such as an application purchase processing unit 441 as illustrated in A of FIG. 27.

The application purchase processing unit 441 performs a process related to the purchase of an application by controlling the respective units such as the input unit 231, the output unit 232, the storage unit 233, and the communication unit 234 such that communication with the server 202 is performed, an image is displayed, or an instruction of the user is received.

The server 202 has functions illustrated as functional blocks in B of FIG. 27 as a predetermined program is executed by the CPU 251. The CPU 251 includes functional blocks such as a user management unit 451, an application sale processing unit 452, and a data management unit 453 as illustrated in B of FIG. 27.

The user management unit 451 performs a process related to management of the user to which the multi-viewpoint image-used service is provided, similarly to the user management unit 291. The application sale processing unit 452 performs a process related to the sale of an application by controlling the communication unit 264 such that communication with the terminal device 401 is performed. The data management unit 453 performs a process related to management of data such as the multi-viewpoint image file, similarly to the data management unit 295 (B of FIG. 17). For example, the data management unit 453 performs a process related to management of applications supplied from the application provision server 402.

In other words, the data management unit 453 associates a type of application with the managed multi-viewpoint image file. Here, when the first embodiment is applied to the fourth embodiment, the depth data, the metadata, the PSF data of each viewpoint position in the first embodiment, and the like are included in the relevant data related to the multi-viewpoint image of the multi-viewpoint image file. For example, it is possible to change information to be supplied for each application, for example, it is supplied to an application a but not supplied to an application p since it is not associated with the application p.

Further, the application provision server 402 has a function illustrated as a functional block in C of FIG. 27 as a predetermined program is executed by the CPU 411. The CPU 411 includes a functional block such as an application provision processing unit 461 as illustrated in C of FIG. 27.

The application provision processing unit 461 performs a process related to provision of an application to the server 202 by controlling the communication unit 424 such that communication with the server 202 is performed.

<Flow of Multi-viewpoint Image-used Service Provision Process>

Figure 28:
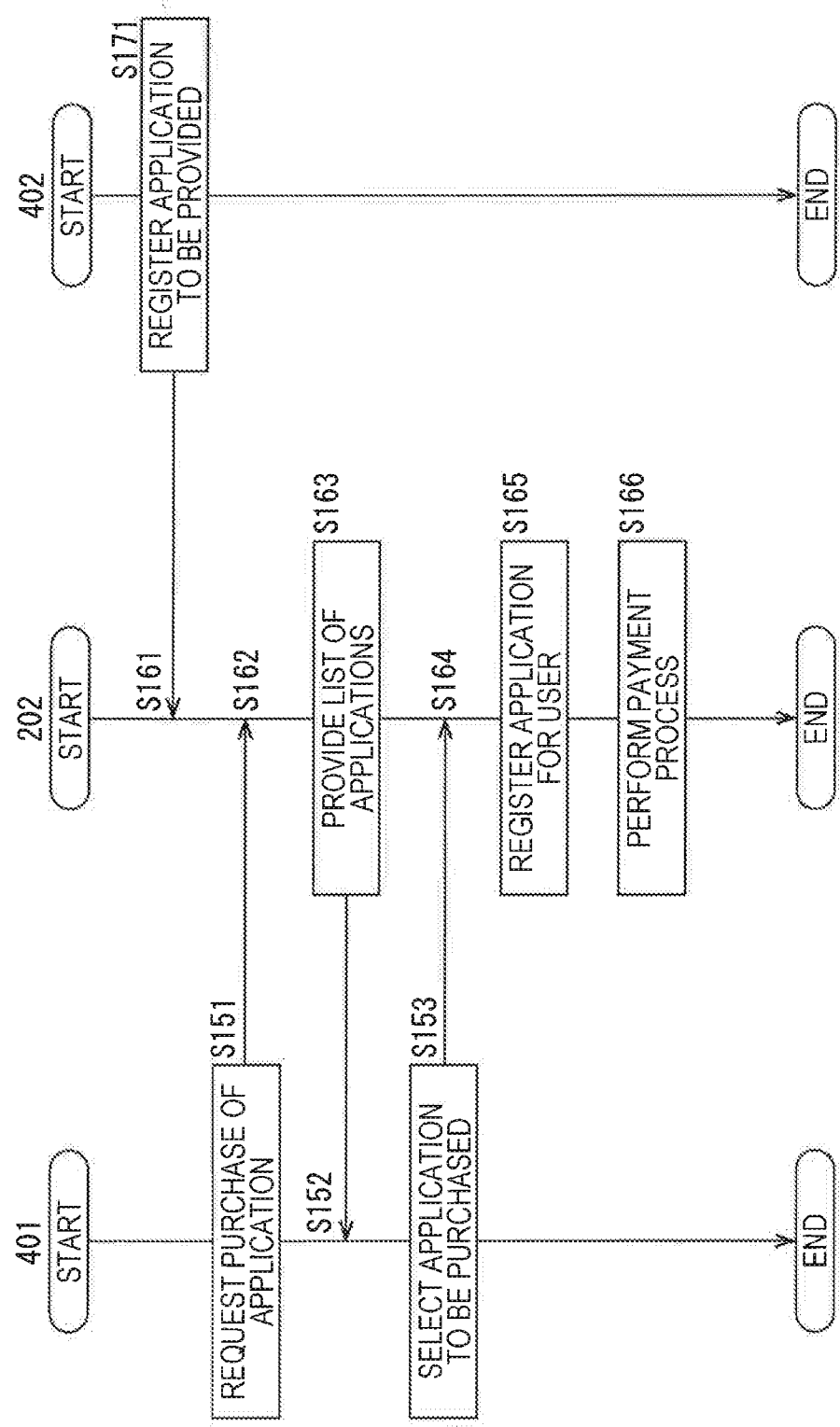
FIG. 28 is a flowchart illustrating another example of the flow of the multi-viewpoint image-used service provision process.

The terminal device 401, the server 202, and the application provision server 402 of the multi-viewpoint image-used service provision system having the above-described configuration perform a multi-viewpoint image-used service provision process and provides the service using the multi-viewpoint image and the service related to the sale of an application in the case of the present embodiment. An example of a flow of the multi-viewpoint image-used service provision process performed by the devices will be described with reference to a flowchart of FIG. 28.

In step S171, the application provision processing unit 461 of the application provision server 402 controls the communication unit 424 such that an application to be provided is supplied to and registered in the server 202.

In step S161, the data management unit 453 of the server 202 controls the communication unit 264 or the like such that the application supplied from the application provision server 402 is acquired, stores the application in the storage unit 263, and manages the application so that the application can be sold to the terminal device 401.

In step S151, the application purchase processing unit 441 of the terminal device 401 controls the communication unit 234 such that an application purchase request is transmitted to the server 202.

In step S162, the application sale processing unit 452 of the server 202 controls the communication unit 264 such that the request is acquired.

In step S163, the application sale processing unit 452 creates a list of applications that can be sold to the user in collaboration with the user management unit 451 and the data management unit 453. Then, the application sale processing unit 452 controls the communication unit 264 such that the list of applications is provided to the terminal device 401.

In step S152, the application purchase processing unit 441 of the terminal device 401 acquires the list of applications. The application purchase processing unit 441 controls the output unit 232 such that the list of applications is displayed on a monitor, presented to the user, and an instruction is received from the user.

Figure 29:
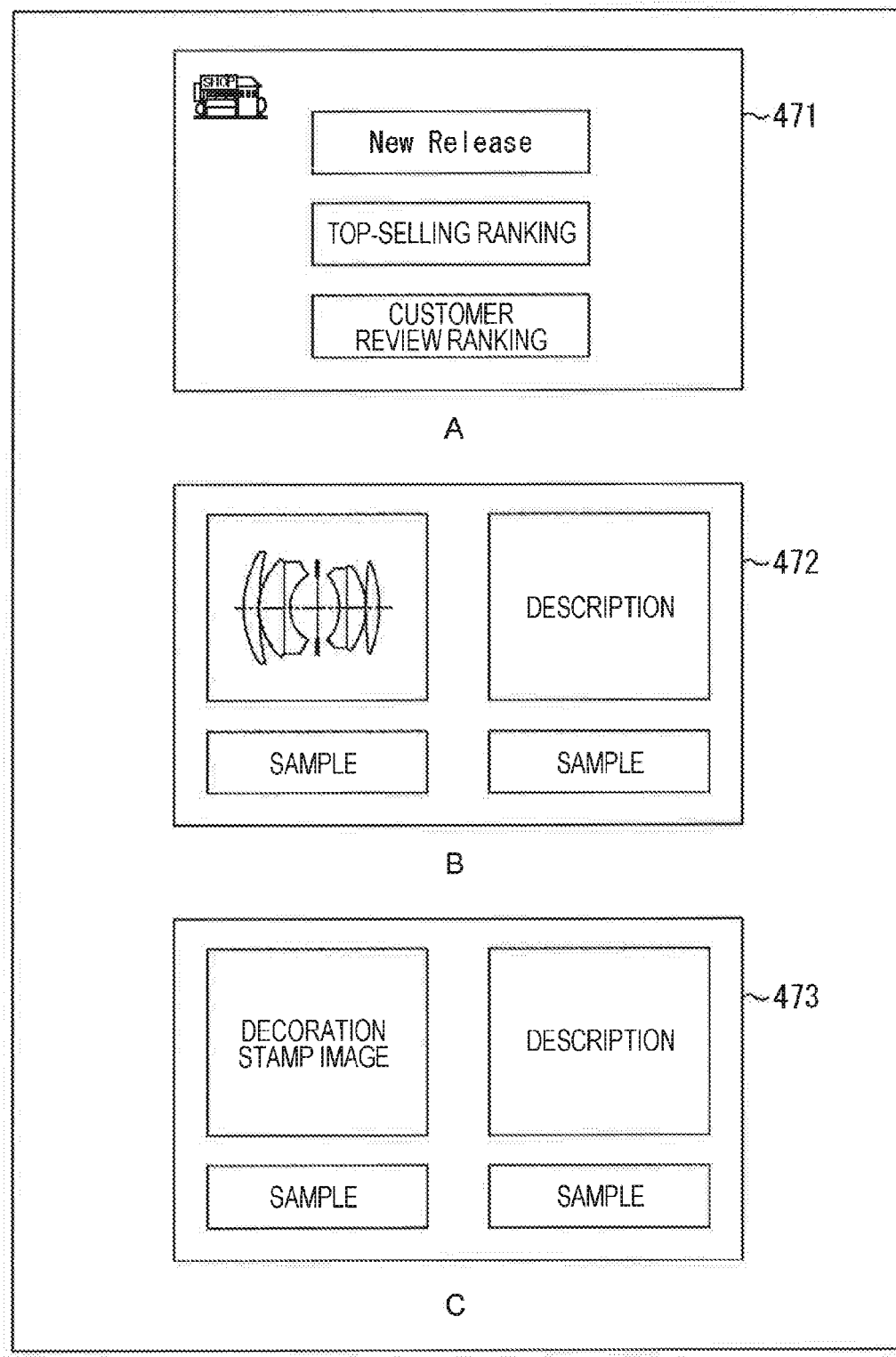
FIG. 29 is a diagram illustrating an example of information display.

For example, a Graphical User Interface (GUI) 471 illustrated in A of FIG. 29 is displayed on the monitor of the terminal device 401. The user narrows down a desired application among a plurality of applications on the basis of the GUI. For example, when an application for the lens simulation is selected, a GUI 472 illustrated in B of FIG. 29 is further displayed, and a virtual lens is selected. For example, when an application for editing an image is selected, a GUI 473 illustrated in C of FIG. 29 is further displayed, and an edit function such as reproduction of a decoration stamp or a multi-viewpoint image is selected.

For example, when the first embodiment is applied to the fourth embodiment, the PSF data of each viewpoint position in the first embodiment or the like is also selected with the selection of the virtual lens or the selection of the edit function. In other words, when the depth data, the metadata, and the PSF data of each viewpoint position which are necessary are associated with the selected application, the data can be easily provided when the application is selected. Further, it may be selected whether or not the PSF data of each viewpoint position is purchased as an option, and the PSF data of each viewpoint position may be provided only when it is selected by the user. Alternatively, either of simple PSF data and the PSF data of each viewpoint position in the first embodiment may be selected. In either case, when the PSF data of each viewpoint position is selected, a quality of an image obtained by an application can be improved.

Referring back to FIG. 28, when the user selects an application to be purchased from the list in step S153, the application purchase processing unit 441 receives a selection instruction, and controls the communication unit 234 such that control information for selecting an application to be purchased is supplied to the server 202.

In step S164, the application sale processing unit 452 of the server 202 controls the communication unit 264 such that the control information is acquired. In step S165, the application sale processing unit 452 registers the selected application (the application that is instructed to be purchased by the user) for the user by associating the selected application (the application that is instructed to be purchased by the user) with the user management information 301 of the user in collaboration with the user management unit 451 and the data management unit 453.

In step S166, the application sale processing unit 452 performs payment process related to the sale of the application. The user management unit 451 reflects payment information in the user management information 301 of the user (for example, subtracts an amount to be paid or a point corresponding to an amount to be paid from a point or money of the user. A current sale is added to the purchase history of the application). Further, when the first embodiment is applied to the fourth embodiment, a payment is here made even when the option is purchased as described above.

When the process of step S166 ends, the multi-viewpoint image-used service provision process ends.

As the multi-viewpoint image-used service provision process is performed, the user can more easily purchase an application that performs a process using the multi-viewpoint image. Further, since the server 202 registers and manages the purchased application for the user, the user can more easily use the application purchased by the user. In other words, the multi-viewpoint image-used service provision system 200 (the multi-viewpoint image-used service platform 100) can improve convenience of the service using the multi-viewpoint image.

The application may be provided for nothing instead of being purchased. In this case, the payment process can be omitted.

<5. Fifth Embodiment>
<Virtual Lens Process>

As described above, as the application applied to the user is performed, the multi-viewpoint image-used service platform 100 can provide various services using the multi-viewpoint image to the user.

In the present embodiment, an aspect of an application that performs the lens simulation (the virtual lens process) described above in the second embodiment will be described as an example of the application.

<Multi-viewpoint Image-used Service Provision System>

Figure 30:
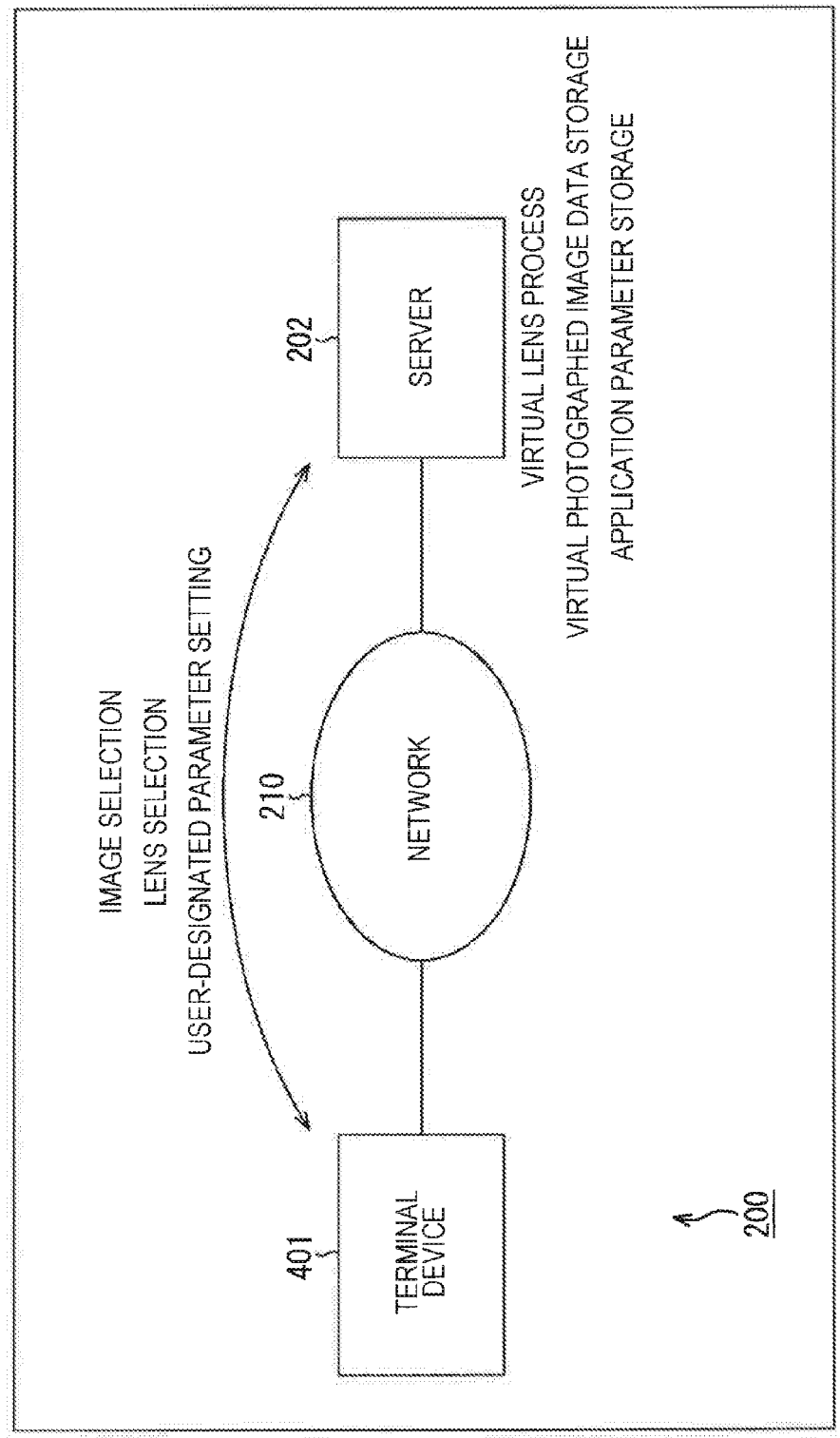
FIG. 30 is a diagram illustrating an example of another configuration of the multi-viewpoint image-used service provision system.

FIG. 30 is a diagram illustrating an example of a main configuration of a multi-viewpoint image-used service provision system. A multi-viewpoint image-used service provision system 200 illustrated in FIG. 30 is an example of a system to which the present technology is applied, that is, a system in which a server 202 provides the service using the multi-viewpoint image to a terminal device 201 connected via a network 210. In other words, the multi-viewpoint image-used service provision system 200 is an example of a configuration of implementing the multi-viewpoint image-used service platform 100.

FIG. 30 illustrates an example of a configuration related to provision of a service related to the lens simulation (virtual lens process) among the services provided by the multi-viewpoint image-used service platform 100. Referring to FIG. 30, the multi-viewpoint image-used service provision system 200 includes a terminal device 401 and a server 202 which are connected to the network 210.

The terminal device 401 connected to the network 210 in a wired or wireless manner performs communication with the server 202 and performs selection of the multi-viewpoint image, selection of a virtual lens to be simulated, a setting of a user-designated parameter serving as a photographing-related parameter of which value is designated by the user such as a focusing position or a depth of field, and the like.

The server 202 performs the virtual lens process of simulating the virtual lens on the basis of the above processes, and generates virtual photographed image data obtained by photographing using the virtual lens. The server 202 holds (stores and manages) the virtual photographed image data. Further, the server 202 generates history information indicating a parameter, a value of a parameter that has been set, an operation (instruction) performed by the user, a process that has been performed in the above lens simulation, and the like as an application parameter of an application that performs the lens simulation, and holds (stores and manages) the information.

<Overview of Virtual Lens Process>

Next, an overview of the virtual lens process will be described. In the virtual lens process, the virtual lens 150 of A of FIG. 12 designated by the user is set, the light ray vector 151 serving as incident light from a subject which is incident on the virtual lens 150, the light ray vector 152 serving as incident light that has passed through the virtual lens 150, the virtual image sensor 153 that obtains a virtual photographed image on the basis of the light ray vector 152, and the like are simulated (simulatively realized), and the virtual photographed image is generated from the multi-viewpoint image on the basis of the simulation.

Figure 31:
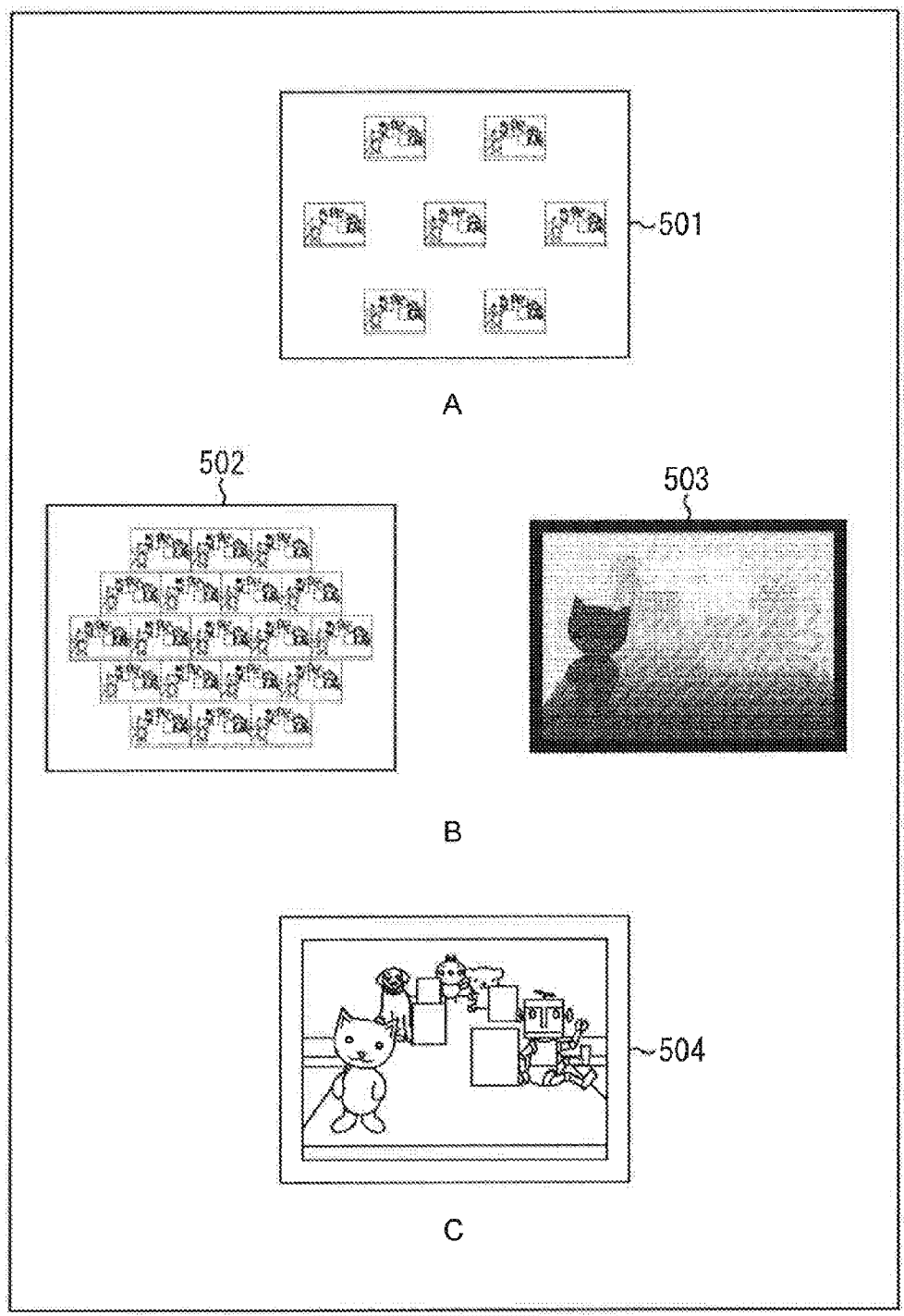
FIG. 31 is a diagram for describing an example of an aspect of a flow of a virtual lens process.

For example, a multi-viewpoint image 501 illustrated in A of FIG. 31 and an interpolated image 502 and depth data 503 illustrated in B of FIG. 31 are generated, and a virtual photographed image 504 illustrated in C of FIG. 31 obtained by photographing using the virtual lens 150 (the virtual optical system illustrated in A of FIG. 12) is generated using the multi-viewpoint image 501, the interpolated image 502, and the depth data 503.

As a result, the virtual photographed image 504 which is larger than the photographed images of the multi-viewpoint image 501 and in which an optical effect given by the virtual lens 150 is reflected is obtained. The optical system such as the virtual lens 150 is simulated using profile information that includes a parameter for reproducing an optical effect by the virtual optical system and is specific to the virtual optical system. Thus, the server 202 can easily reproduce various optical systems ranging from a realistic one to an unrealistic one. In other words, the user can obtain various photographed images at a low cost through the service. In other words, the multi-viewpoint image-used service provision system 200 (the multi-viewpoint image-used service platform 100) can improve convenience of the service using the multi-viewpoint image.

Further, when the first embodiment is applied to the fifth embodiment, that is, when the PSF data included in the profile information is the PSF data of each viewpoint position in the first embodiment, the user can obtain an image with high reproducibility such as bokeh of a lens.

<Functional Block>

Figure 32:
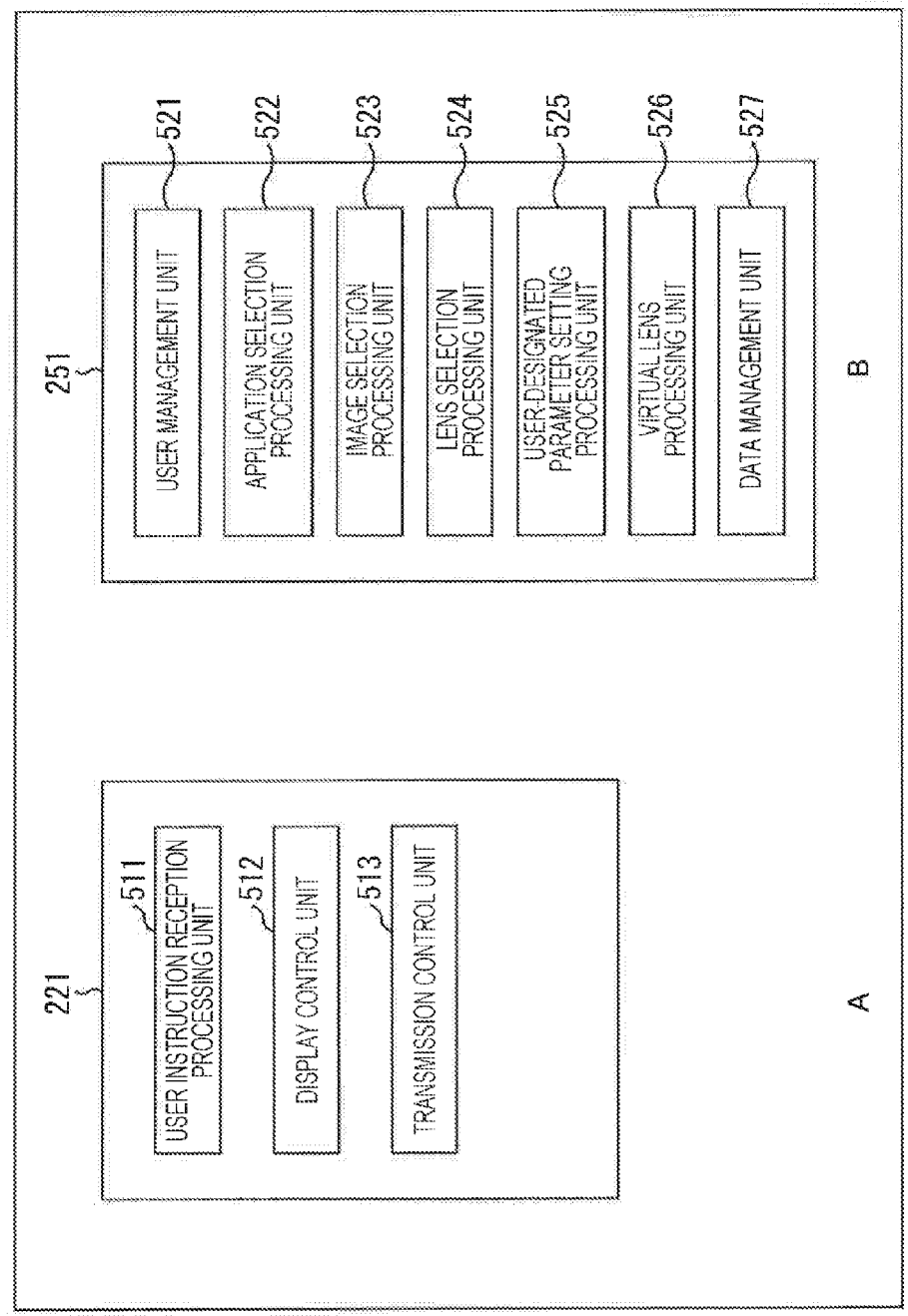
FIG. 32 is a functional block diagram for describing functions of a terminal device and a server.

The terminal device 401 has functions illustrated as functional blocks in A of FIG. 32 as a predetermined program is executed by the CPU 221. The CPU 221 includes functional blocks such as a user instruction reception processing unit 511, a display control unit 512, and a transmission control unit 513 as illustrated in A of FIG. 32.

The user instruction reception processing unit 511 controls the input unit 231 or the like such that a process related to reception of a user instruction is performed. The display control unit 512 controls the output unit 232 or the like such that a process related to display control of causing a GUI, a guidance image, or the like to be displayed on a monitor is performed. The transmission control unit 513 controls the communication unit 234 or the like such that a process related to transmission of various kinds of information such as the user instruction received by the user instruction reception processing unit 511 is performed.

The server 202 has function illustrated as functional blocks in B of FIG. 32 as a predetermined program is executed by the CPU 251. The CPU 251 includes functional blocks such as a user management unit 521, an application selection processing unit 522, an image selection processing unit 523, a lens selection processing unit 524, a user-designated parameter setting processing unit 525, a virtual lens processing unit 526, and a data management unit 527 as illustrated in B of FIG. 32.

The user management unit 521 performs a process related to management of the user to which the multi-viewpoint image-used service is provided, similarly to the user management unit 291. The application selection processing unit 522 controls the communication unit 264 such that communication with the terminal device 401 is performed, and a process related to selection of an application to be executed is performed. The image selection processing unit 523 controls the communication unit 264 such that communication with the terminal device 401 is performed, and a process related to selection of the multi-viewpoint image that is currently processed in the lens simulation (the virtual lens process) is performed. The user-designated parameter setting processing unit 525 controls the communication unit 264 such that communication with the terminal device 401 is performed, and a process related to a setting of the user-designated parameter transmitted from the terminal device 401 is performed. The virtual lens processing unit 526 performs a process related to simulation (simulative realization) of the virtual optical system. The data management unit. 527 performs a process related to management of data such as the multi-viewpoint image file and management of an application and data related to the application, similarly to the data management unit 295.

For example, when the first embodiment is applied to the fifth embodiment, the data management unit 527 also manages the PSF data of each viewpoint position serving as the data used for adjusting the lens aberration and data such as the offset method according to a type of aberration illustrated in FIG. 6, similarly to the data management unit 295. Further, the virtual lens processing unit 526 performs a process related to simulation (simulative realization) of the virtual optical system using the PSF data of each viewpoint position serving as the data used for adjusting the lens aberration and the data such as the offset method according to a type of aberration illustrated in FIG. 6, which are managed by the data management unit 295. Thus, an image with high lens reproducibility can be obtained.

<Flow of Multi-viewpoint Image-used Service Provision Process>

The terminal device 401 and the server 202 of the multi-viewpoint image-used service provision system having the above-described configuration perform a multi-viewpoint image-used service provision process and perform provision of the service using the multi-viewpoint image and provision of the lens simulation service in the case of the present embodiment. An example of a flow of the multi-viewpoint image-used service provision process performed by the devices will be described with reference to a flowchart of FIG. 33.

In step S201, the user instruction reception processing unit 511 of the terminal device 401 controls the input unit 231 or the like such that an instruction to request activation of an application is received from the user. The transmission control unit 513 controls the communication unit 234 or the like such that the application activation request received by the user instruction reception processing unit 511 is supplied to the server 202.

In step S221, the application selection processing unit 522 of the server 202 controls the communication unit 264 or the like such that the request is acquired. In step S222, according to the request, the application selection processing unit 522 generates a list of applications available to the user on the basis of the user management information managed by the user management unit 521, and controls the communication unit 264 or the like such that the list is supplied to the terminal device 401.

In step S202, the transmission control unit 513 of the terminal device 401 controls the communication unit 234 or the like such that the list is acquired. The display control unit 512 controls the output unit 232 such that the acquired list is displayed on the monitor as an image. The user selects an application to be activated on the basis of the list.

In step S203, the user instruction reception processing unit 511 controls the input unit 231 or the like such that an instruction to select an application to be activated is received from the user. The transmission control unit 513 controls the communication unit 234 or the like such that the instruction to select the application to be activated which is received by the user instruction reception processing unit 511 is supplied to the server 202.

In step S223, the application selection processing unit 522 of the server 202 controls the communication unit 264 or the like such that the selection instruction is acquired. Then, in step S224, the image selection processing unit 523 generates a list of the multi-viewpoint images of the user on the basis of the user management information managed by the user management unit 521, and controls the communication unit 264 or the like such that the list is supplied to the terminal device 401.

In step S204, the transmission control unit 513 of the terminal device 401 controls the communication unit 234 or the like such that the list is acquired. The display control unit 512 controls the output unit 232 such that the acquired list is displayed on the monitor as an image. The user selects the multi-viewpoint image to be currently processed on the basis of the list.

In step S205, the user instruction reception processing unit 511 controls the input unit 231 or the like such that an instruction to select an image to be currently processed is received from the user. The transmission control unit 513 controls the communication unit 234 or the like such that the instruction to select the image to be currently processed which is received by the user instruction reception processing unit 511 is supplied to the server 202.

In step S225, the image selection processing unit 523 of the server 202 controls the communication unit 264 or the like such that the selection instruction is acquired. Then, in step S226, the lens selection processing unit 524 generates a list of lenses registered for the user on the basis of the user management information managed by the user management unit 521, and controls the communication unit 264 or the like such that the list is supplied to the terminal device 401.

In step S206, the transmission control unit 513 of the terminal device 401 controls the communication unit 234 or the like such that the list is acquired. The display control unit 512 controls the output unit 232 such that the acquired list is displayed on the monitor as an image. The user selects the virtual lens to be simulated on the basis of the list.

In step S207, the user instruction reception processing unit 511 controls the input unit 231 or the like such that an instruction to select a lens is received from the user. The transmission control unit 513 controls the communication unit 234 or the like such that the instruction to select the lens which is received by the user instruction reception processing unit 511 is supplied to the server 202.

In step S227, the lens selection processing unit 524 of the server 202 controls the communication unit 264 or the like such that the selection instruction is acquired.

In step S208, the user instruction reception processing unit 511 of the terminal device 401 controls the input unit 231 or the like such that the user-designated parameter serving as the photographing-related parameter of which value is designated by the user such as the photographing condition is received. Here, it is also possible to cause, for example, the offset method according to a type of aberration illustrated in FIG. 6 to be selected. For example, it is also possible to select whether an offset is applied to all aberrations among a plurality of aberrations or an offset is applied to only a certain aberration. The transmission control unit 513 controls the communication unit 234 or the like such that the user-designated parameter received by the user instruction reception processing unit 511 is supplied to the server 202.

In step S228, the user-designated parameter setting processing unit 525 of the server 202 controls the communication unit 264 or the like such that the user-designated parameter is acquired.

In step S229, the virtual lens processing unit 526 performs the virtual lens process, and generates the virtual photographed image obtained by photographing the subject of the multi-viewpoint image selected in step S225 using the virtual lens selected in step S227 on the basis of the multi-viewpoint image data and the profile information including the parameter for reproducing an optical effect by the virtual optical system. At this time, the virtual lens processing unit 526 more accurately reproduces optical influence by the virtual lens using the user-designated parameter acquired in step S228. At this time, the virtual lens processing unit 526 generates an interpolated image of the multi-viewpoint image on the basis of the camera array information 342, the number-of-viewpoints information 343, and the depth data 332 which are included in the multi-viewpoint image file of the multi-viewpoint image selected in step S225. The virtual lens process will be described later in detail.

In step S230, the virtual lens processing unit 526 controls the communication unit 264 or the like such that data of the virtual photographed image generated in the process of step S229 is supplied to the terminal device 401.

In step S209, the transmission control unit 513 of the terminal device 401 acquires the data of the virtual photographed image. The display control unit 512 controls the output unit 232 such that the acquired virtual photographed image is displayed on the monitor. The user selects whether or not the virtual photographed image is stored on the basis of the virtual photographed image.

In step S210, the user instruction reception processing unit 511 controls the input unit 231 or the like such that an instruction to store the data of the virtual photographed image is received from the user. The transmission control unit 513 controls the communication unit 234 or the like such that the instruction to store the data of the virtual photographed image which is received by the user instruction reception processing unit 511 is supplied to the server 202.

In step S231, the data management unit 527 of the server 202 controls the communication unit 264 or the like such that the instruction to store the data of the virtual image is acquired. In step S232, the data management unit 527 generates an application parameter for the lens simulation. The data management unit 527 stores and manages the data of the virtual photographed image generated in the process of step S229 and the application parameter, and further registers the data and the application parameter for the user (updates the user management information of the user).

When the process step S232 ends, the multi-viewpoint image-used service provision process ends.

As the multi-viewpoint image-used service provision process is performed, the user can more easily performs the simulation of the virtual lens (that is, the generation of the virtual photographed image obtained by photographing using the virtual lens) using the multi-viewpoint image. Further, since the server 202 registers and manages the generated virtual photographed image data for the user, the user can more easily use the virtual photographed image data. Furthermore, since the virtual photographed image data is associated with the multi-viewpoint image used for generating the virtual photographed image, the application parameter, and the like and managed, the user can more easily use the virtual photographed image data together with another relevant data. In other words, the multi-viewpoint image-used service provision system 200 (the multi-viewpoint image-used service platform 100) can improve convenience of the service using the multi-viewpoint image.

Further, when the first embodiment is applied to the fifth embodiment, the simulation of the virtual optical system is performed using the PSF data of each viewpoint position serving as the data used for adjusting the lens aberration and the data such as a type of aberration illustrated in FIG. 6. Thus, in addition to the effects of the fifth embodiment, the user can obtain an image with high lens reproducibility such as bokeh of a lens.

<Example of Screen>

Figure 34:
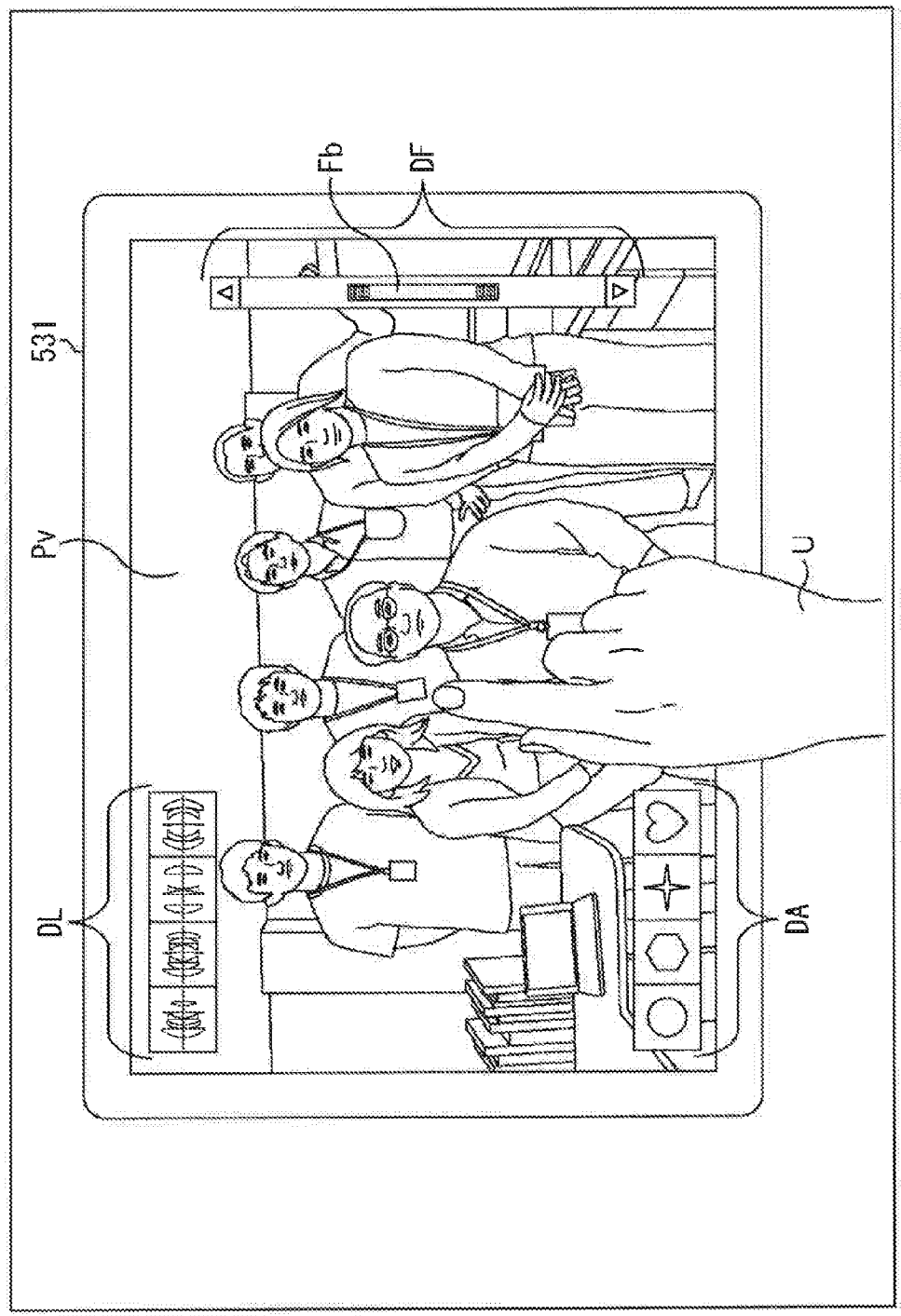
FIG. 34 is a diagram for describing an example of an aspect of virtual lens selection.

FIG. 34 is a schematic diagram illustrating an example of a setting GUI displayed on a display unit 531.

On the screen of FIG. 34, the setting GUI is displayed together with a preview image Pv. In the example of FIG. 34, a development parameter is configured with lens design information, a diaphragm shape, and a focus position.

In this case, on the display unit 531, a lens unit selection portion DL, a diaphragm shape selection portion DA, and a focus position selection portion DF are displayed to be superimposed on the preview image Pv as the setting GUI.

A diagram indicating a lens unit based on selection candidates of the lens design information of the development parameter is displayed on the lens unit selection portion DL. A diagram indicating selection candidates of the diaphragm shape of the development parameter is displayed on the diaphragm shape selection portion DA. A setting bar Fb indicating a selection candidate at the focus position using a position is displayed on the focus position selection portion DF.

The user performs an operation of touching a diagram indicating a desired lens unit displayed on the lens unit selection portion DL with a finger U and selects the selection candidate of the lens design information corresponding to the desired lens unit. The user performs an operation of touching a diagram indicating a desired diaphragm shape displayed on the diaphragm shape selection portion DA with the finger U and selects the selection candidate of the diaphragm shape.

The user performs an operation of touching the setting bar Fb of the focus position selection portion DF with the finger U, moves the finger U in a vertical direction, and moves the setting bar Fb to a position corresponding to a desired focus position. Accordingly, the user can select the selection candidate at the desired focus position.

The setting bar Fb does not only move as the user moves the finger U after performing the operation of touching the setting bar Fb with the finger U, but the setting bar Fb may move to the position as the user performs an operation of touching a desired position on the focus position selection portion DF. The selection candidate at the focus position may not be displayed, and the selection candidate at the focus position closest to the subject at the touch position of the finger U within the screen may be selected.

In the example of FIG. 34, the lens unit selection portion DL is arranged on the upper left of the preview image Pv, the diaphragm shape selection portion DA is arranged on the lower left, and the focus position selection portion DF is arranged on the right, but the arrangement positions are not limited thereto.

Although not illustrated, selection candidates of other development parameters such as white balance or an exposure correction value may be also displayed, similarly to the lens unit selection portion DL, the diaphragm shape selection portion DA, the focus position selection portion DF, or the like.

In the fourth embodiment, the display unit 531 is integrated with a touch panel, but when the display unit 531 is not integrated with a touch panel, the user moves a pointer displayed on the screen by operating a mouse (not illustrated) or the like and performs a selection operation corresponding to the touch operation.

<Flow of Virtual Lens Process>

Figure 35:
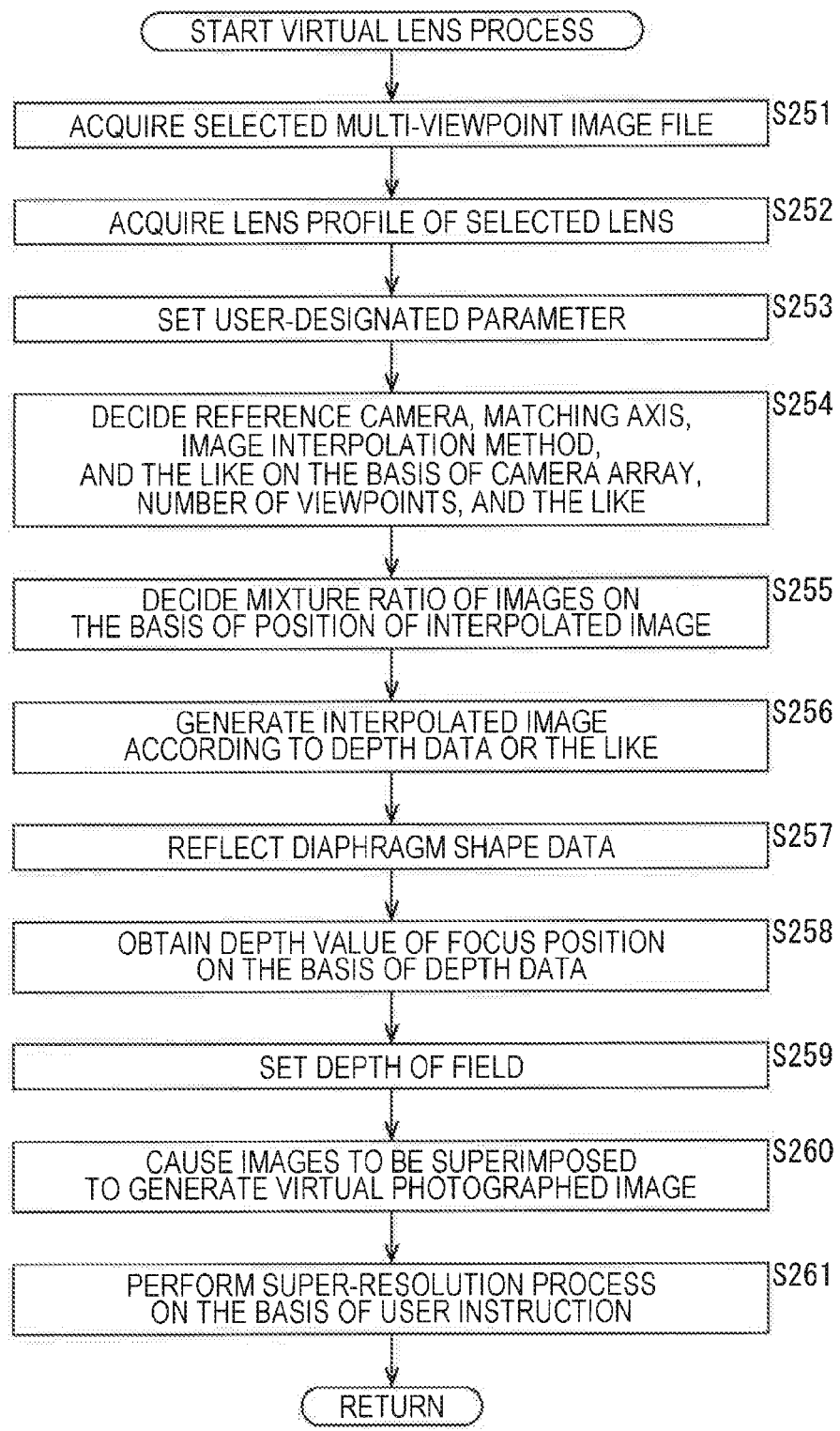
FIG. 35 is a flowchart for describing an example of a flow of the virtual lens process.

Next, an example of a detailed flow of the virtual lens process performed in step S229 of FIG. 33 will be described with reference to a flowchart of FIG. 35.

When the virtual lens process starts, in step S251, the virtual lens processing unit 526 acquires a selected multi-viewpoint image file from the storage unit 263. In step S252, the virtual lens processing unit 526 acquires the profile information of the selected lens from the storage unit 263.

A location at which the multi-viewpoint image file and the profile information are stored and managed is arbitrary and may not be the storage unit 263. For example, the multi-viewpoint image file and the profile information may be stored and managed in a device other than the server 202 such as the terminal device 401 or the like. In this case, the virtual lens processing unit 526 controls, for example, the communication unit 264 such that the multi-viewpoint image file and the profile information are acquired from the device in which the multi-viewpoint image file and the profile information are stored. A location at which the multi-viewpoint image file is stored may be different from a location at which the profile information is stored.

The profile information is information that includes the parameter for reproducing the optical effect by the virtual optical system and is specific to the virtual optical system. The profile information includes, for example, the point spread function (PSF) data, the diaphragm shape, and the number-of-interpolations designation information of each RGB. Further, when the first embodiment is applied to the fifth embodiment, the profile information corresponds to the PSF data of each viewpoint position serving as the data used for adjusting the lens aberration according to the viewpoint position or the angle-of-view position described in the first embodiment.

Figure 36:
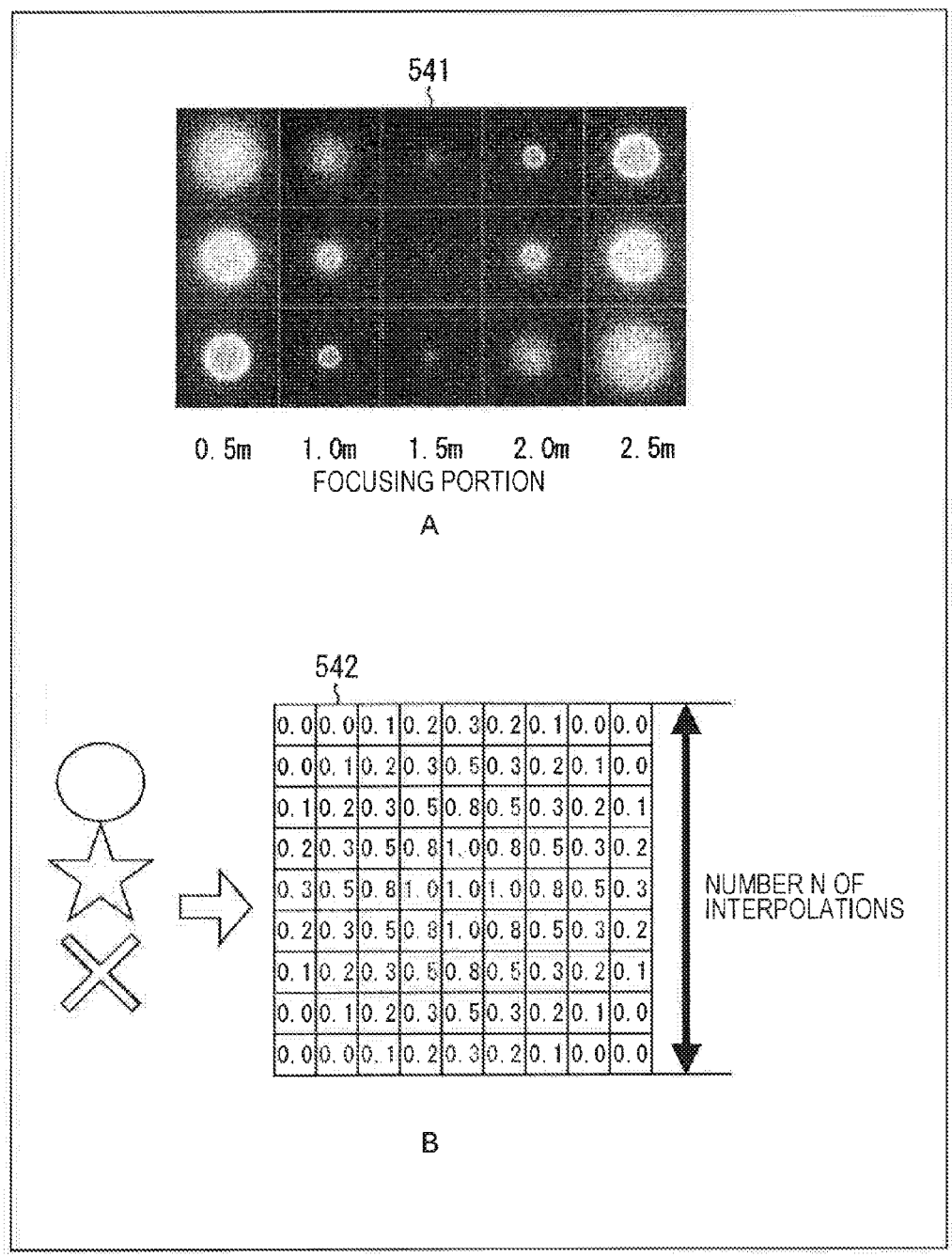
FIG. 36 is a diagram for describing an example of a lens profile.

The PSF data is also referred to as a "point spread function" and is a function indicating a response to the point light source of the virtual lens included in the virtual optical system. In other words, the PSF data is data indicating influence of the virtual lens on the light rays passing through the virtual lens for each RGB. A of FIG. 36 indicates an example of the PSF data. In the case of this example, the PSF data according to a distance to a focusing portion (that is, the point light source) is illustrated for each color (for each row).

The diaphragm shape is information indicating a shape of a virtual diaphragm included in the virtual optical system. The diaphragm shape may be a shape of a diaphragm that actually exists or may be an arbitrary shape that does not actually exist such as a circular form, a star form, or an X form indicated on the left of B of FIG. 36. The diaphragm shape may be designated by an arbitrary method. For example, a predetermined shape may be designated on the basis of identification information (ID) or the like. For example, the diaphragm shape may be indicated by an intensity distribution 542 as illustrated on the right of B of FIG. 36. The size of the intensity distribution (the number of intensities) depends on the number of interpolated images (the number of interpolations) designated by the number-of-interpolations designation information. For example, when the number of interpolations is N, the diaphragm shape is indicated by the intensity distribution 542 of N×N.

The number-of-interpolations designation information is information designating the number of interpolated images generated when the virtual photographed image is generated. In other words, the virtual lens processing unit 526 generates the number of interpolated images designated by the number-of-interpolations designation information in the virtual lens process. As the number of interpolated images increases, the resolution of the obtained virtual photographed image increases. In general, when the virtual lens is a luxury (high-performance) lens, the number of interpolated images is large.

As described above, lens profile information is configured with information indicating features of the virtual lens. Further, content of the lens profile information is arbitrary, and part of the above-described information may be omitted, and information other than the above-described information may be included. For example, physical design information of a lens used for emulating the virtual lens may be included in the lens profile information. Using the PSF data of each viewpoint position serving as the data used for adjusting the lens aberration according to the viewpoint position or the angle-of-view position described in the first embodiment, similar effects to those of the first embodiment can be obtained. In other words, an image with high lens reproducibility such as bokeh of a lens can be obtained.

Figure 33:
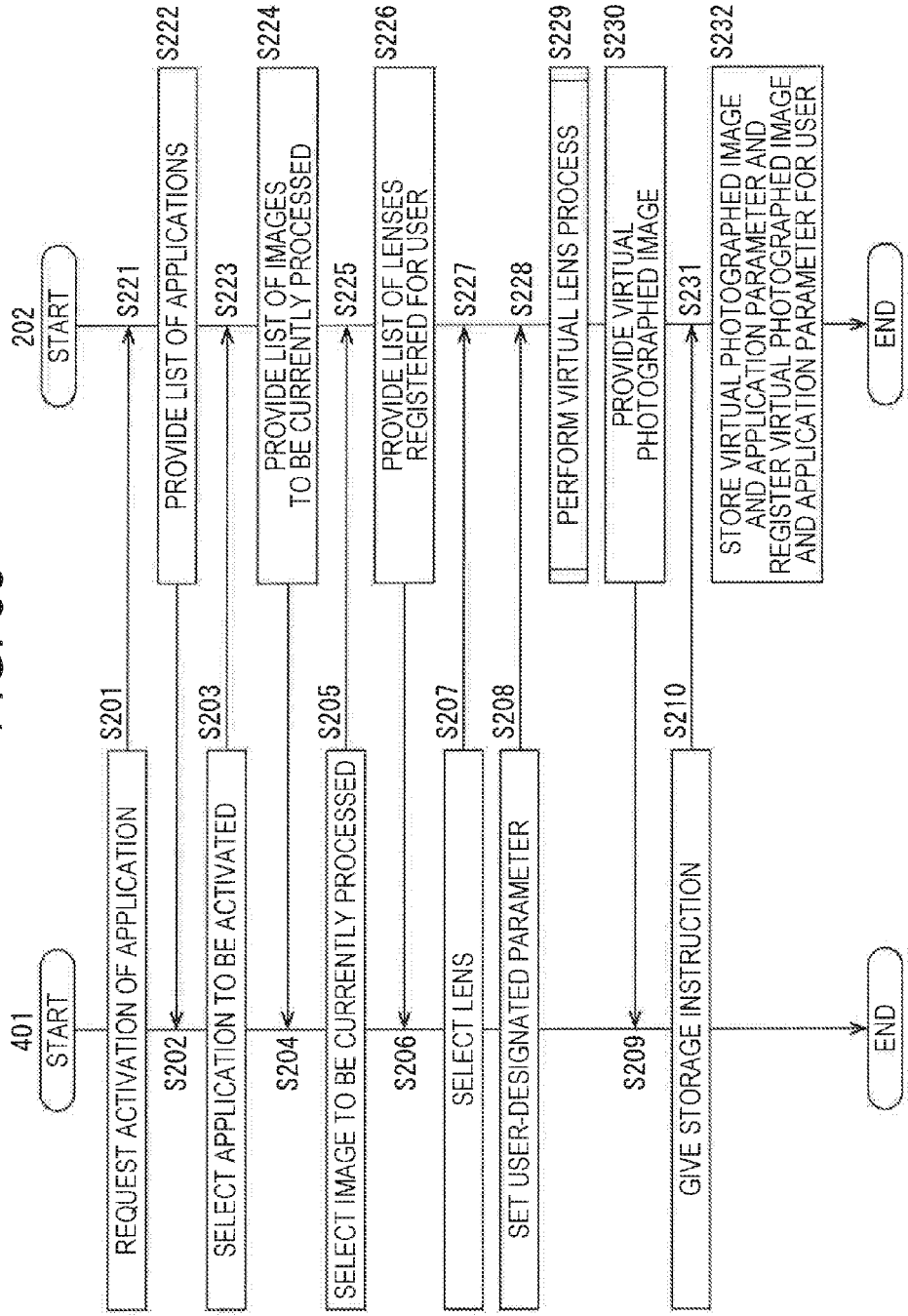
FIG. 33 is a flowchart illustrating another example of the flow of the multi-viewpoint image-used service provision process.

Referring back to FIG. 35, in step S253, the virtual lens processing unit 526 sets the user-designated parameter acquired in step S228 of FIG. 33.

The user-designated parameter is a photographing-related parameter of which value is designated by the user. The virtual lens processing unit 526 generates the virtual photographed image according to the user-designated parameter. For example, the user-designated parameter includes focusing position designation information, depth of field designation information, super-resolution process execution instruction information, and the like. When the first embodiment is applied to the fifth embodiment, for example, the information of a type of the aberration illustrated in FIG. 6 may be included, or the PSF data of each viewpoint position serving as the data used for adjusting the lens aberration may be included.

The focusing position designation information (the focus position designation information) is information indicating a region (or a pint) in which a subject to be focused is positioned within the photographed image. In other words, when the user designates an arbitrary position of the photographed image as the focusing position, the virtual photographed image is generated so that (the distance of) the subject at the focusing position is focused.

The depth of field designation information is information designating the depth of field (the size of the diaphragm). Further, the super-resolution process execution instruction information is information that indicates whether or not a super-resolution process is performed when the photographed images of the multi-viewpoint image are superimposed to generate the virtual photographed image and includes an instruction that is related to the super-resolution process and indicates a process range and a process degree when the super-resolution process is performed. When the photographed images of the multi-viewpoint image are superimposed, the super-resolution process is performed on the basis of the super-resolution process execution instruction information.

It will be appreciated that content of the user-designated parameter is arbitrary, and part of the above-described information may be omitted, and information other than the above-described information may be included.

In step S254, the virtual lens processing unit 526 decides a reference camera (an image of a reference viewpoint), a matching axis, an image interpolation method, and the like on the basis of the camera array information, the number-of-viewpoints information, and the like included in the metadata associated with the multi-viewpoint image data to be currently processed.

In step S255, the virtual lens processing unit 526 decides a mixture ratio of images (that is, images to be superimposed) used for image interpolations according to a position of an interpolated image to be generated.

In step S256, the virtual lens processing unit 526 generates the interpolated image according to the depth data and various kinds of parameters described above. For example, the virtual lens processing unit 526 generates the interpolated image by causing the images designated by the interpolation method decided in step S254 to be superimposed according to the depth data using the image of the reference viewpoint decided in step S254 and the matching axis decided in step S254. The virtual lens processing unit 526 generates the number of interpolated images designated by the number-of-interpolations designation information of the profile information.

In step S257, the virtual lens processing unit 526 reflects the diaphragm shape data of the profile information on each interpolated image.

In step S258, the virtual lens processing unit 526 obtains a depth value of the focusing position (the focus position) designated by the user on the basis of the depth data. In other words, for example, the virtual lens processing unit 526 obtains a depth value of a subject (a distance to the subject) at the position (coordinates) designated in the focusing position designation information (the focus position designation information) included in the user-designated parameter of the generated virtual photographed image acquired in step S228.

In step S259, the virtual lens processing unit 526 sets the depth of field designated by the depth of field designation information of the user-designated parameter.

In step S260, the virtual lens processing unit 526 generates the virtual photographed image by causing the multi-viewpoint image and the interpolated images to be superimposed by repeating the stereo matching. At this time, the virtual lens processing unit 526 reflects the PSF data of the virtual lens according to the depth data (the depth value of the subject). The virtual lens processing unit 526 generates the virtual photographed image so that focusing is performed according to the depth value (distance) obtained in step S258. Further, the virtual lens processing unit 526 can reflect the shape of the virtual diaphragm in the virtual photographed image by reflecting the diaphragm shape data in the interpolated images in step S257. The virtual lens processing unit 526 generates the virtual photographed image so that the depth of field set in step S259 is realized.

Instead of the PSF data, the PSF data of each viewpoint position in the first embodiment may be used. Further, when the first embodiment is applied to the fifth embodiment, the virtual lens processing unit 526 may generate the virtual photographed image while generating the PSF data of each viewpoint position instead of the functional block necessary for generating the PSF data of each viewpoint position which is described above with reference to FIG. 2. Accordingly, in addition to the effects of the fifth embodiment, the user can obtain an image with high lens reproducibility such as bokeh of a lens.

In step S261, the virtual lens processing unit 526 performs the super-resolution process on the virtual photographed image according to the super-resolution process execution instruction information of the user-designated parameter. For example, when the super-resolution process is instructed not to be performed by the super-resolution process execution instruction information, the virtual lens processing unit 526 does not perform the super-resolution process. Further, for example, when the super-resolution process is instructed to be performed by the super-resolution process execution instruction information, the virtual lens processing unit 526 performs the super-resolution process.

The super-resolution process may be performed on the entire virtual photographed image or may be performed on only a part of a depth value of a predetermined range including a depth value of the focusing position. When the super-resolution process is performed on a part of the subject that is not focused, an obtained effect (an improvement in an image quality) is small. Thus, by performing the super-resolution process on only a part in which the focusing position and the depth value match or approximate to each other as described above, it is possible to reduce the processing load while suppressing a reduction in the image quality. Further, a part on which the super-resolution process may be designated by the super-resolution process execution instruction information as described above.

When the process of step S261 ends, the virtual lens process ends, and the process returns to FIG. 33.

As described above, as the virtual lens process is performed, the user can more easily obtain the virtual photographed image.

The virtual lens process described above is not limited to the server 202 and may be performed in an arbitrary device. For example, the CPU 221 of the terminal device 401 may include the virtual lens processing unit 526 or the like, and the terminal device 401 may perform the virtual lens process. In this case, the virtual lens process can be performed basically similarly to the above example. Preferably, the information that is used in the virtual lens process and stored (managed) in the server 202 such as the multi-viewpoint image file and the profile information of the virtual lens are appropriately transmitted to the terminal device 401 as necessary.

As described above, the PSF data of each viewpoint position serving as the data used for adjusting the aberration in the first embodiment may be generated at the server side or the terminal device side in the systems according to the second to fifth embodiments. The generated data may be managed in the server, undergo the image processing, and then be provided to the terminal device side, or the generated data may be provided from the server side and used for image processing at the terminal device side. Further, the generated data may be managed at the terminal device side and undergo image processing at the terminal side, or the generated data may be transmitted to the server side and processed at the server side.

The PSF data of each viewpoint position serving as the data used for adjusting the aberration may be managed as the profile information, may be managed as data, or may be managed as metadata. The PSF data may be associated with a type of application and managed, or the PSF data may be associated with a purchased application and managed.

As described above, when the first embodiment is applied to the second to fifth embodiments, in addition to the effects of the second to fifth embodiments, an effect in that an image with high lens reproducibility such as bokeh of a lens can be provided can be obtained.

<6. Others>

The series of processes described above may be implemented by hardware or may be implemented by software. When the series of processes described above is implemented by software, a program constituting the software may be installed from a network or a recording medium.

The recording medium is configured with the removable medium (for example, the removable medium 241, the removable medium 271, or the removable medium 431) which is distributed to deliver the program to the user and has the program recorded therein, separately from the device body, for example, as illustrated in FIG. 14, FIG. 16, and FIG. 26. Examples of the removable medium include a magnetic disk (including a flexible disk) and an optical disk (including a CD-ROM or a DVD). Further, examples of the removable medium include a magneto optical disk (including a Mini Disc (MD) and a semiconductor memory.

In this case, the program may be installed in the storage unit via the input/output interface from the removable medium mounted in the drive.

The program may be provided via a wired or wireless transmission medium such as the local area network, the Internet, or digital satellite broadcasting. In this case, the program may be received by the communication units of the respective devices (for example, the communication unit 234, the communication unit 264, and the communication unit 424) and installed in the storage units (for example, the storage unit 233, the storage unit 263, and the storage unit 423).

In addition, the program may be installed in the ROMs (for example, the ROM 222, the ROM 252, and the ROM 412) or the storage units (for example, the storage unit 233, the storage unit 263, and the storage unit 423) of the respective devices.

A program executed by a computer may be a program in which the processes are chronologically performed according to an order described in this specification or may be a program in which the processes are performed in parallel or at necessary timings, for example, when they are called.

In this specification, the steps describing the program recorded in the recording medium include not only the processes that are chronologically performed according to a described order but also processes that are performed in parallel or individually although they are not necessarily chronologically performed.

In this specification, a system indicates the entire device configured with a plurality of devices.

A component described above as one device (or processing unit) may be divided and configured as a plurality of devices (or processing units). Conversely, components described above as a plurality of devices (or processing units) may be configured as one device (or processing unit). A component other than the above-described components may be added to components of each device (or each processing unit). Further, some components of a certain device (or a processing unit) may be included in components of another device (or another processing unit) as long as they are substantially the same in configuration and operation from a point of view of the whole system. In other words, the present technology is not limited to the above embodiments, and various changes can be made within the scope not departing from the gist of the present technology.

The preferred embodiments of the present disclosure have been described above with reference to the accompanying drawings, whilst the technical scope of the present disclosure is not limited to the above examples. A person skilled in the art of the present disclosure may find various alterations and modifications within the scope of the appended claims, and it should be understood that they will naturally come under the technical scope of the present disclosure.

The present technology may also have the following configurations.

(1) An image processing device, including:
a light collection processing unit that performs a light collection process of reproducing a lens aberration on a multi-viewpoint image using aberration adjustment data for adjusting the lens aberration according to a viewpoint position or an angle-of-view position for a lens.

(2) The image processing device according to (1),
wherein the light collection processing unit performs the light collection process using an offset value and an intensity value for the lens aberration according to the viewpoint position as the aberration adjustment data.

(3) The image processing device according to (1),
wherein the light collection processing unit performs the light collection process using an offset value and an intensity value for the lens aberration according to the angle-of-view position as the aberration adjustment data.

(4) The image processing device according to (1),
wherein the light collection processing unit performs the light collection process using a point spread function of each viewpoint position of the multi-viewpoint image as the aberration adjustment data.

(5) The image processing device according to (4),
wherein the light collection processing unit performs the light collection process of reproducing lens aberrations having different offset methods according to a type of aberration or aberration characteristics using a point spread function of each viewpoint position of the multi-viewpoint image.

(6) The image processing device according to (5),
wherein the lens aberration has at least one of an offset method having an offset value that differs according to each viewpoint position and an offset method having an offset value that differs according to each angle-of-view position according to the type of aberration or the aberration characteristics.

(7) The image processing device according to (4),
wherein the light collection processing unit performs the light collection process using an offset value and an intensity value of each viewpoint position obtained from the point spread function of each viewpoint position.

(8) The image processing device according to (4),
wherein the light collection processing unit performs the light collection process using an offset value and an intensity value of each angle-of-view position obtained from the point spread function of each viewpoint position.

(9) The image processing device according to (4), further including,
a setting unit that sets the aberration adjustment data on the basis of depth data of the multi-viewpoint image.

(10) The image processing device according to (9),
wherein the setting unit sets the aberration adjustment data on the basis of the depth data of the multi-viewpoint image, coordinate data of the angle-of-view position, and coordinate data of the viewpoint position.

(11) The image processing device according to any one of (4) to (9), further including,
an image interpolating unit that performs an interpolation process on the multi-viewpoint image on the basis of the depth data of the multi-viewpoint image,
in which the function generating unit generates a point spread function of each viewpoint position of the multi-viewpoint image that has undergone the interpolation process performed by the image interpolating unit.

(12) An image processing method, including,
generating, by an image processing device, a point spread function of each viewpoint position of a multi-viewpoint image on the basis of depth information of the multi-viewpoint image; and
performing, by the image processing device, a light collection process by writing data in a virtual sensor using the generated point spread function of each viewpoint position.

REFERENCE SIGNS LIST

11 Imaging device
21 Camera array
22 Depth estimating unit
23 Light ray interpolating unit
24 Light ray tracing unit
25 Light collection processing unit
26 Virtual sensor
31, 31-1 to 31-9 Camera
51 Focus position setting unit
52 Viewpoint PSF calculating unit
100 Multi-viewpoint image-used service platform
200 Multi-viewpoint image-used service provision system
201 Terminal device
202 Server
221 CPU
236 Imaging unit
251 CPU
281 Imaging control unit
282 Metadata generating unit
283 Encoding unit
284 Transmission control unit
291 User management unit
292 Acquisition control unit
293 Depth detecting unit
294 File generating unit
295 Data management unit
321 Multi-viewpoint image file
331 Multi-viewpoint image encoded data
332 Depth data
333 Metadata
401 Terminal device
402 Application provision server
411 CPU
441 Application purchase processing unit
451 User management unit
452 Application sale processing unit
453 Data management unit
461 Application provision processing unit
511 User instruction reception processing unit
512 Display control unit
513 Transmission control unit
521 User management unit
522 Application selection processing unit
523 Image selection processing unit
524 Lens selection processing unit
525 User-designated parameter setting processing unit
526 Virtual lens processing unit
527 Data management unit

The invention claimed is:

1. An image processing device, comprising:
a light collection processing unit that performs a light collection process of reproducing a lens aberration of a lens for each viewpoint position of a multi-viewpoint image using aberration adjustment data for adjusting the lens aberration according to a viewpoint position or an angle-of-view position for the lens,
wherein the light collection processing unit performs the light collection process using a point spread function of each viewpoint position of the multi-viewpoint image as the aberration adjustment data, and
wherein the light collection processing unit is implemented via at least one processor.

2. The image processing device according to claim 1,
wherein an offset value and an intensity value for the lens aberration according to the viewpoint position are obtained based on the point spread function.

3. The image processing device according to claim 1,
wherein an offset value and an intensity value for the lens aberration according to the angle-of-view position are obtained based on the point spread function.

4. The image processing device according to claim 1,
wherein the light collection processing unit performs the light collection process of reproducing the lens aberrations having different offset methods according to a type of aberration or aberration characteristics using a point spread function of each viewpoint position of the multi-viewpoint image.

5. The image processing device according to claim 4,
wherein the lens aberration has at least one of an offset method having an offset value that differs according to each viewpoint position and an offset method having an offset value that differs according to each angle-of-view position according to the type of aberration or the aberration characteristics.

6. The image processing device according to claim 1,
wherein the light collection processing unit performs the light collection process using an offset value and an intensity value of each viewpoint position obtained from the point spread function of each viewpoint position.

7. The image processing device according to claim 1,
wherein the light collection processing unit performs the light collection process using an offset value and an intensity value of each angle-of-view position obtained from the point spread function of each viewpoint position.

8. The image processing device according to claim 1, further comprising:
a setting unit that sets the aberration adjustment data on the basis of depth data of the multi-viewpoint image,
wherein the setting unit is implemented via at least one processor.

9. The image processing device according to claim 8,
wherein the setting unit sets the aberration adjustment data on the basis of the depth data of the multi-viewpoint image, coordinate data of the angle-of-view position, and coordinate data of the viewpoint position.

10. The image processing device according to claim 8, further comprising:
an image interpolating unit that performs an interpolation process on the multi-viewpoint image on the basis of the depth data of the multi-viewpoint image,
wherein the setting unit sets the aberration adjustment data on the basis of depth data of the multi-viewpoint image that has undergone the interpolation process performed by the image interpolating unit, and
wherein the image interpolating unit is implemented via at least one processor.

11. An image processing method, comprising:
performing, by an image processing device, a light collection process of reproducing a lens aberration of a lens for each viewpoint position of a multi-viewpoint image using aberration adjustment data for adjusting the lens aberration according to a viewpoint position or an angle-of-view position for the lens,
wherein the light collection process is performed using a point spread function of each viewpoint position of the multi-viewpoint image as the aberration adjustment data.

12. A non-transitory computer-readable medium having embodied thereon a program, which when executed by a computer causes the computer to execute a method, the method comprising:
performing, by an image processing device, a light collection process of reproducing a lens aberration of a lens for each viewpoint position of a multi-viewpoint image using aberration adjustment data for adjusting the lens aberration according to a viewpoint position or an angle-of-view position for the lens,
wherein the light collection process is performed using a point spread function of each viewpoint position of the multi-viewpoint image as the aberration adjustment data.

13. The image processing device according to claim 1,
wherein the reproducing indicates reproducing bokeh of an image obtained by the lens.

\* \* \* \* \*